US012750137B2

(12) United States Patent
Landau et al.

(10) Patent No.: US 12,750,137 B2
(45) Date of Patent: Sep. 29, 2026

(54) MONOSTATIC FREE-SPACE OPTICAL COMMUNICATION SYSTEM

(71) Applicant: Aalyria Technologies, Inc., Livermore, CA (US)

(72) Inventors: Igor Landau, Boulder, CO (US); Rick Young, Eagle, ID (US); Sharmon Ball, Grants Pass, OR (US)

(73) Assignee: Aalyria Technologies, Inc., Livermore, CA (US)

( * ) Notice: Subject to any disclaimer, the term of this patent is extended or adjusted under 35 U.S.C. 154(b) by 252 days.

(21) Appl. No.: 18/651,456

(22) Filed: Apr. 30, 2024

(65) Prior Publication Data

US 2024/0372618 A1 Nov. 7, 2024

Related U.S. Application Data

(60) Provisional application No. 63/499,940, filed on May 3, 2023.

(51) Int. Cl.
*H04B 10/112* (2013.01)
*G02B 6/32* (2006.01)

(52) U.S. Cl.
CPC ........... *H04B 10/1123* (2013.01); *G02B 6/32* (2013.01)

(58) Field of Classification Search
CPC .............................. H04B 10/1123; G02B 6/32
(Continued)

(56) References Cited

U.S. PATENT DOCUMENTS 7,286,766 B2 10/2007 Shelton et al.
7,343,099 B2 3/2008 Wirth et al.
(Continued)

FOREIGN PATENT DOCUMENTS

CN 101729142 A 6/2010
CN 205945744 U 2/2017
(Continued)

OTHER PUBLICATIONS

Arimoto Y., et al., "Multi-Gigabit Free-Space Laser Communications Using Compact Optical Terminal with Bidirectional Beacon Tracking," IEEE International Conference on Communications (ICC), 2011, pp. 1-5.

(Continued)

*Primary Examiner* — Dalzid E Singh

(74) *Attorney, Agent, or Firm* — Dickinson Wright PLLC

(57) ABSTRACT

A free-space optical communication terminal includes an optical antenna configured to receive, through a first aperture, a laser beam characterized by wavelengths in a first wavelength range, a collimator configured to couple the received laser beam into an optical fiber, a receiver subsystem comprising a first bandpass filter characterized by a pass band including the first wavelength range, a transmitter subsystem configured to generate a laser beam to be transmitted through the first aperture by the optical antenna and characterized by wavelengths in a second wavelength range outside of the pass band of the first bandpass filter, and a circulator coupled to the optical fiber, the receiver subsystem, and the transmitter subsystem. The circulator is configured to direct the received laser beam from the optical fiber to the receiver subsystem, and direct the laser beam to be transmitted from the transmitter subsystem to the optical fiber.

18 Claims, 25 Drawing Sheets

(58) Field of Classification Search
USPC .......................................................... 398/128
See application file for complete search history.

(56) References Cited

U.S. PATENT DOCUMENTS

| | | | | |
|---|---|---|---|---|
| 7,593,641 | B2 | 9/2009 | Tegge, Jr. | |
| 9,784,966 | B1 | 10/2017 | Harrison et al. | |
| 11,336,371 | B2 * | 5/2022 | Nykolak | H04B 10/1129 |
| 11,546,062 | B1 * | 1/2023 | Moro | H04B 10/505 |
| 11,606,160 | B1 * | 3/2023 | Csonka | H04B 10/118 |
| 12,301,289 | B1 * | 5/2025 | Jia | H04B 10/63 |
| 2003/0081294 | A1 * | 5/2003 | Lee | H04B 10/11 398/126 |
| 2007/0031150 | A1 * | 2/2007 | Fisher | H04B 10/118 398/128 |
| 2020/0073118 | A1 | 3/2020 | Wang | |

FOREIGN PATENT DOCUMENTS

| | | | |
|---|---|---|---|
| EP | 3493430 | A1 | 6/2019 |
| GB | 2580044 | A | 7/2020 |
| JP | 2004015324 | A | 1/2004 |

OTHER PUBLICATIONS

Bazil-Raj A.A., et al., "Terrestrial Free Space Line of Sight Optical Communication (TFSLSOC) Using Adaptive Control Steering System with Laser Beam Tracking, Aligning and Positioning (ATP)", International Conference on Wireless Communication and Sensor Computing, ICWCSC (IEEE), 2010, pp. 1-5, XP031630149.
Buske I., et al., "Compact Active High-Resolution Imaging System," Proceedings of SPIE, vol. 7112, pp. 1-9, XP040443604.
Chen M., et al., "Investigation of Convolution Neural Network-Based Wavefront Correction for FSO Systems," 11th International Conference on Wireless Communications and Signal Processing (WCSP), 2019, pp. 1-6, XP033671616, DOI: 10.1109/WCSP.2019.8927850 [retrieved on Dec. 6, 2019].
Crabtree P., et al., "Binary Phase-Only Filtering for Turbulence Compensation in Fiber-Coupled Free-Space Laser Communication Systems," Applied Optics, vol. 46 (34), 2007, pp. 8335-8345, XP001509752, DOI: 10.1364/A0.46.008335.
EP European Partial Search report dated Nov. 27, 2023 in EP Application No. 23176243.6.
EP Extended European Search report dated Feb. 19, 2024 in EP Application No. 23176243.6.
EP Extended European Search Report dated Nov. 27, 2023, in EP Application No. 23176242.8.
EP Extended European Search report dated Nov. 27, 2023 in EP Application No. 23176244.4.
EP Extended European Search Report dated Nov. 27, 2023, in EP Application No. EP23176245.1.
Garnham., et al., "Low-Cost Optical Communications Ground Terminal Architecture for Inter-Planetary and High Data Rate Communications Links," Proceedings of SPIE, 2018, vol. 10524, pp. 105241A1-105241A6, XP060104641, DOI: 10.1117/12.2291173.
Hampson K., et al., "Adaptive Optics for Microscopy," Sensorless Adaptive Optics, 2020, pp. 1-16.
Horst Y., et al., "Tbit/s Line-Rate Satellite Feeder Links Enabled by Coherent Modulation and Full-adaptive Optics," Light: Science & Applications, 2023, vol. 12(153), pp. 1-12.
Toporovskiy V., et al., "Bimorph Deformable Mirror Parameters Optimization in Atmospheric Applications," Proceedings of SPIE, vol. 12218. pp. 1221806 (1-12), XP060165496, DOI: 10.1117/12.2632914.
U.S. Appl. No. 18/651,420, inventors Landau I, et al., filed Apr. 30, 2024.
U.S. Appl. No. 18/651,471, inventors Landau I, et al., filed Apr. 30, 2024.
U.S. Appl. No. 18/651,487, inventors Landau I, et al., filed Apr. 30, 2024.
Wainright., et al., "Wavelength Diversity in Free-Space Optics to Alleviate Fog Effects," Proceedings of SPIE, 2005, vol. 5712, pp. 110-118, XP040199988.
Xu L., et al., "Design and Performance Analysis of Nadam SPGD Algorithm for Sensor-Less Adaptive Optics in Coherent FSOC Systems," Photonics, 2022, vol. 9(77), pp. 1-15.
Zhang., et al., "Extending the Detection and Correction Abilities of an Adaptive Optics System for Free-space Optical Communication," Optics Communications, 2020, vol. 482, pp. 1-8, XP086375295, DOI: 10.1016/J.OPTCOM.2020.126571 [retrieved on Nov. 2, 2020].

* cited by examiner

MONOSTATIC FREE-SPACE OPTICAL COMMUNICATION SYSTEM

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Free-space optical communication (FSOC), due to its high data rate, high capacity, free license spectrum, and excellent security, offers an alternative to Radio Frequency (RF) or microwave communication in modern wireless communication. In a free-space optical communication system, a transmitter may transmit data at a high speed (e.g., greater than 1 Gbps, 10 Gbps, 100 Gbps, 1 Tbps, or higher) using a narrow laser beam (e.g., in infrared wavelengths) that passes through the atmosphere to a line of-sight receiver. Free-space optical communication can offer point-to-point data communication at rates faster than other solutions available today, cover greater distances, offer connectivity where no supporting infrastructure exists, and is not susceptible to RF-based jamming techniques intended to interfere and disrupt the operation of RF communication systems. For example, free-space optical communication systems may be used to provide links to, from, or between aircrafts, spacecrafts, balloons, satellites, ground vehicles and stations, and water-based vehicles and stations, and can deliver data services at high speed to sites that may otherwise have no access to high speed networks such as fiber optical networks. Free-space optical communication can radically improve satellite communications, Wi-Fi on planes and ships, and cellular connectivity everywhere.

SUMMARY

This disclosure relates generally to free-space optical communication. Various inventive embodiments are described herein, including systems, subsystems, modules, devices, components, materials, methods, compositions, processes, and the like.

According to certain embodiments, a free-space optical communication terminal may include an optical antenna configured to receive a laser beam characterized by wavelengths in a first wavelength range through a first aperture, a collimator configured to couple the received laser beam into an optical fiber, a receiver subsystem comprising a first bandpass filter characterized by a pass band including the first wavelength range, a transmitter subsystem configured to generate a laser beam to be transmitted and characterized by wavelengths in a second wavelength range outside of the pass band of the first bandpass filter, and a circulator coupled to the optical fiber, the receiver subsystem, and the transmitter subsystem. The circulator may be configured to direct the received laser beam from the optical fiber to the receiver subsystem, and direct the laser beam to be transmitted from the transmitter subsystem to the optical fiber. The collimator may be configured to collimate the laser beam to be transmitted from the optical fiber. The optical antenna may be configured to transmit the laser beam to be transmitted into atmosphere through the first aperture.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

Figure 1:
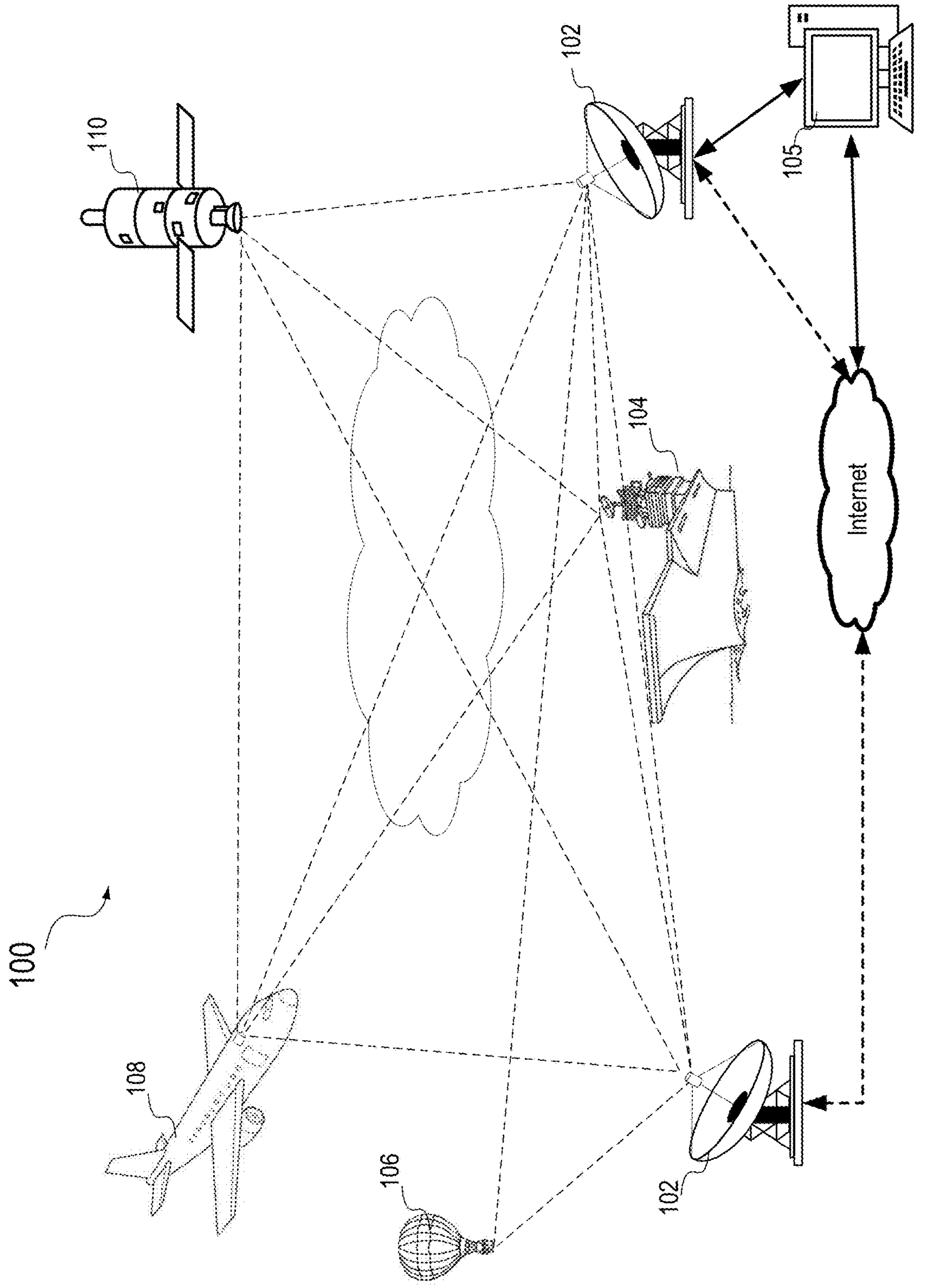
FIG. 1 illustrates an example of a communication network that may be implemented using free-space optical communications.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to free-space optical communication. Various inventive embodiments are described herein, including systems, subsystems, modules, devices, components, methods, processes, compositions, materials, and the like.

Free-space optical communication (FSOC) offers an alternative to radio frequency (RF) and microwave communication in modern wireless communication due to its high data rate, high capacity, cost-effectiveness, free license spectrum, excellent security, rapid deployment, and the like. However, optical signals transmitted through the atmosphere may be affected by the atmosphere before arriving at a line-of-sight receiver. The atmospheric effects may deteriorate free-space laser transmission by reducing the overall optical power level due to atmospheric attenuation, and/or causing random optical power and phase fluctuations in the received signal resulting from, for example, beam deformation, scintillation effects, and beam wander.

For example, laser beams may be subject to high geometric loss due to laser beam divergence during propagation, when the divergence angles of the laser beams are large and the aperture size of the receiver is small. For long rang free-space optical communication, laser beams with low divergence may generally be needed to reduce the geometric loss. When the laser beams have low divergence, misalignment errors may occur due to, for example, motions of mobile communication terminals, and undesired movement of communication terminals caused by, for example, wind, earthquake, building vibrations, and the like. FSOC systems may also be affected by attenuation losses caused by different weather considerations such as haze, dust, fog, rain, smoke, and snow, where particulates and aerosols may interact with (e.g., absorb or scatter) the optical beam over the link span. These phenomena can have a cumulative effect on the overall power level of the received signal and can cause fluctuations in the detected optical power level due to temporal instabilities of the attenuation mechanisms on the optical path. Background noise, such as direct or indirect sunlight or light from other sources, may further reduce the signal-to-noise ratio of the received light that has been attenuated by the atmosphere.

In addition, the inhomogeneity in density, temperature, humidity, pressure, wind speed, and the like in the atmosphere may lead to small scale, localized random pockets of varying indices of refraction, causing random fluctuation (which may be referred to as atmospheric turbulence) in the refractive index of the atmosphere. The atmospheric turbulence may be time-variant, and may depend on, for example, the link distance, the wavelength of the light source, and the refractive index constant, which may increase with temperature and thus may be higher at noon than at night. As such, when a carrier laser beam is transmitted between two terminals, the wavefront of the laser beam transmitted through the atmosphere may be distorted in both amplitude (scintillation) and phase (aberrations) across a cross-section of the laser beam. When the size of the scintillation is smaller than the diameter of the laser beam, the laser beam may experience distortion, and a non-uniform optical intensity across the wavefront may be observed. If the size of the scintillation is larger than the diameter of the laser beam, the laser beam may randomly wander. The combination of scintillation and beam wander can lead to fluctuations in overall signal stability. Spatial phase aberrations may also evolve into spatial intensity variation in the laser beam received at the entrance pupil of the optical antenna of the receiver.

While aperture averaging may mitigate some amplitude scintillation effects, the performance of an FSOC system may be significantly degraded by the distorted phase (aberrations) in the wavefront. In free-space optical communication, received light may need to be coupled into a single-mode fiber in order to use fiber-based telecommunications components, such as erbium-doped fiber amplifiers (EDFA) and wavelength-division multiplexers and/or demultiplexers (WDMs/WDDMs). Due to the atmospheric phase disturbances of the received laser beam, coupling the received light into the single-mode fiber may have a low coupling efficiency and a high loss, especially in scenarios of laser downlinks between satellites or airplanes and an optical ground station. In these scenarios, the aperture (e.g., diameter) of the optical antenna (e.g., a telescope) is generally much larger than the spatial coherence length of the laser beam. When the aperture of the optical antenna is greater than the atmospheric coherence length of the laser beam, regions of the wavefront may have different phases and multiple intensity spots (speckles) may be formed on the focal plane where the optical fiber is located. Furthermore, the phase fluctuations of the wavefront may change in, for example, a millisecond scale, and thus the locations of the multiple intensity spots on the focal plane may change over time. Therefore, it can be very difficult to consistently couple the received light into the optical fiber at a sufficiently high coupling efficiency. As a result, the optical power received by a photodetector of the receive module may be further reduced. Merely increasing the transmitted signal power and/or signal gain may not necessarily increase the intensity of the laser beam coupled into the core of the optical fiber and received by the photodetector.

Therefore, the amplitude fluctuation and wave-front distortion caused by atmospheric turbulence can severely degrade the coupling efficiency and increase the bit-error-rate (BER) of the communication systems. To overcome such effects of the atmosphere on the transmitted laser beam, adaptive optics (AO) may be used to correct the phase perturbations (aberrations) in the received light beam, such that the received light beam may be focused into a single symmetric (e.g., circular) light spot that can be more efficiently coupled into the fiber. An adaptive optics system may generally estimate the phase perturbations (aberrations) of the received light beam and generate additional phase changes conjugated with the estimated phase perturbations in the received light beam (e.g., using a deformable mirror or a spatial light modulator (SLM)) to compensate for the disturbances. In many AO systems, the performance of phase-only AO compensation may be limited due to, for example, limited accuracy and/or resolution of the phase aberration estimation or measurement, and/or limited phase compensation range, resolution, accuracy, and speed of the phase compensation components (e.g., deformable mirrors or SLMs).

An FSOC system may need to be able to maintain real-time data transmission even during periods of strong turbulence. The data transmission rate in an FSOC system can be 1 Gbps or higher, and thus a 1-millisecond interruption may result in millions of bit errors. Such performance may not be tolerable in a practical communication system. To reduce interruption, the adaptive optics system in an FSOC system may need to have high error correcting capability, stability, and robustness.

Some existing FSOC systems may use complex optical, electrical, and optoelectronic sub-systems to provide a more robust performance under certain atmospheric conditions. These sub-systems may be large and heavy, and may be difficult to design and manufacture. Therefore, it may take longer time to develop and implement these sub-systems, and the overall cost of the FSOC system may be high. It is desirable to reduce the complexity, size, and weight of the FSOC systems, improve the ability of the FSOC systems for handling atmospheric turbulence, increase the system robustness, and use commercially available off-the-shelf or slightly modified hardware to reduce cost and development time.

According to certain embodiments, an optical head of a terminal of a free-space optical communication (FSOC) system may include an optical antenna (e.g., including one or more telescopes), a gimbal-mounted deformable mirror (GDM), and a wavefront sensor (e.g., a Shack-Hartmann wavefront sensor) that may measure the optical wavefront of a portion of a received light beam. The GDM may be controlled by a controller based on the optical wavefront measured by the wavefront sensor to correct errors in the wavefront. A portion of the received light beam with wavefront corrected by the GDM may be coupled into an optical fiber (e.g., using a collimator such as a lens) and sent to a receiver (e.g., through a circulator) for signal detection and data demodulation. The GDM may be on the transmit path as well, and may pre-compensate phase errors in the transmission path in some implementations. In some embodiments, the GDM may also be used as part of a high-speed adaptive optics system to correct aberrations (e.g., high frequency aberrations) that may not be corrected based on the measured wavefront.

The GDM may also be used for laser beam tracking (e.g., initial acquisition and link maintaining). For example, the micro-gimbals of the GDM may scan a laser beam (e.g., a beacon beam) within a field of regard (FOR), for example, about 1-10 mrad, to provide a flashlight for another terminal to find, and/or may scan within the FOR to find a laser beam transmitted by another terminal. The deformable mirror itself may have a small FOV (e.g., less than about 1 mrad, such as 500 μrad or smaller). In some embodiments, during laser beam acquisition, the deformable mirror mounted on the micro-gimbals may be used to adjust the wavefront of the transmitted laser beam to diverge the transmitted laser beam (e.g., up to about 300 μrad) so that it may be easier for the other terminal to acquire. After the laser beam is found by the other terminal, the deformable mirror may operate in a normal mode, where the deformable mirror may modify the wavefront of the transmitted laser beam to form a narrow beam with low divergence (e.g., about tens of microradians), to achieve a better tracking resolution and accuracy. In some embodiments, if the laser beam is not within the FOR of the GDM, the optical head of an FSOC terminal can be actuated (e.g., rotated and/or tilted) at a low speed (e.g., a few Hz to about 10 Hz) by a gimbal to achieve a wide FOV, such as about 25 mrad, and lock to less than about 1 mrad (e.g., 0.125 mrad).

In the GDM-based FSOC system described herein, a fast steering mirror (FSM) is not needed. The GDM can perform the functions of both the FSM and the deformable mirror, and may be used for both laser beam acquisition and phase aberration correction. One controller can be used to control the beam scanning and phase correction by the GDM. Therefore, the system complexity and alignment requirement may be reduced. The GDM may be used in both the receive path and the transmit path for aberration correction and/or tracking. The GDM may also be used as part of a high-speed adaptive optics system to correct some aberrations that may not be corrected based on the measured wavefront, such as some high spatial and/or temporal frequency aberrations. The GDM may include a reflective coating that has high reflectivity, low absorption, low internal stress, and wide wavelength bandwidth, and can be used to reflect light with high power (e.g., transmitted laser beams at tens of watts) and in a wide wavelength range.

According to certain embodiments, the FSOC system disclosed herein may be a monostatic FSOC system, where the light beam to be transmitted and the received light beam may pass through the same aperture and may be transmitted and received by a same optical antenna (e.g., including one or more telescopes). In some embodiments, the light beam to be transmitted and the received light beam may have slightly different wavelengths. A circulator, a power selector, multiple bandpass filters, and the like may be used to isolate the light beam to be transmitted and the received light beam. The bandpass filter may allow the received light beam to pass through and may block the light beam to be transmitted. A bandpass filter may be used, for example, before the received light is fed to a receiver module so that the light beam to be transmitted may not interfere with received light beam to increase the noise and decrease the signal-to-noise ratio. A bandpass filter may also be used before the wavefront sensor and/or a narrow field of view (NFOV) position sensing detector (PSD) so that the light beam to be transmitted may not interfere with received light beam to cause errors in the wavefront measurement.

In one example, a monostatic free-space optical communication terminal may include an optical antenna configured to receive a laser beam in a first wavelength range through a first aperture, a collimator configured to couple the received light beam into an optical fiber, a receiver subsystem including a first bandpass filter characterized by a pass band including the first wavelength range, a transmitter subsystem configured to generate a laser beam to be transmitted that is characterized by wavelengths in a second wavelength range outside of the pass band of the first bandpass filter, and a circulator coupled to the optical fiber, the receiver subsystem, and the transmitter subsystem. The circulator may be configured to direct the received light beam from the optical fiber to the receiver subsystem, and direct the laser beam to be transmitted from the transmitter subsystem to the optical fiber. The collimator may be configured to collimate the laser beam to be transmitted from the optical fiber. The optical antenna may be configured to transmit the laser beam to be transmitted to atmosphere through the first aperture.

In some embodiments, a field stop (active aperture) having a variable aperture size and multiple operation modes may be used to select the amount of light to the GDM. For example, the active aperture may be configurable to operate in an open mode having a maximum aperture size for laser beam acquisition. The active aperture may also be configurable to operate in a spatial filter mode having a first aperture size, in response to an intensity of the received laser beam greater than a first threshold value. The active aperture may further be configurable to operate in a squinting mode characterized by a second aperture size smaller than the first aperture size, in response to the intensity of the received laser beam greater than the first threshold value but below a second threshold value. The active aperture may additionally be configurable to operate in a closed mode in response to the intensity of the received laser beam greater than the second threshold value.

In some embodiments, the monostatic free-space optical communication terminal may also include a deformable mirror configurable to correct aberrations of the received laser beam, a power selector configurable to split the received laser beam into a first light beam and a second light beam, a second bandpass filter that may allow light in the first wavelength range but not light in the second wavelength range to pass through, a wavefront sensor configured to measure a wavefront of the first light beam filtered by the first bandpass filter, and a controller configured to control the deformable mirror to correct the aberrations of the received laser beam based on the measured wavefront of the first light beam. The power selector may be configured to direct a portion of the laser beam to be transmitted to the deformable mirror, or split the received light beam and the laser beam to be transmitted at a variable ratio. In some implementations, the power selector may include an array of filters characterized by different transmissivity, and a linear actuator configured to slide the array of filters. The deformable mirror may be configured to direct the laser beam to be transmitted to the optical antenna.

In some embodiments, the free-space optical communication terminal may be configured to detect that a power of the received laser beam is below a threshold value, and transmit a message to a terminal that transmitted the received laser beam. The message may request the terminal to increase an amplitude of a transmitted laser beam, scan within an angular range, reduce coherency of the transmitted laser beam, or a combination thereof. The free-space optical communication terminal may be configured to transmit the message using a coding scheme, modulation technique, and/or baud rate that is different from coding schemes, modulation techniques, and/or baud rates for transmitting other data.

In the monostatic FSOC system disclosed herein, most optical components may be shared by the receive subsystem and the transmit subsystem in a terminal. The shared optical components may be mostly reflective optical components that may be able to handle high power. As such, the complexity, size, weight, and cost of each FSOC terminal may be reduced.

According to certain embodiments, aberrations in different spatial and/or temporal frequency bands may be corrected using different techniques. For example, aberrations that may vary slowly in space and/or time (e.g., less than about 10 Hz) may be corrected using slow steering mechanism, such as a gimbal or another slow steering mirror. Aberrations varying at higher frequencies (e.g., time-dependent wavefront aberrations) may be corrected using the micro-gimbals and a MEMS deformable mirror of the GDM, based on the wavefront sensed by a wavefront sensor and using techniques such as Zernike series decomposition. Aberrations having even higher frequencies (and/or under strong scintillation or low optical power) may be corrected using high-speed adaptive optics system. The high-speed adaptive optics system can use algorithms such as a stochastic search algorithm (e.g., stochastic parallel gradient descent (SPGD)), an image-based algorithm, a statistical historic data-based method, a machine-learning based method, a model-based method, a model-free method, and the like, to iteratively correct the wavefront based on, for example, measured image or optical power of the received light beam. In one example, a process of sequential optimization of the speckle pattern in the focal may be performed to iteratively updating the phases of individual speckles to maximize received power. In some implementations, the GDM and wavefront sensor may be used to periodically correct aberrations having lower frequencies, and, within each period, high-speed AO may be used to correct high frequency aberrations at a higher speed. Aberrations having extremely high frequencies may have very low amplitudes and thus may be ignored.

By correcting aberrations in different spatial and/or temporal frequency bands using different components and/or subsystems, the desired aberration correction performance may be achieved and the requirement on the performance of the aberration correction components and/or subsystem may be reduced, such that components with lower cost, lower performance, but more robust and readily available may be used, without sacrificing the performance of the system.

According to certain embodiments, a combination of light in a short-wavelength infrared (SWIR) band (e.g., about 0.7 to about 2.0 μm, such as about 1.55 μm), light in a mid-wavelength infrared (MWIR) band (e.g., about 2 to about 4 μm, such as about 3.5-4 μm), and/or light in a long-wavelength infrared (LWIR) band (e.g., >4 μm, such as about 10 μm) may be used to provide diversity and reliability (and up time), in particular, in adverse environments. For example, LWIR light at about 10 μm may have much lower loss in fog than NIR light at about 1.55 μm. The optical components used in the disclosed FSOC system may be mostly reflective optical components that may have high reflectivity within a wide wavelength band that may cover the SWIR band, the MWIR band, and the LWIR band.

In one example, a free-space optical communication terminal may include a first transmitter configured to transmit data using a first light beam in a short-wavelength infrared band, a second transmitter configurable to transmit data using a second light beam in a mid-wavelength or long-wavelength infrared band, an optical multiplexer coupled to the first transmitter and the second transmitter and configured to multiplex the first light beam and the second light beam into a multiplexed light beam, and a reflective optical antenna configured to transmit the multiplexed light beam into atmosphere towards another terminal.

In another example, a free-space optical communication terminal may include a reflective optical antenna configured to receive a laser beam from atmosphere through a first aperture, the laser beam including at least one of light in a short-wavelength infrared band or light in a mid-wavelength or long-wavelength infrared band. The FSOC terminal may also include a deformable mirror configurable to correct aberrations of the received laser beam, a power selector configurable to split the received laser beam into a first light beam and a second light beam, a wavefront sensor configured to measure a wavefront profile of the first light beam, a controller configured to control the deformable mirror to correct the aberrations of the received laser beam based on the wavefront profile of the first light beam measured by the wavefront sensor, an optical demultiplexer configured to demultiplex the second light beam and separate the light in the SWIR band and the light in the MWIR or LWIR band, a first optical receiver configured to receive the light in the SWIR band from the optical demultiplexer and demodulate data transmitted in the light in the SWIR band, and a second optical receiver configured to receive the light in the MWIR or LWIR band from the optical demultiplexer and demodulate data transmitted in the light in the MWIR or LWIR band.

In yet another example, a free-space optical communication terminal may include a first transceiver configured to transmit and/or receive data using light in a short-wavelength infrared band, a second transceiver configured to transmit and/or receive data using light in a mid-wavelength or long-wavelength infrared band, an optical multiplexer coupled to the first transceiver and the second transceiver, and a reflective optical antenna configured to receive the light beam from the atmosphere or transmit the multiplexed light beam into the atmosphere. The optical multiplexer may be configured to: multiplex the light in the short-wavelength infrared band from the first transceiver and the light in the mid-wavelength or long-wavelength infrared band from the second transceiver into a multiplexed light beam, or demultiplex light in a light beam received from atmosphere into light in the short-wavelength infrared band and light in the mid-wavelength or long-wavelength infrared band.

Due to the longer wavelength, the phase aberrations of LWIR light passing through a medium may be much smaller than the phase aberrations of SWIR light passing through the same medium and experiencing the same optical path length variations. Therefore, the phase aberrations of LWIR light may not need to be corrected or may be corrected using components that may have a lower performance but may be cheaper and more robust. For example, in some implementations, a holographic optical element and a sensor array may be used to measure the wavefront of the LWIR light beam. In some embodiments, wavefront errors of a SWIR laser beam measured using a sensor sensitive to light in the SWIR band may be used to correct wavefront errors of light beams in the MWIR or LWIR band.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 illustrates an example of a communication network 100 that may be implemented using free-space optical communications. Communication network 100 may be a directional point-to-point communication network including network nodes (e.g., communication terminals) on various land-based, sea-based, air-based, or space-based structures, some of which may be mobile and can change position with respect to other nodes in communication network 100 over time. In the illustrated example, communication network 100 may include one or more datacenters 105, one or more land-based nodes 102, one or more sea-based nodes 104 (e.g., ships), and one or more airborne high altitude platforms (HAPs), such as one or more balloons 106, one or more airplanes 108, and one or more satellites 110. It is noted that communication network 100 shown in FIG. 1 is for illustration purposes only. In some implementations, communication network 100 may include additional or different network nodes. For example, in some implementations, communication network 100 may include additional HAPS, such as blimps, unmanned aerial vehicles (UAVs), or any other form of high altitude platforms. In some implementations, communication network 100 may serve as an access network for client devices such as cellular phones, laptop computers, desktop computers, wearable devices, or tablet computers. Communication network 100 may be connected to a larger computer network, such as the Internet, and may be configured to provide a client device with access to resources stored on or provided through the larger computer network.

Some network nodes in communication network 100 may communicate with each other using wireless communication links through the atmosphere. In some implementations, at least some nodes in communication network 100 may include wireless transceivers associated with a cellular or other mobile network, such as eNodeB base stations or other wireless access points, such as WiMAX or UMTS access points. Some land-based nodes 102, sea-based nodes 104, balloons 106, airplanes 108, and satellites 110 may communicate with datacenter 105 directly (e.g., through RF communication with an antenna of datacenter 105), through the Internet, through a network nodes (e.g., a land-based node 102), or through backbone network links or transit networks operated by third parties. Land-based nodes 102, sea-based nodes 104, balloons 106, airplanes 108, and satellites 110 may provide wireless access for the users, and can route user requests to the datacenters 105 and return responses to the users via the backbone network links.

Datacenters 105 may include servers hosting applications that can be accessed by remote users and systems that monitor and control the nodes of communication network 100. In some implementations, datacenter 105 may implement a software platform for orchestrating land-based nodes 102, sea-based nodes 104, balloons 106, airplanes 108, and satellites 110, and other land-based networks. For example, the software platform may optimize and continually evolve the network link scheduling, traffic routing, and spectrum resources in real time. In one example, the software platform may provide information (e.g., location information) to two nodes that need to establish a point-to-point direct optical link between the two nodes, so that the two nodes can find each other in the three-dimensional space and establish the direct optical link. In some embodiments, datacenter 105 may operate networks across land, sea, air, and space, at any altitude or orbit type, support many radio frequency bands and optical wavelengths, and may be designed for interoperability with legacy, hybrid space, 5G new radio, non-terrestrial network (NTN), and future generation network architectures.

Some nodes of communication network 100 may be configured to communicate with one another using steerable wireless transceivers. For example, land-based nodes 102, sea-based nodes 104, balloons 106, airplanes 108, and satellites 110 may include optical transceivers and thus may directly communicate with each other using point-to-point optical links through the atmosphere. The optical transceivers may be mounted to actuators (e.g., gimbals) that may be controlled to point in a desired direction. To form a link between two nodes, the transceivers of the respective nodes can be controlled (e.g., based on information received from datacenter 105) to point in the direction of one another so that data can be transmitted and received between the two nodes. In some implementations, some of the nodes may include transceivers with omnidirectional antennas and therefore are not required to be steered towards other nodes to form communication links. Some of the nodes may include directional transceivers whose positions and pointing directions may be fixed. In some implementations, parameters associated with each transceiver may be controlled to facilitate formation of the links in communication network 100. For example, nodes having steerable directional antennas can be controlled to point in the direction of nodes with which they are to establish links. In addition, the power of the signals transmitted by each transceiver can also be controlled to facilitate formation of the links in communication network 100. For example, transceivers of nodes that are separated by a relatively large distance can be configured to operate at a higher power to compensate for the loss of signal-to-noise ratio that occurs over the distance separating the two nodes. Transceivers of nodes that are spaced nearer to one another may be controlled to operate at a relatively low power so as to save power. The communication channels and protocols for pairs of nodes that are to establish links can also be controlled to facilitate the formation of the links in communication network 100.

In general, each directional transceiver can be aimed at only one other transceiver at a given time, and each transceiver may be able to operate at a sufficiently high power level in order to form a link with a transceiver of another node. Omnidirectional nodes may only be capable of forming a limited number of simultaneous communication links and may transmit or receiver data at a low bandwidth in each communication link. As a result, the feasible topologies and available bandwidth for communication network 100 at a given time may be constrained. For example, each network node may have a fixed number of transceivers, and thus the number of links coupling a first node to other nodes (sometimes referred to as the degree of the first node) may not be greater than the number of transceivers associated with the first node. Furthermore, the maximum range for each transceiver may be limited by the maximum power output for the transceiver, and therefore a link may not be established between a pair of nodes that are separated by a distance that exceeds the maximum range for either one of the transceivers. In some implementations, the maximum power output for a transceiver can be constrained based on a variety of factors, such as a battery level, weather conditions that may impact solar power generation rates, remaining flight time for a HAP, and the like.

Further constraint on the feasible topologies of communication network 100 may include the requirement that the path between a pair of nodes should be clear of obstructions in order for the nodes to form a line-of-sight link. In some implementations, the relative motion of the nodes in communication network 100 may prevent the formation of links at some points in time. For example, a link between a balloon 106 (or an airplane 108) and a land-based node 102 (land station) may become unreliable, unfeasible, or unavailable at times during which clouds, mountains, buildings, or other obstacles are positioned between the two nodes. Thus, movement of some nodes, as well as external events such as weather or failure of one or more transceivers, may limit the nodes that are reachable from a given node at a given time in communication network 100. As result, links and routing information may need to be continuously updated based on the respective locations of the network nodes and other properties of the network nodes to maintain connectivity across communication network 100 over time. In some implementations, an input graph representing all of the possible links that can be formed in the network at a given time can be generated and processed to generate a subgraph that conforms to the constraints discussed above while satisfying any provisioned network flows.

As described above, free-space optics communication (FSOC) may offer an alternative to radio frequency (RF) and microwave communication in modern wireless communication due to its high data rate, high capacity, cost-effectiveness, free license spectrum, excellent security, rapid deployment, and the like. For example, in a free-space optical communication system, a transmitter may transmit data at a data rate greater than about 1 Gbps, greater than about 10 Gbps, greater than about 100 Gbps, greater than about 1 Tbps, or higher. However, optical signals transmitted through the atmosphere may be affected by the atmosphere before arriving at a line-of-sight receiver. Atmospheric effects, such as atmospheric turbulence, may deteriorate free-space laser beam transmission by reducing the overall optical power level received by a detector of the receiver due to atmospheric attenuation, and/or causing random optical power fluctuations in the received signal resultant from beam deformation, scintillation effects, beam wander, and the like. To overcome such effects of the atmosphere on the transmitted laser beam, adaptive optics may be used to correct the phase perturbations (aberrations) in the received light beam, such that the received light beam may be focused into a single symmetric (e.g., circular) light spot that can be more efficiently coupled into the fiber. An adaptive optics system may generally estimate the phase perturbations (aberrations) of the received light beam and generate additional phase changes conjugated with the estimated phase perturbations in the received light beam (e.g., using a deformable mirror or an SLM) to compensate for the disturbances. In many AO systems, the performance of phase-only AO compensation may be limited due to, for example, limited accuracy and/or resolution of the phase aberration estimation or measurement, and/or limited phase compensation range, resolution, accuracy, and speed of the phase compensation components (e.g., deformable mirrors or SLMs).

Figure 2:
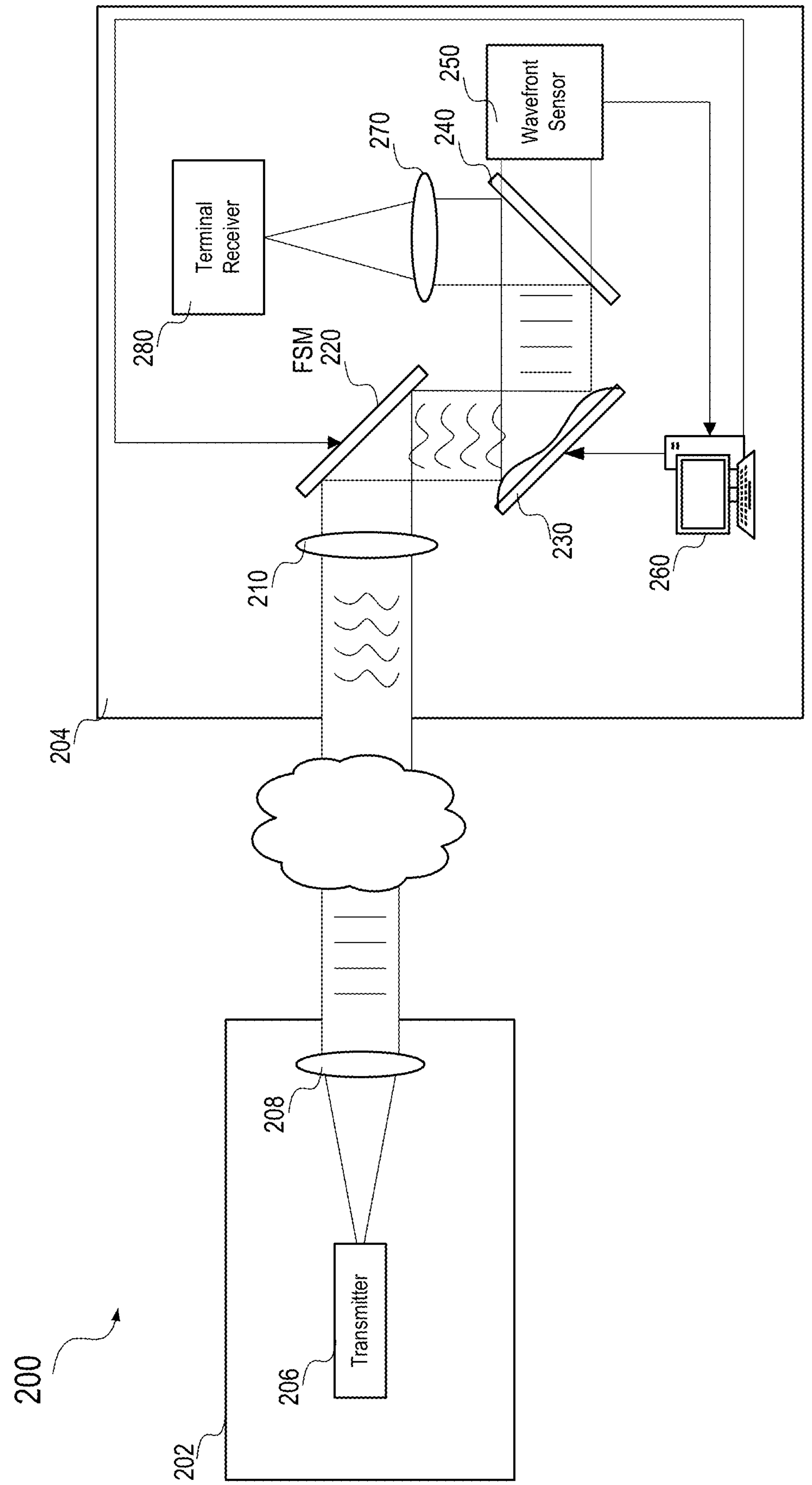
FIG. 2 illustrates an example of a point-to-point free-space optical communication system.

FIG. 2 illustrates an example of a point-to-point free-space optical communication system 200. In the example illustrated in FIG. 2, FSOC system 200 includes two terminals 202 and 204 in a point-to-point optical link through atmosphere. Terminals 202 and 204 may be mounted to any of the network nodes of communication network 100 described above with respect to FIG. 1. Terminal 202 may include a transmitter 206 configured to generate optical signals that are modulated using data to be transmitted. Terminal 202 may also include an optical antenna 208 configured to substantially collimate the optical signals to form a laser beam with a small divergence angle and transmit the laser beam towards terminal 204. The transmitted laser beam at the output aperture of terminal 202 may be a plane wave having a flat wavefront.

During the propagation in the atmosphere, the transmitted laser beam may be distorted by atmospheric turbulence, and thus may have phase and amplitude fluctuations across the laser beam and over time as described above. As such, the laser beam received by the optical antenna 210 of terminal 204 may be distorted in both amplitude and phase, which, if not corrected, may cause random fading in the signal received by a terminal receiver 280 of terminal 204. For example, the phase distortion in the pupil plane (e.g., input aperture of optical antenna 208) may cause intensity speckles in a focal plane. To correct the wavefront distortions, adaptive optics systems may generally be used to measure the wavefront distortions and correct the wavefront accordingly.

In the example shown in FIG. 2, terminal 204 may include a fast steering mirror (FSM) 220, which may be controlled to steer the light beam received by optical antenna 210 to correct the angle of incidence. FSM 220 may steer the received light beam towards a deformable mirror 230 or another phase correction device, such as a liquid crystal device or a spatial light modulator. Deformable mirror 230 may be controlled to change the shape of its reflective surface, thereby applying appropriate phase delays to different regions of the received light beam to change the wavefront of the received light beam. The light beam reflected by deformable mirror 230 may be split by a beam splitter 240, where a portion of the light beam may be directed towards a wavefront sensor 250, whereas the other portion of the light beam may be directed to terminal receiver 280 by optics 270. Wavefront sensor 250 may measure the wavefront of the received light beam. The measured wavefront may be used by a controller 260 to control deformable mirror 230 and/or FSM 220. The control loop may allow real-time control of FSM 220 and the deformable mirror surface, such that the phase delays applied by the deformable mirror to the received light beam may compensate the phase aberrations of the received light beam to achieve a substantially flat wavefront. As such, optics 270 may form a single light spot on the image plane (e.g., an input port of a single-mode fiber of terminal receiver 280).

Due to the high loss in atmosphere in long distance FSOC links, the transmitting terminal of a link may need to transmit light with high power, such as a few watts or tens of watts, while the receiving terminal may only receive a small portion (e.g., in milli-watt to micro-watt range) of the light transmitted by another terminal. Thus, even if only a small portion of the light to be transmitted is leaked into the receive path and received by the terminal receiver (e.g., terminal receiver 280), noise in the received light signal may be significantly increased and the signal-to-noise ratio of the received signal may be significantly reduced. In many FSOC systems, to avoid the interference of the light to be transmitted with the received light, a FSOC terminal may include separate transmit path and received path, where the light beam to be transmitted and the received light beam may pass through different optical apertures of the FSOC terminal.

Figure 3A:
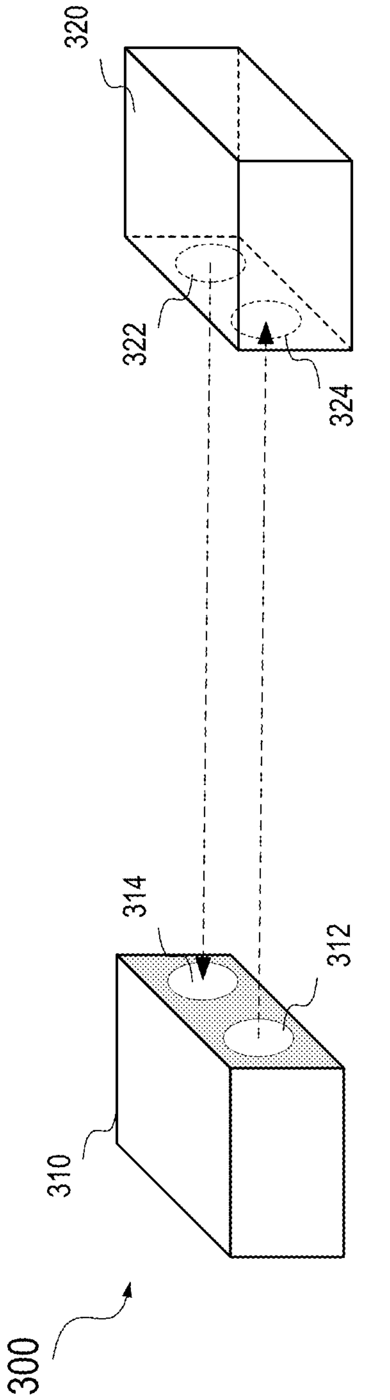
FIG. 3A illustrates an example of a bistatic free-space optical communication system.

FIG. 3A illustrates an example of a bistatic FSOC system 300. In the illustrated example, a first FSOC terminal 310 may include a transmit subsystem 312 and a receive subsystem 314, where transmit subsystem 312 and receive subsystem 314 may use different optical apertures and different optical antennas and other optics. Similarly, a second FSOC terminal 320 may include a transmit subsystem 322 and a receive subsystem 324, where transmit subsystem 322 and receive subsystem 324 may use different optical apertures and different optical antennas and other optics. When a communication link is established between FSOC terminals 310 and 320, transmit subsystem 312 may transmit light signals to FSOC terminal 320, which may receive the light signals from FSOC terminal 310 using receive subsystem 324. Similar, transmit subsystem 322 may transmit light signals to FSOC terminal 310, which may receive the light signals from FSOC terminal 320 using receive subsystem 314.

Since each bistatic FSOC terminal may need to include separate transmit subsystem and receive subsystem, the bistatic FSOC terminal may include more components (e.g., two sets of optical antennas and other optics). As such, the bistatic FSOC terminal may be complex, bulky, heavy, more expensive, and more difficult to steer. For many FSOC terminals, such as airborne FSOC terminals, it is desirable that the FSOC terminal can be smaller, lighter, cheaper, and easier to steer.

Figure 3B:
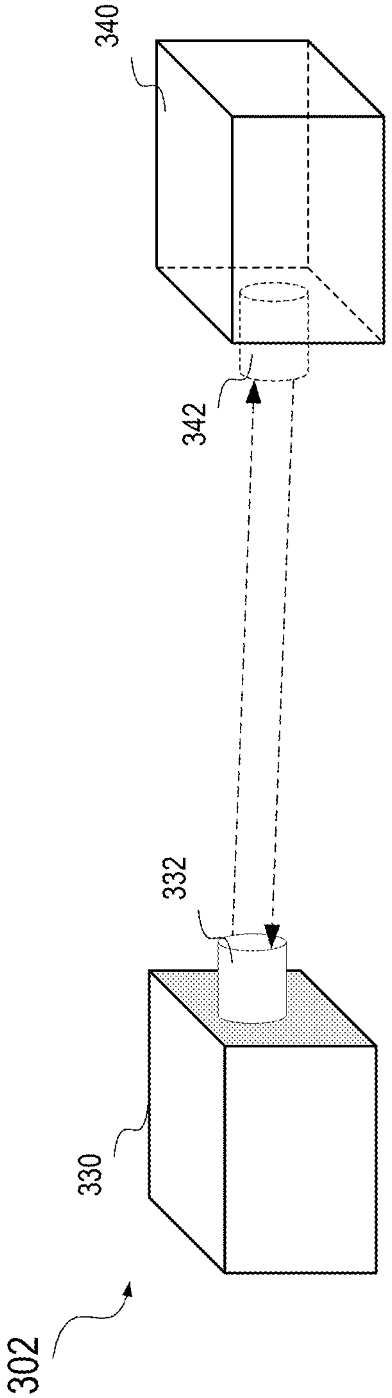
FIG. 3B illustrates an example of a monostatic free-space optical communication system.

FIG. 3B illustrates an example of a monostatic free-space optical communication system 302. In the illustrated example, a first FSOC terminal 330 may include a transceiver system 332, where light to be transmitted into atmosphere and light received from the atmosphere may pass through a common aperture and a common optical path (e.g., a same optical antenna). Similarly, a second FSOC terminal 340 may include a transceiver system 342, where light to be transmitted into atmosphere and light received from the atmosphere may pass through a common aperture and a common optical path. When a communication link is established between FSOC terminals 330 and 340, transceiver system 332 may transmit light signals to FSOC terminal 340 using a light beam in a first infrared wavelength band, and transceiver system 342 of FSOC terminal 340 may receive the light signals transmitted from FSOC terminal 330. Transceiver system 342 of FSOC terminal 340 may simultaneously transmit light signals to FSOC terminal 330 using a light beam in a second infrared wavelength band, and transceiver system 332 of FSOC terminal 330 may receive the light signals transmitted from FSOC terminal 340.

Since each monostatic FSOC terminal as shown in FIG. 3B may use the same optical antenna and some other common optical components for both transmitting optical signals and receiving optical signals, the terminal may use fewer component, and may be less complex, smaller, lighter, cheaper, and easier to steer. However, it can be very challenging to isolate the light signals to be transmitted from the received light signals to prevent the light signals to be transmitted from contaminating the received light signals.

Figure 4:
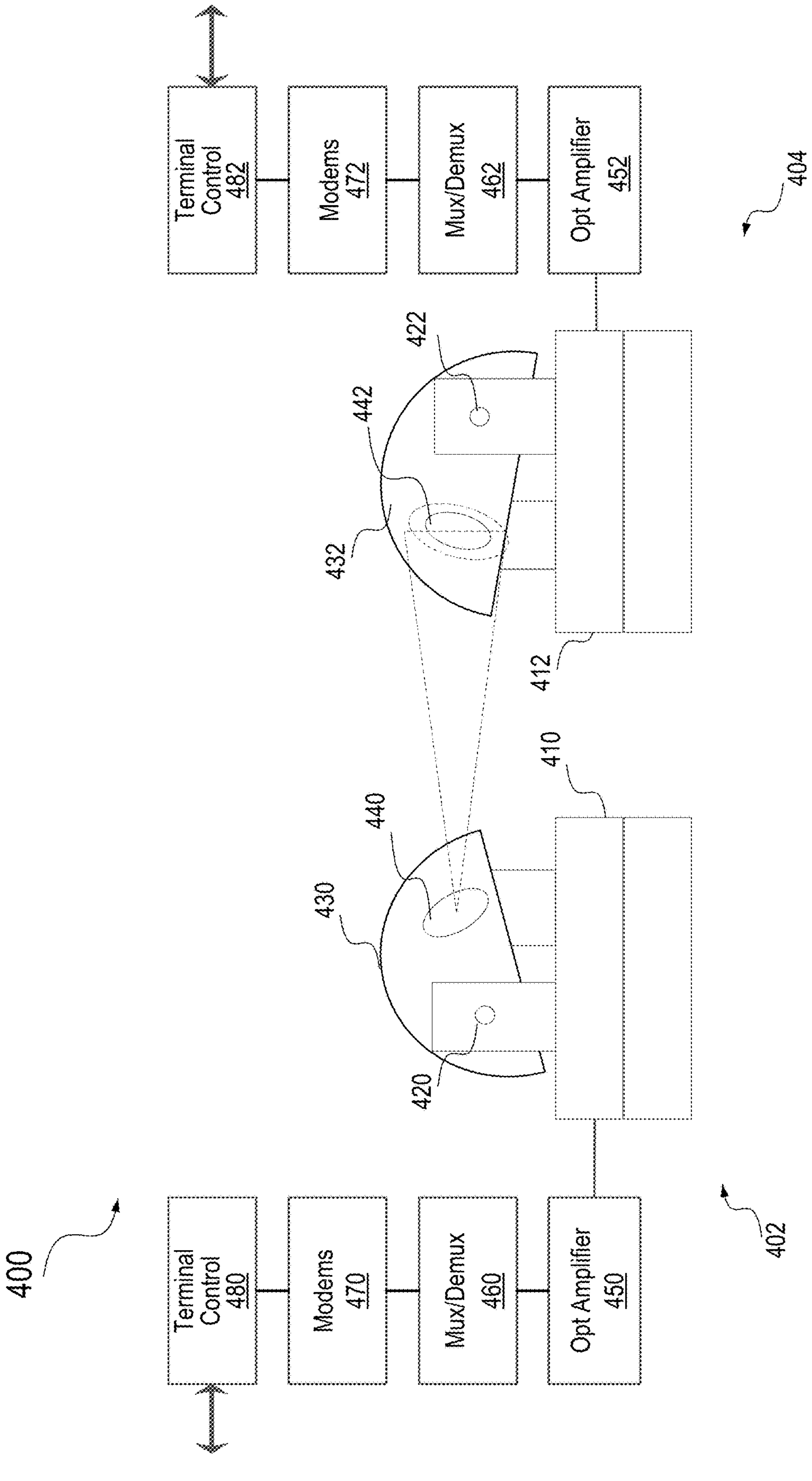
FIG. 4 includes simplified block diagrams of examples of terminals in a free-space optical communication system according to certain embodiments.

FIG. 4 includes simplified block diagrams of examples of terminals in a free-space optical communication system 400 according to certain embodiments. A first terminal 402 of FSOC system 400 may include a station 410, which may be fixed or may be steerable (e.g., rotatable). A terminal head 430 of first terminal 402 may be coupled to station 410 through a gimbal structure 420, which may pivot, tilt, rotate terminal head 430 and, alone or in combination with station 410, steer terminal head 430 such that a transmit/receive aperture 440 on terminal head 430 of first terminal 402 may face a second terminal 404 for communication with a second terminal 404. Terminal head 430 may include one or more optical antennas for transmitting and/or receiving laser beams, and may also include adaptive optics for aberration correction. For example, first terminal 402 may be a monostatic FSOC terminal as described above with respect to FIG. 3B and described in more detail below. First terminal 402 may include a back end that may include, for example, one or more optical amplifiers 450 (e.g., one or more EDFAs) that may amplify the received light beam or the light beam to be transmitted. A multiplexer/demultiplexer 460 of the back end may multiplex modulated light beams from multiple modulator/demodulators (modems) 470 (and in multiple wavelength bands) into a single light beam to be transmitted, and may demultiplex a received light beam into multiple light beams in different respective wavelength bands, which may then be detected and demodulated by multiple modems 470. The back end of first terminal 402 may also include a terminal control module 480 that may include other circuits, software, and/or firmware, such as network interface cards, network switch, power management circuits, controllers, user interfaces, and the like.

Similarly, second terminal 404 may include a station 412, which may be fixed or may be steerable (e.g., rotatable). A terminal head 432 of second terminal 404 may be coupled to station 410 through a gimbal structure 422, which may rotate terminal head 432 and, alone or in combination with station 412, steer terminal head 432 such that a transmit/receive aperture 442 of second terminal 404 may face first terminal 402 for point-to-point optical communication with first terminal 402. Terminal head 432 may include one or more optical antennas for transmitting and/or receiving laser beams, and may also include adaptive optics for aberration correction. For example, second terminal 404 may be a monostatic FSOC terminal as described above with respect to FIG. 3B and described in more detail below. Second terminal 404 may include a back end that may include, for example, one or more optical amplifiers 452 (e.g., EDFAs) that may be used to amplify the received light beam or the light beam to be transmitted. Second terminal 404 may also include a multiplexer/demultiplexer 462 that may be used to multiplex modulated light beams from multiple modems 472 (and in multiple wavelength bands) into a single light beam to be transmitted, or may demultiplex a received light beam into multiple light beams in different respective wavelength bands, which may be detected and demodulated by multiple modems 472. The back end may also include a terminal control module 482 that may include other circuits, software, and/or firmware, such as a network interface card, a network switch, power management circuits, one or more controllers, a user interface, and the like.

To start a communication link between first terminal 402 and second terminal 404, first terminal 402 may receive information (e.g., location information) of second terminal 404, and may steer terminal head 430 to point to second terminal 404 and transmit a laser beam (e.g., a beacon beam) towards second terminal 404. Additionally or alternatively, second terminal 404 may receive information (e.g., location information) of first terminal 402, and may steer terminal head 432 to point to first terminal 402 and transmit a laser beam towards first terminal 402. First terminal 402 may steer terminal head 430 to try to acquire the laser beam transmitted by second terminal 404 to establish a link between first terminal 402 and second terminal 404. Additionally or alternatively, second terminal 404 may steer terminal head 432 to try to acquire the laser beam transmitted by first terminal 402 to establish a link between first terminal 402 and second terminal 404. Data transmission may begin after the link is established.

During the data transmission, light beams received by the optical antenna of a terminal may be corrected by adaptive optics of the terminal and coupled into a terminal receiver for light detection and signal demodulation as described with respect to, for example, FIG. 2. In many AO systems, the performance of phase-only AO compensation may be limited due to, for example, limited accuracy and/or resolution of the phase aberration estimation or measurement, and/or limited phase compensation range, resolution, accuracy, and speed of the phase compensation components (e.g., deformable mirrors or SLMs). For example, real-time adaptive optics may need to use phase wavefront measurement results, which may be difficult to measure in some communication scenarios. According to certain embodiments, to improve the performance of the adaptive optics system of an FSOC terminal, aberrations in different spatial and/or temporal frequency bands may be corrected using different techniques.

Figure 5:
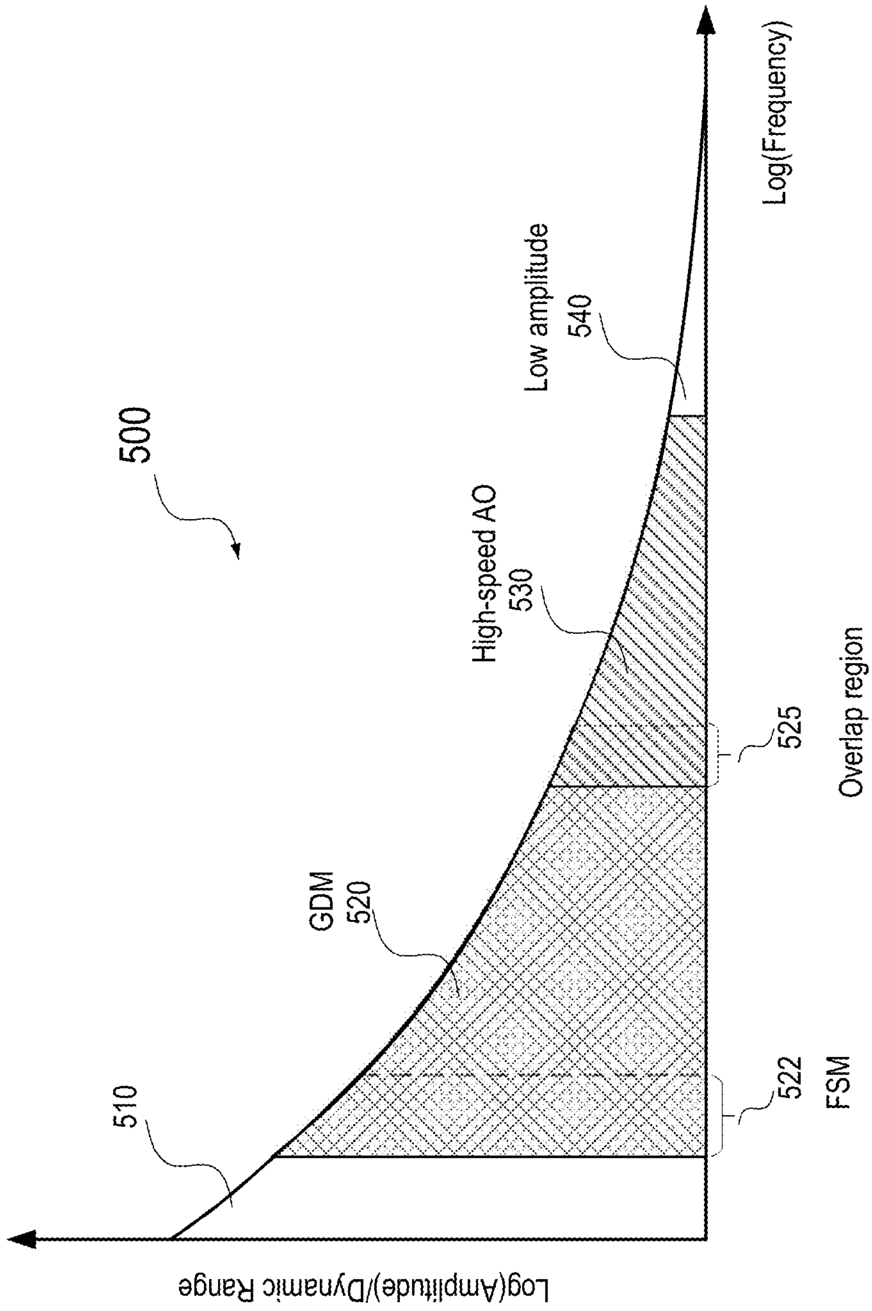
FIG. 5 illustrates an example of hybrid aberration correction in a free-space optical communication system according to certain embodiments.

FIG. 5 illustrates an example of hybrid aberration correction in a free-space optical communication terminal according to certain embodiments. A diagram 500 in FIG. 5 shows the amplitudes of aberrations at different frequencies. In the illustrated example, aberrations in a region 510 that may have a low spatial and/or temporal frequency (e.g., less than about 10 Hz) may be corrected using some slow steering mechanisms, such as a gimbal (e.g., gimbal structure 420) or another slow steering mirror. Aberrations varying at higher frequencies (e.g., time-dependent wavefront aberrations) as shown by a region 520 may be corrected using a fast steering mirror, and/or a gimbaled deformable mirror (GDM) based on the wavefront of the laser beam sensed by a wavefront sensor and using techniques such as Zernike series decomposition. A subregion 522 of region 520 in FIG. 5 shows aberrations that may be corrected using a fast steering mirror.

Aberrations having even higher frequencies as shown by a region 530 (and/or under strong scintillation or low optical power) may be corrected using a high-speed adaptive optics system. The high-speed adaptive optics system can use algorithms such as a stochastic search algorithm (e.g., stochastic parallel gradient descent (SPGD)), an image-based algorithm, a statistical historic data-based method, a machine-learning based method, a model-based method, a model-free method, and the like, to iteratively correct the wavefront based on, for example, measured image or optical power of the received light beam. In one example, a process of sequential optimization of the speckle pattern in the focal plane may be performed to iteratively update the phases of individual speckles to maximize received power. There may be an overlapped region 525 between the frequency band of the aberrations that may be corrected by the GDM based on measured wavefront and the frequency band of the aberrations that may be corrected using high-speed adaptive optics. In one implementation, the GDM and wavefront sensor may be used to periodically correct aberrations in region 520, and, within each period, high-speed AO may be used to correct high frequency aberrations at a higher speed. Aberrations having extremely high frequencies as shown by a region 540 may have very low amplitudes and thus may be ignored. More details of the implementation of the hybrid aberration correction technique disclosed herein are described below.

Figure 6:
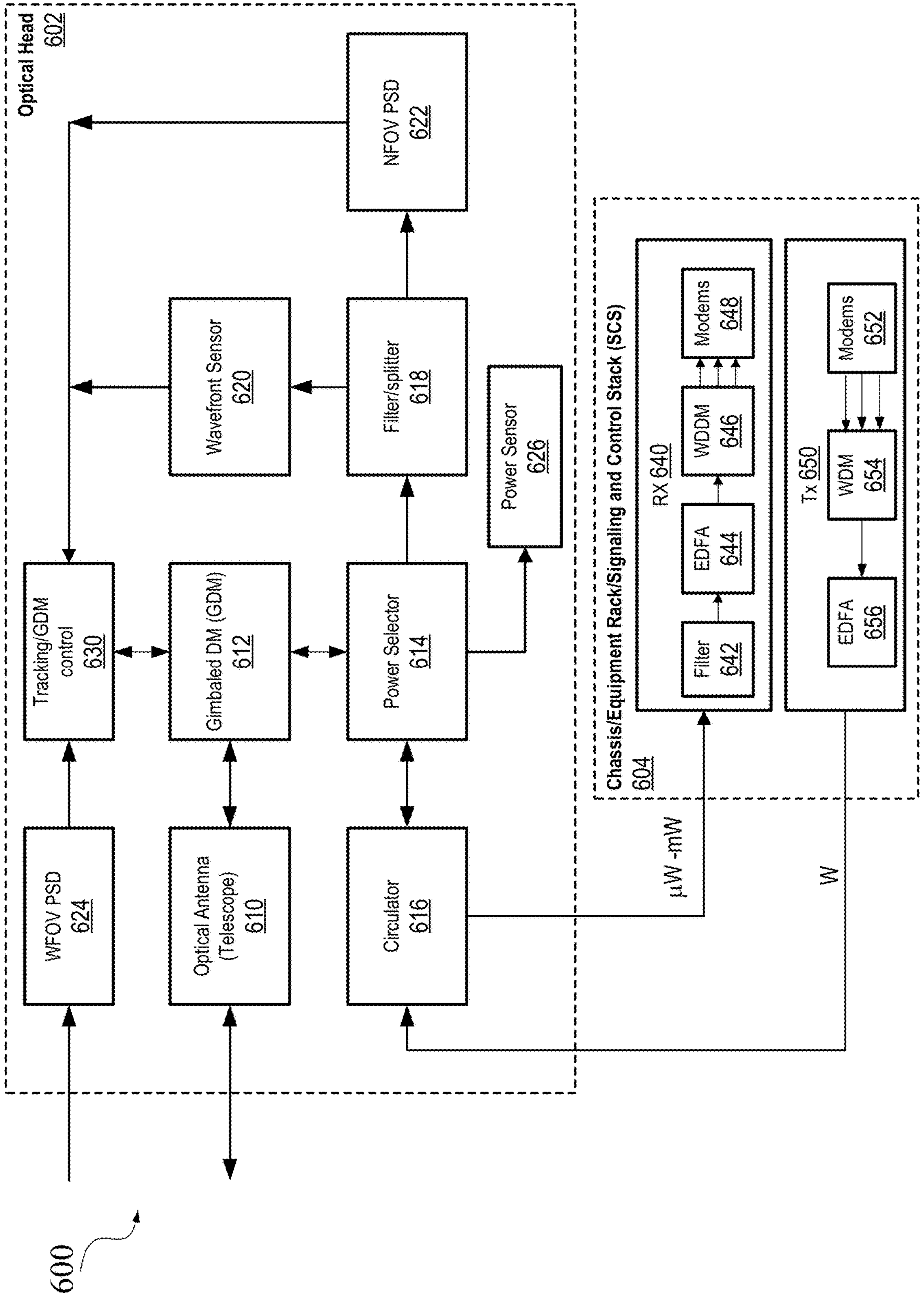
FIG. 6 illustrates a block diagram of an example of a free-space optical communication terminal according to certain embodiments.

FIG. 6 illustrates a block diagram of an example of a free-space optical communication terminal 600 according to certain embodiments. In the illustrated example, FSOC terminal 600 may be a monostatic FSOC terminal, and may include an optical head 602 and a chassis 604 (also referred to herein as equipment rack or signaling and control stack (SCS)). It is noted that FIG. 6 is for illustrative purposes only. In various embodiments, some system blocks shown in FIG. 6 may be optional, some other system blocks may be added to FSOC terminal 600, and/or the system blocks of FSOC terminal 600 may be partitioned in different manners.

In the illustrated example, optical head 602 may include an optical antenna 610, a gimbaled deformable mirror (GDM) 612, a power selector 614, a circulator 616, a beam splitter 618, a wavefront sensor 620, and a tracking/GDM controller 630. Optical antenna 610 may include one or more telescopes, and may be used to demagnify a received light beam and magnify a light beam to be transmitted. GDM 612 may be used to correct the angle of incidence of the received light beam from optical antenna 610 or the light beam to be transmitted. Power selector 614 may be used to direct a portion of the received light beam to circulator 616, and direct a portion of the received light beam to beam splitter 618. Power selector 614 may also be used to direct a portion of the light beam to be transmitted from circulator 616 to GDM 612 and direct a portion of the light beam to be transmitted to a power sensor 626 for measuring the power of the light beam to be transmitted. Circulator 616 may include at least three ports, where light input from the first port may be output at a second port and light input from a third portion may be output at the first port. Circulator 616 may be used to direct the received light beam from power selector 614 (e.g., optically coupled to the first port of circulator 1616 through a collimator and an optical fiber) to a receive subsystem 640 (e.g., optically coupled to the second port of circulator 1616 through an optical fiber) of chassis 604 for light signal detection and demodulation. Circulator 616 may also be used to direct the light beam to be transmitted from a transmit subsystem 650 (e.g., optically coupled to the third port of circulator 1616 through an optical fiber) of chassis 604 to power selector 614 so that a portion of the light beam to be transmitted may be directed to GDM 612 and optical antenna 610 for transmitting. A collimator (not shown in FIG. 6) or another coupler may be used to focus and couple the received light beam into an optical fiber (not shown in FIG. 6) that may be coupled to a port of circulator 616, and may also be used to collimate a light beam to be transmitted from circulator 616 through the optical fiber. Beam splitter 618 may be used to split a portion of the received light beam from power selector 614 into two beams and direct the two beams toward wavefront sensor 620 and a narrow field of view (NFOV) position sensitive detector (PSD) 622, respectively. Wavefront sensor 620 may include, for example, a Shack-Hartmann wavefront sensor, and may be used to measure the wavefront profile of the received light beam. The measured wavefront profile of the received light beam may be used by tracking/GDM controller 630 to control GDM 612 to correct the wavefront of the received light beam.

In order for two terminals to establish a point-to-point link for data communication, a terminal may need to shine a high-power and broad beacon beam for the other terminal to find, before using narrower beams for high data rate communication. Therefore, in addition to transmitting and receiving light beams for data communication, optical head 602 may include components for acquiring and tracking a beacon beam and controlling actuators to steer optical head 602 until the beacon beam forms an image at the center of a position sensitive detector. Optical head 602 may also include components for transmitting and/or scanning a beacon beam for another terminal to locate FSOC terminal 600. In the example shown in FIG. 6, optical head 602 may include a wide field of view (WFOV) PSD 624 that may have a wider field of view but may have a lower resolution. WFOV PSD 624 may acquire the beacon beam through a separate window. The measurement results of WFOV PSD 624 may be used for coarse beacon beam tracking. NFOV PSD 622 may have a smaller field of view but may have a higher resolution, and the measurement results of NFOV PSD 622 may be used for more accurate beacon beam tracking. In some implementations, GDM 612 may be controlled by tracking/GDM controller 630 for beacon beam acquisition and tracking. For example, GDM 612 may be controlled by tracking/GDM controller 630 to scan a beacon beam to be transmitted within a certain field of regard, such that the transmitted beacon beam may be found by another terminal. GDM 612 may also be controlled to change the wavefront of a beacon beam to be transmitted, so that the beacon beam may be diverged to have a large divergence angle and thus could be acquired by a terminal within a large region. GDM 612 may also be controlled to change the direction of a received beacon beam so that the received beacon beam may be imaged onto a center of NFOV PSD 622.

Chassis 604 may process the received light beam to decode the transmitted data and may generate data modulated light beam for transmitting to another terminal. In chassis 604, the receive path and the transmit path may be separate or may partially overlap. Receive subsystem 640 of chassis 604 may include an optical filter 642, one or more EDFAs 644, a wavelength-division demultiplexer (WDDM) 646, and one or more modems 648. Optical filter 642 may filter out any stray light that is not in the passband of optical filter 642, such as light from the light beam to be transmitted by FSOC terminal 600 or ambient light. The one or more EDFAs 644 may amplify the received light beam that may have a low power. WDDM 646 (e.g., including a grating or a waveguide device) may split the received light beam into multiple beams having light within different respective narrow wavelength ranges. In some implementations, multiple add/drop modules may be used to split the received light beam into multiple beams having light within different respective narrow wavelength ranges, where each add/drop module may “drop” light in a respective narrow wavelength range so that the dropped light may be demodulated by a modem 648 to decode the transmitted data. Each modem 648 may include an optical demodulator and a high-speed photodetector, or may include a high-speed photodetector and an electrical demodulator.

Transmit subsystem 650 of chassis 604 may include one or more modems 652 (e.g., including optical modulators), a wavelength division multiplexer (WDM) 654 (or multiple optical add/drop modules), and one or more EDFAs 656.

Modems 652 may be used to modulate laser beams of different respective wavelengths using data to be transmitted. The modulated laser beams may be multiplexed into a single laser beam using WDM 654 or multiple add/drop modules. The output laser beam of WDM 654 may be amplified by one or more EDFAs 656 to boost the power of the light beam to, for example, several watts or several tens of watts. The amplified laser beam may be directed, through circulator 616, to power selector 614, GDM 612, and optical antenna 610 for transmission.

Figure 7:
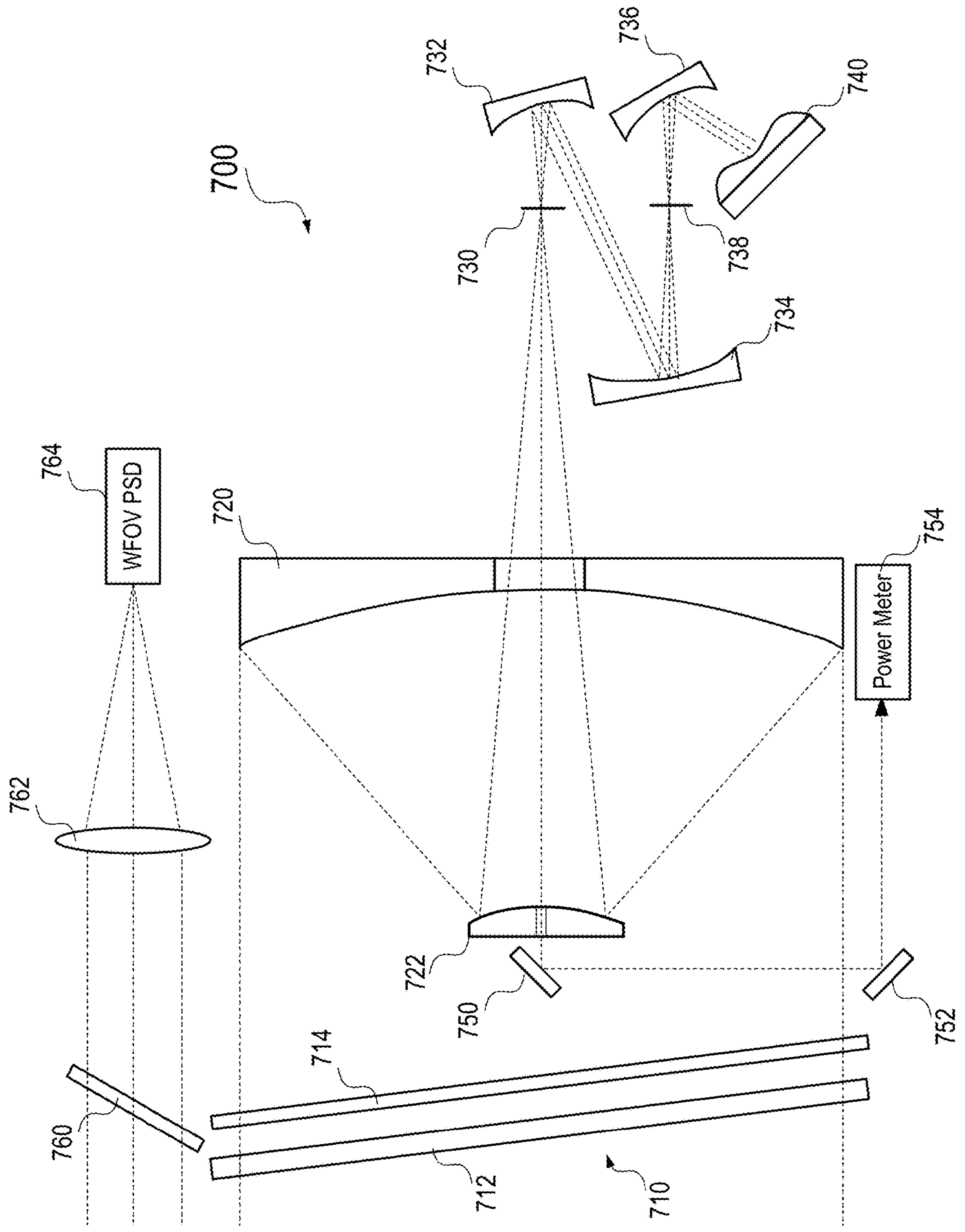
FIG. 7 illustrates an example of an optical front end in an optical head of a free-space optical communication terminal according to certain embodiments.

FIG. 7 illustrates an example of an optical front end in an optical head 700 of a free-space optical communication terminal according to certain embodiments. Optical head 700 may be an example of optical head 602 of FIG. 6. In the illustrated example, optical head 700 may include a system window 710 and an optical antenna that may include two telescopes made of reflective mirrors. Optical head 700 may receive laser beams from atmosphere through system window 710, and may also transmit laser beams into atmosphere through system window 710. The optical antenna may be used to demagnify a received laser beam so that the received laser beam may be coupled into an optical fiber and sent to a modem. The optical antenna may also be used to magnify a laser beam to be transmitted so that the transmitted laser beam may have a low divergence angle.

System window 710 may include, for example, an outer layer 712 and an inner layer 714. Outer layer 712 of system window 710 may allow infrared to pass through and may be used to seal and protect other components inside optical head 700. Outer layer 712 may also be water-resistive and heat resistive. In one example, outer layer 712 may include a silicon substrate with a coating, such as an antireflective coating, a hydrophobic coating, an abrasion-resistant coating, or a combination thereof. Inner layer 714 may be used to, for example, block solar light or other background light that may interfere with the light for data communication. Inner layer 714 may include, for example, a transparent substrate with a solar-blocking coating, one or more band-pass filters, an antireflective coating, or a combination thereof. In some embodiments, outer layer 712 and/or inner layer 714 may include a heater for heating system windows and removing water, ice, frost, and the like.

In the example shown in FIG. 7, the optical antenna may include a first telescope and a second telescope. The first telescope may be a Cassegrain telescope (or a modified Cassegrain telescope or another type of telescope) that includes a primary mirror 720 and a secondary mirror 722. Primary mirror 720 may be a concave mirror with a large aperture (the system aperture), and may focus a received laser beam and direct the laser beam towards secondary mirror 722, which may be a concave mirror or a convex mirror. Secondary mirror 722 may direct the focused laser beam to a center region of primary mirror 720 that may be a transmission region and may allow the focused laser beam to pass though. In some embodiments, a center region of secondary mirror 722 may be a transmission region and may allow a portion of the focused laser beam from primary mirror 720 to pass through and be directed by mirrors 750 and 752 to a power meter 754. Power meter 754 may measure the power of the received portion of the laser beam, and the outputs of power meter 754 may be used to, for example, estimate the total power of the received laser beam. In some embodiments, the center region of secondary mirror 722 may be used to transmit a beacon beam that may have a large divergence angle. For example, the beacon beam may pass through the center region of primary mirror 720 and the center region of secondary mirror 722 into the atmosphere.

A field stop 730 may be positioned at or near a focal point of the Cassegrain telescope to spatially filter the received laser beam, such as removing some speckles at the peripheral regions of the received laser beam. In some embodiments, field stop 730 may be an active aperture, the size of which may be adjusted based on, for example, the operation mode of optical head 700, the power of the received laser beam, and the like. The filtered laser beam may be further demagnified by the second telescope, which may relay the system aperture to the optical back end of optical head 700. In the illustrated example, the second telescope may include a mirror 732, a mirror 734, and a mirror 736. Mirror 732 and mirror 734 may focus the received laser beam, and a field stop 738 may be positioned at a focal point. Field stop 738 may also be an active aperture. Mirror 736 may collimate the received laser beam to form a substantially collimated laser beam with a small beam size, and direct the collimated laser beam towards a deformable mirror 740. The second telescope may relay the system aperture (e.g., primary mirror 720) to deformable mirror 740 by forming an image of primary mirror 720 on deformable mirror 740. Deformable mirror 740 may tune the wavefront of the laser beam to correct aberrations as described in detail above and below. Using telescopes formed by reflective optical devices may fold the light path, thereby reducing the physical dimensions of the optical antenna.

In some embodiments, optical head 700 may also include a wide field of view (WFOV) beam position sensing system for laser beam (e.g., beacon beam) acquisition and tracking. The WFOV beam position sensing system may receive a portion of a laser beam through system window 710 or a separate window 760, and may form an image of the received laser beam on a WFOV PSD 764 using a lens assembly 762. Based on the position of the image of the received laser beam on WFOV PSD 764, the direction of the laser beam (beacon beam) and the line of sight direction of the terminal that transmits the laser beam may be estimated, and optical head 700 may be oriented accordingly to position the image of the received laser beam at the center of WFOV PSD 764.

Figure 8:
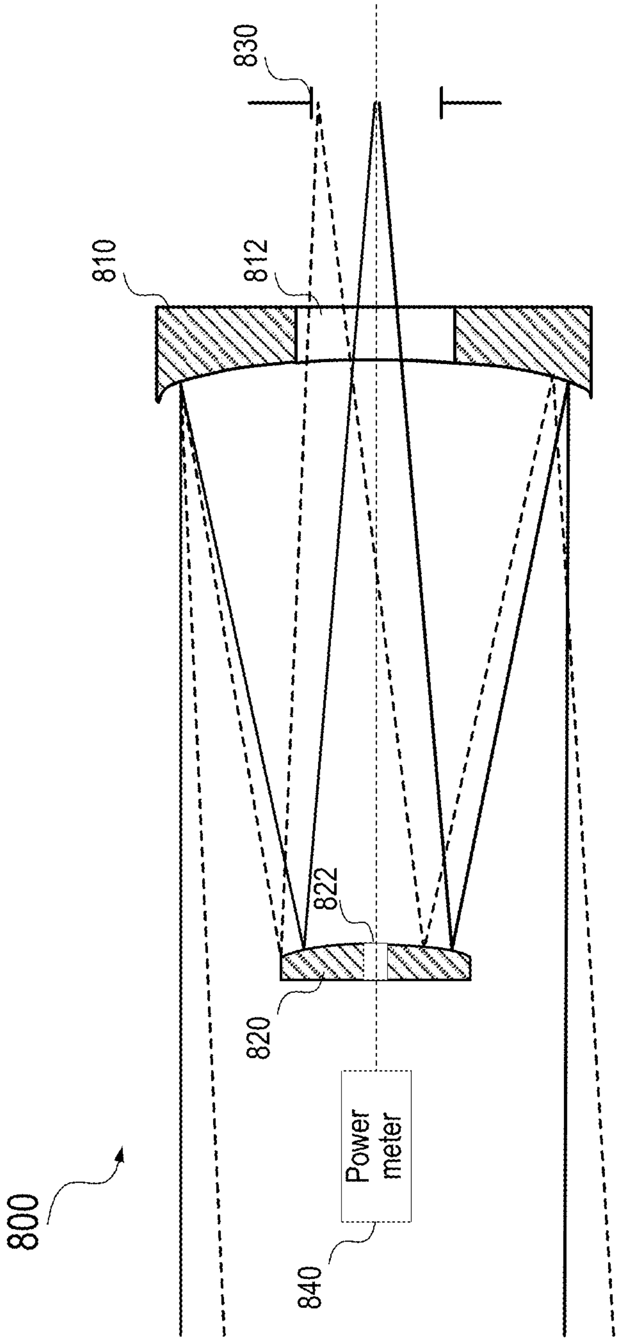
FIG. 8 illustrates an example of a Cassegrain telescope used in an optical antenna of a free-space optical communication terminal according to certain embodiments.

FIG. 8 illustrates an example of a Cassegrain telescope 800 used in an optical antenna of a free-space optical communication terminal according to certain embodiments. In the illustrated example, Cassegrain telescope 800 may include a parabolic primary mirror 810 and a hyperbolic secondary mirror 820. Primary mirror 810 may reflectively focus an incident laser beam from the atmosphere and direct the focused light beam to secondary mirror 820. For example, the concave parabolic primary mirror 810 may reflect all incoming light rays parallel to its axis of symmetry to a single point (the focus). Secondary mirror 820 may reflect the light back to a center region of primary mirror 810 that may include a hole or a transmissive region. Convex hyperbolic secondary mirror 820 may have two foci and may reflect light rays directed at one focus of its two foci towards its other focus. Light reflected by secondary mirror 820 may pass through a center region 812 (e.g., including a hole or without reflective coating) of primary mirror 810 and reach a focal point where a field stop 830 may be positioned. Folding the light by primary mirror 810 and secondary mirror 820 may reduce the size of the optical antenna without reducing the optical path length or requiring a large reflective mirror with a short focus length (large optical power).

Secondary mirror 820 may block a small central portion (e.g., center region 812) of the system aperture. In some embodiments, a center region 822 of secondary mirror 820 may include an aperture (e.g., a hole) or a transmission region (e.g., without reflective coating) and may allow a portion of the laser beam from primary mirror 810 to pass through and measured by a power meter 840. The power of the received portion of the laser beam measured by power meter 840 may be used to estimate the total power of the received laser beam by the system aperture. As described above, in some embodiments, center region 812 of primary mirror 810 and center region 822 of secondary mirror 820 may be used to transmit a beacon beam that may have a large divergence angle.

Figure 9B:
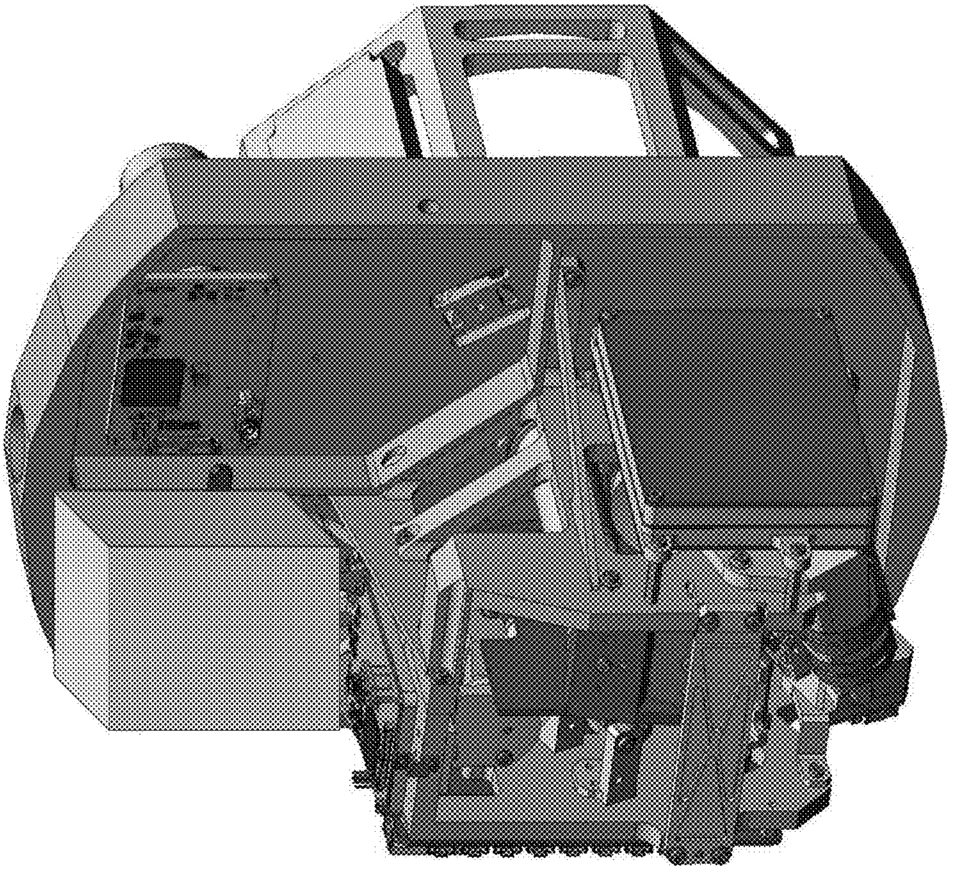
FIGS. 9A-9B illustrate an example of an optical head of a free-space optical communication terminal according to certain embodiments.
Figure 9A:
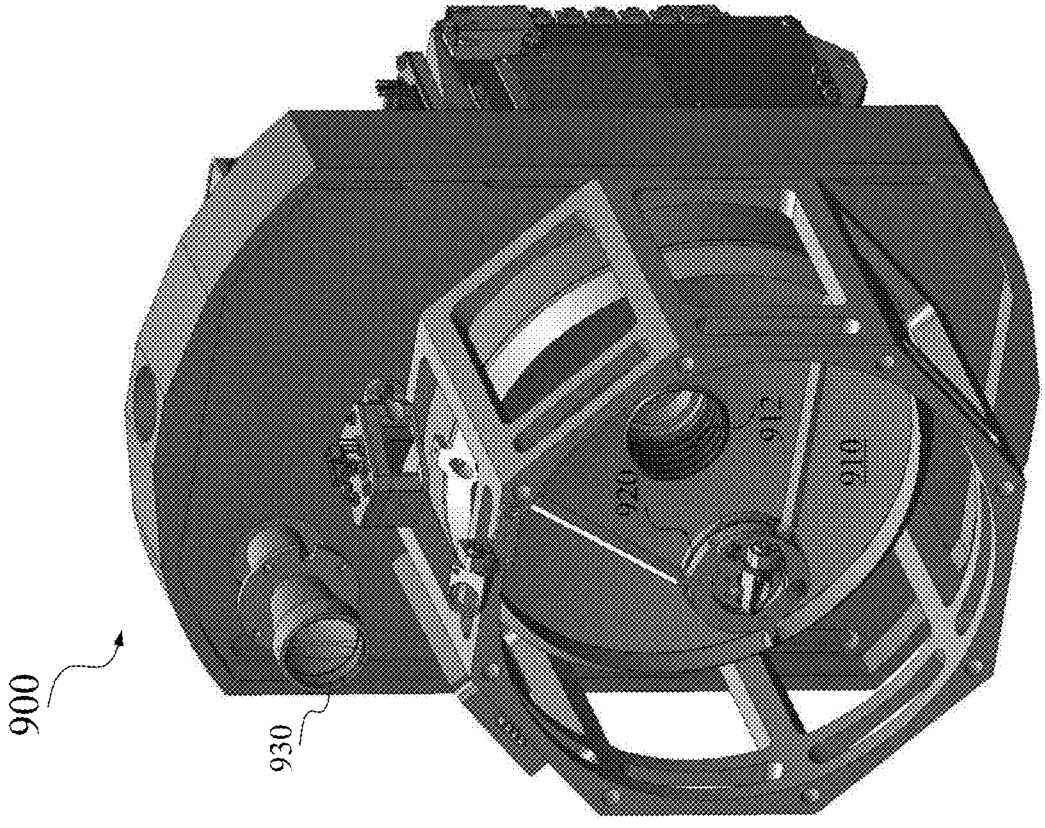

FIGS. 9A-9B illustrate an example of an optical head 900 of a free-space optical communication terminal according to certain embodiments. FIG. 9A is a perspective view of optical head 900 from the front side, whereas FIG. 9B is a perspective view of optical head 900 from the back side. Optical head 900 may be an example of optical head 602 or 700. Optical head 900 includes an example of an implementation of the optical antenna, where the Cassegrain telescope may include a first concave mirror 910 (including a hole 912 in the center region), and a second mirror 920 supported by supporting structures. FIGS. 9A and 9B also show a WFOV position sensing system 930, which may be an example of an implementation of the WFOV beam position sensing system of FIG. 7. The second telescope, optical back end, and some measurement and/or control circuits may be behind first concave mirror 910 as shown in FIG. 9B.

Figure 10:
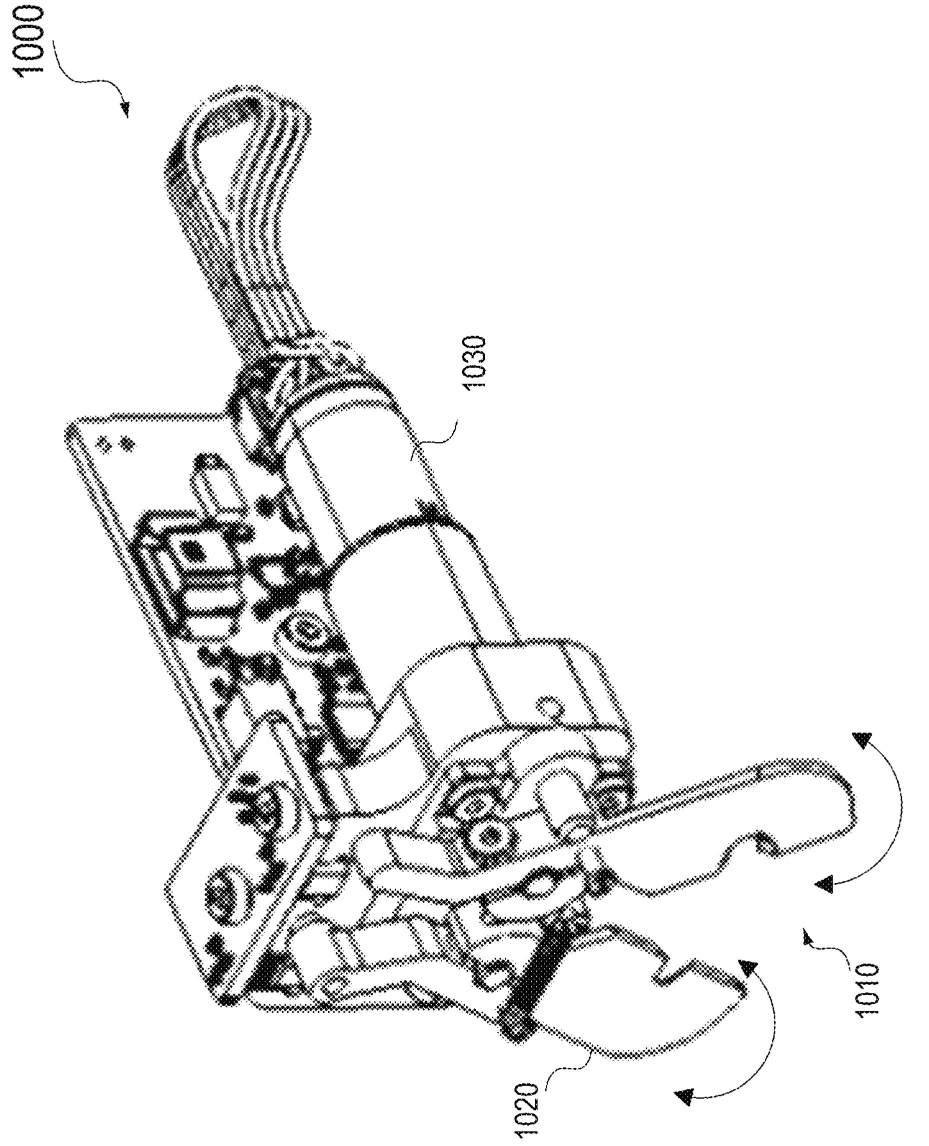
FIG. 10 illustrates an example of an active aperture according to certain embodiments.

FIG. 10 illustrates an example of an active aperture 1000 according to certain embodiments. Active aperture 1000 may be used to implement field stop 730, 738, or 830. In the illustrated example, active aperture 1000 may include a pair of blades 1010 and 1020 and a motor 1030 that may be controlled to rotate blades 1010 and 1020, thereby varying the size of the aperture between blades 1010 and 1020. For example, active aperture 1000 may be configured to operate in an open mode having a maximum aperture size for laser beam acquisition, where blades 1010 and 1020 may be rotated by motor 1030 to the maximum open position. When an intensity of the received laser beam (e.g., measured using power meter 754 or 840) is lower than a first threshold value, active aperture 1000 may be configured to operate in a spatial filtering mode characterized by a first aperture size, where some speckles formed in peripheral regions of active aperture 1000 may be blocked by blades 1010 and 1020. When the intensity of the received laser beam is greater than the first threshold value but below a second threshold value, active aperture 1000 may be configured to operate in a squinting mode characterized by a second aperture size smaller than the first aperture size, for example, to avoid damaging the back-end receiver. When the intensity of the received laser beam is greater than the second threshold value, active aperture 1000 may be configured to operate in a closed mode, where blades 1010 and 1020 may be rotated by motor 1030 to completely block the incident light.

Figure 11:
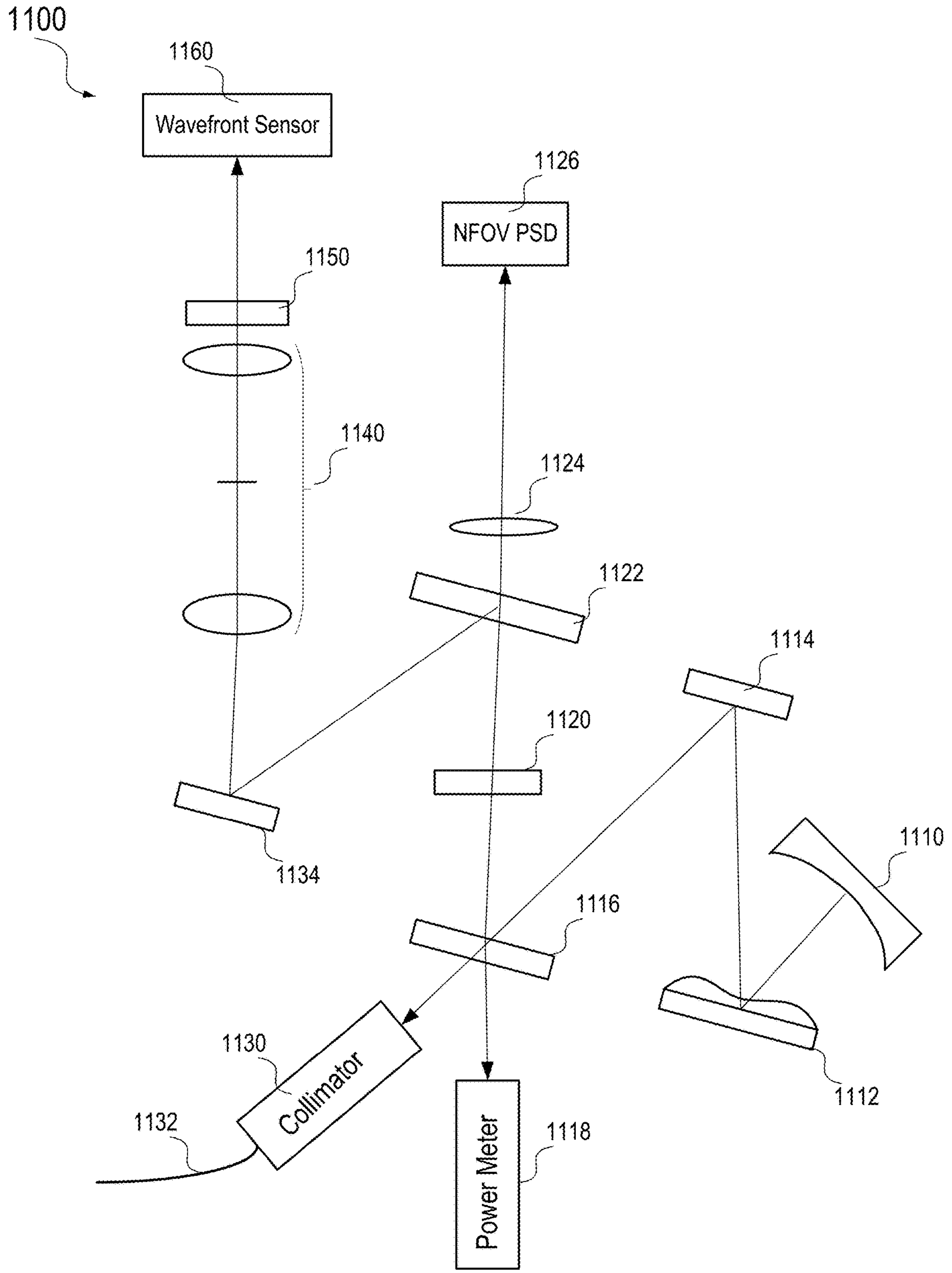
FIG. 11 illustrates an example of an optical back end in an optical head of a free-space optical communication terminal according to certain embodiments.

FIG. 11 illustrates an example of an optical back end 1100 in an optical head of a free-space optical communication terminal according to certain embodiments. Optical back end 1100 shown in FIG. 11 may be an example of the optical back end of optical head 602 of FIG. 6. In the illustrated example, optical back end 1100 may include a GDM 1112 that may receive a laser beam from a mirror 1110 (e.g., mirror 736 shown in FIG. 7) in the receive path. GDM 1112 may also reflect a laser beam to be transmitted to mirror 1110 in the transmit path. As described in detail below, GDM 1112 may be pivoted or tilted as a whole by micro-gimbals, and the reflective surface of GDM 1112 may also be tuned by individual micro-activators that may each change the shape and/or position of a small region of the reflective surface. GDM 1112 may be configurable to, for example, correct aberrations of the received laser beam, scan a beacon beam to be transmitted into atmosphere for laser beam tracking, scan within a field of regard to acquire a beacon beam transmitted through atmosphere, diverge a beacon beam to be transmitted to atmosphere, or a combination thereof.

As illustrated, GDM 1112 may direct the received laser beam to a fold mirror 1114, which may fold the laser beam and direct the laser beam towards a power selector 1116. In some embodiments, GDM 1112 may reflect the received laser beam towards a power selector 1116 directly, and thus fold mirror 1114 may not be used. Power selector 1116 may direct (e.g., reflect or deflect) a portion (e.g., 1%, 2%, 5%, or 10%) of the laser beam to a filter 1120, which may allow light in a first infrared band (e.g., light in the received laser beam) to pass through and may block (e.g., absorb) light outside the first infrared band (e.g., stray light from the laser beam to be transmitted to another terminal). Power selector 1116 may allow another portion of the laser beam from fold mirror 1114 to pass through and be coupled into an optical fiber 1132 by a collimator 1130 (e.g., a lens, such as a GRIN lens), where optical fiber 1132 may send the received laser beam to a receiver subsystem for processing as described above with respect to, for example, FIGS. 4 and 6 and described in detail below. In the transmit path, a laser beam to be transmitted may be guided by optical fiber 1132, collimated by collimator 1130, and split by power selector 1116. A fraction (e.g., 1%, 2%, 5%, or 10%) of the laser beam to be transmitted may be sent (e.g., reflected or deflected) by power selector 1116 to power meter 1118 to estimate the power of the laser beam to be transmitted. The remaining portion of the laser beam to be transmitted may be sent (e.g., transmitted) by power selector 1116 to fold mirror 1114 and/or GDM 1112 for transmission by the optical antenna.

In the receive path, the portion of the received laser beam may be filtered by filter 1120 to block stray light or other noise signals, and may then be split by a beam splitter 1122 (e.g., a wedged beam splitter) into a first portion and a second portion. The first portion may be directed toward a lens 1124 (or lens assembly) and a narrow field of view (NFOV) PSD 1126. Lens 1124 may form an image of the laser beam on a region of NFOV PSD 1126. The location of the image of the laser beam on NFOV PSD 1126 may indicate the angle or direction of the received laser beam. NFOV PSD 1126 may have a higher resolution than, for example, WFOV PSD 764. Therefore, NFOV PSD 1126 may be used for more accurate laser beam acquisition and tracking. The second portion of the laser beam split by beam splitter 1122 may be folded by a fold mirror 1134 and may be relayed by a pupil relay telescope 1140 to a pupil plane (forming an image of, e.g., primary mirror 720) on wavefront sensor 1160. A filter 1150 similar to filter 1120 may be used to further filter the laser beam to be measured by wavefront sensor 1160. Wavefront sensor 1160 may be used to measure the wavefront profile of the received laser beam to determine the aberrations caused by, for example, atmospheric turbulence. In one implementation, wavefront sensor 1160 may include a Shack-Hartmann wavefront sensor.

Figure 12A:
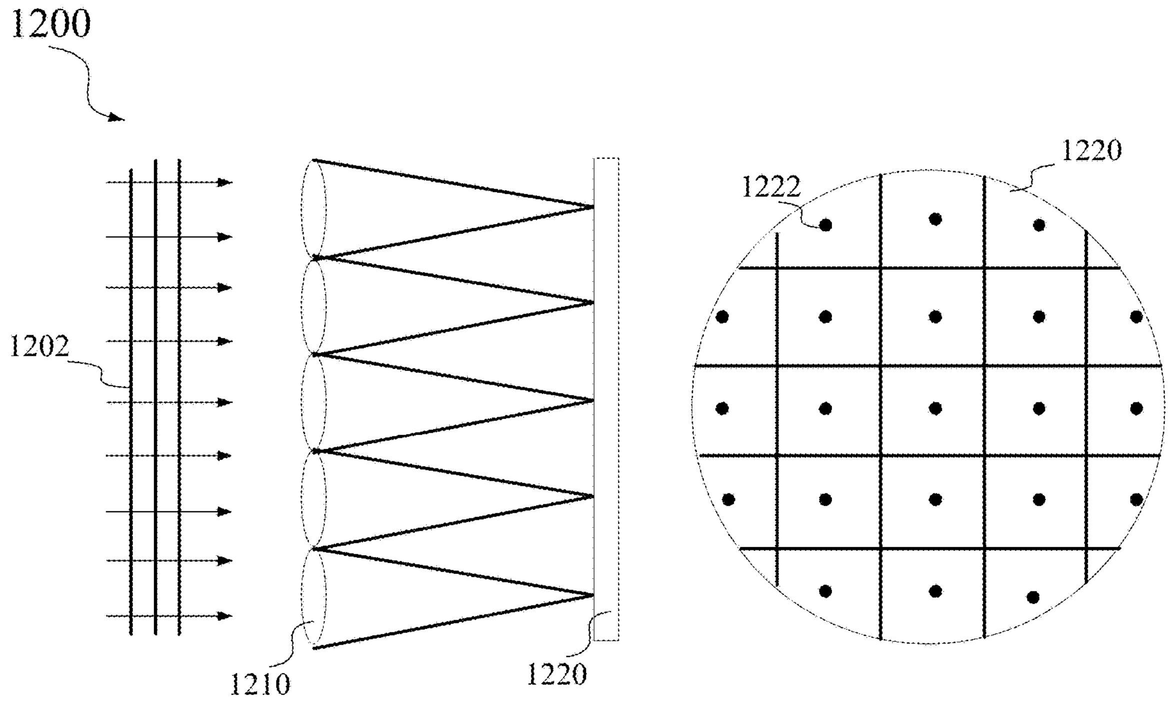
FIGS. 12A-12B illustrate operations of an example of wavefront sensor according to certain embodiments.
Figure 12B:
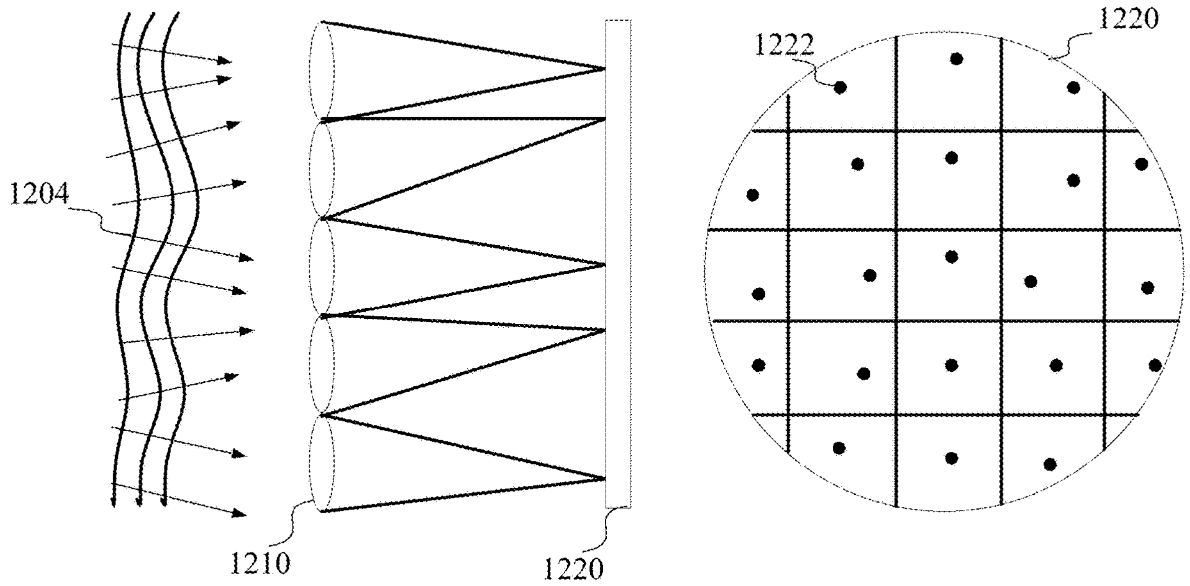

FIGS. 12A-12B illustrate operations of an example of wavefront sensor 1200 according to certain embodiments. Wavefront sensor 1200 may be a Shack-Hartmann Wavefront sensor. Wavefront sensor 1200 may include a micro-lens array 1210 and a CCD or CMOS detector array 1220, where detector array 1220 may be positioned at a focal plane of micro-lens array 1210. As shown in FIG. 12A, when a light beam 1202 with a plane wavefront (where regions of the light beam having a same phase are on a flat plane) is incident on wavefront sensor 1200, each micro-lens may focus the light into a respective light spot 1222 at the center of a corresponding pixel (or grid) of detector array 1220.

In the example shown in FIG. 12B, a light beam 1204 with a distorted wavefront may be incident on wavefront sensor 1200, where micro-lens array 1210 may focus the incident light into light spots 1222 that may be at different locations of the pixels, due to the different wavefront profiles (and thus incident angles) of the incident light at respective micro-lenses of micro-lens array 1210. By analyzing the locations and/or sizes of the individual light spots 1222 on detector array 1220, the wavefront profile (shape) of light beam 1204 incident on wavefront sensor 1200 may be determined. The determined wavefront profile may be used to determine the desired shape of the reflective surface of GDM 1112 for correcting the distortion. In some implementations, a closed loop may be used to continuously sample and measure the phase aberrations and feedback the information to a controller that controls the shape of the reflective surface of GDM 1112, until a light beam with a plane wavefront is generated.

FIGS. 13A-13D illustrate examples of deformable mirrors according to certain embodiments. Deformable mirrors can include segmented surfaces or continuous surfaces, and may include various types of micro-actuators, such as mechanical actuators, electrostatic actuators, MEMS actuators, magnetic or electromagnetic actuators, piezoelectric actuators, and the like, that may move the reflective segments or surface regions up and down or cause tip, tilt, and/or piston motions of the reflective segments or surface regions. A segmented deformable mirror may include many smaller mirror sections that can be controlled individually by micro-actuators. In general, the larger the number of segments, the more precise the control of the mirror shape. A deformable mirror with a continuous reflective surface may include a membrane with a reflective coating that can be deformed at different regions by individual actuators to deform the continuous reflective surface into the desired shape. Segmented deformable mirrors or regions of a continuous deformable mirror may be positioned by actuators using, for example, piston-tip-tilt values or Zernike coefficients. For example, precision linear open-loop piston-tip-tilt positioning may enable high-performance adaptive optics corrections. The number of actuators may affect the quality and the quantity of unique shapes the deformable mirror can produce. As the number of actuators increases, so does the versatility in deformation. Typically, the number of actuators ranges from several tens to several hundred. Deformable mirrors can range from a few millimeters to hundreds of centimeters in diameters.

Figure 13A:
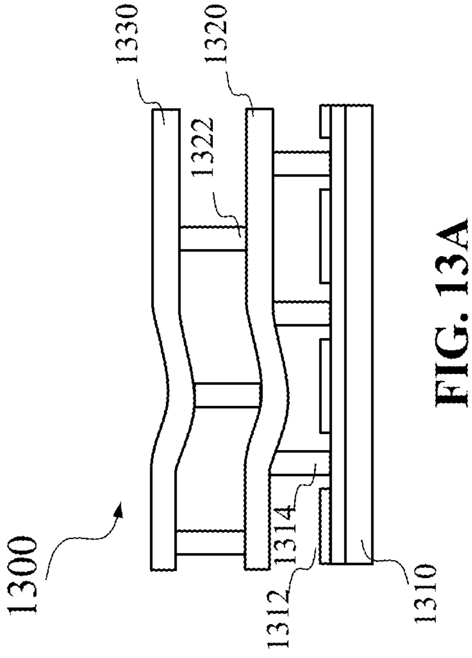
FIGS. 13A-13D illustrate examples of deformable mirrors according to certain embodiments.

FIG. 13A illustrates an example of a continuous deformable mirror 1300 including electrostatic or electromagnetic actuators. The illustrated deformable mirror 1300 may include a substrate 1310 (e.g., a silicon substrate), electrodes 1312, actuator supports 1314, an actuator surface 1320, actuator posts 1322, and a reflective membrane 1330. The electrostatic or electromagnetic actuators may be activated by appropriated control signals applied to electrodes 1312 to attract or repel portions of actuator surface 1320, which may then move reflective membrane 1330 accordingly through actuator posts 1322 to deform the surface of reflective membrane 1330.

Figure 13B:
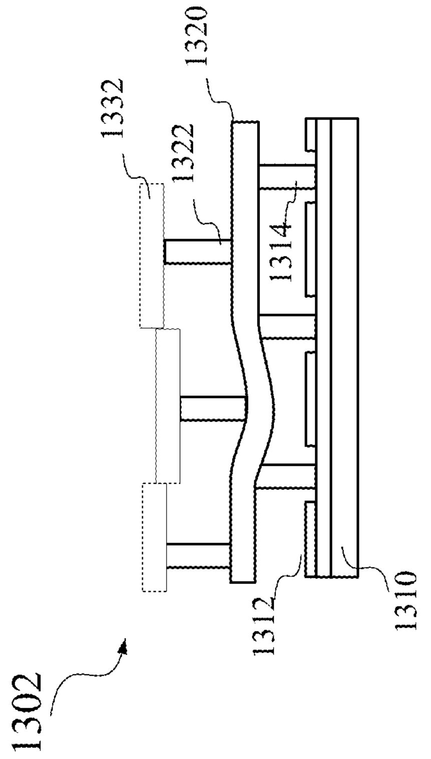

FIG. 13B illustrates an example of a segmented deformable mirror 1302 including electrostatic or electromagnetic actuators. The illustrated deformable mirror 1302 may include substrate 1310 (e.g., a silicon substrate), electrodes 1312, actuator supports 1314, actuator surface 1320, actuator posts 1322, and reflective segments 1332. The electrostatic or electromagnetic actuators may be activated by appropriated control signals applied to electrodes 1312 to attract or repel portions of the actuator surface 1320, which may then move corresponding reflective segments 1332 accordingly through actuator posts 1322 to form an uneven surface.

Figure 13C:
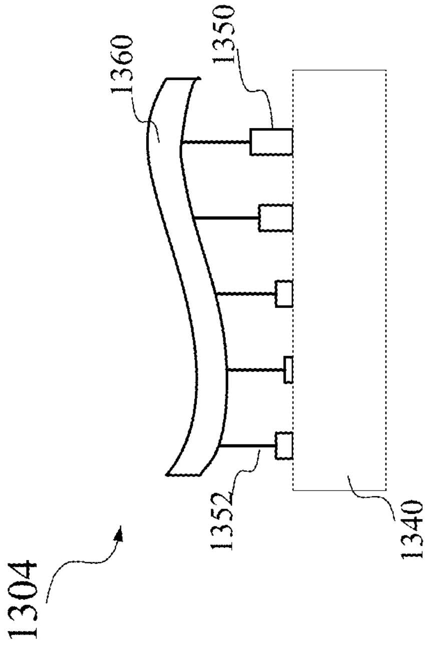

FIG. 13C illustrates an example of a continuous deformable mirror 1304 including electromagnetic actuators. The illustrated deformable mirror 1304 may include a substrate 1340, actuators 1350, actuator posts 1352, and a reflective membrane 1360. The electromagnetic actuators may be activated by appropriated control signals to generate magnetic fields to move actuator posts 1352 up or down, thereby moving corresponding portions of reflective membrane 1360 up or down to deform the surface of reflective membrane 1360.

Figure 13D:
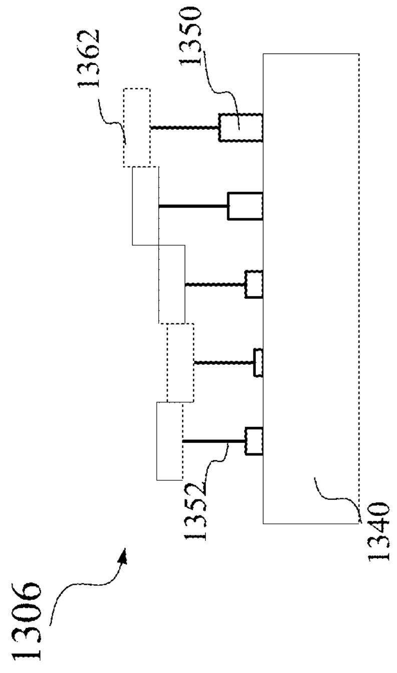

FIG. 13D illustrates an example of a segmented deformable mirror 1306 including electromagnetic actuators. The illustrated deformable mirror 1306 may include substrate 1340, actuators 1350, actuator posts 1352, and reflective segments 1362. The electromagnetic actuators may be activated by appropriated control signals to generate magnetic fields to move actuator posts 1352 up or down, thereby moving corresponding reflective segments 1362 up or down to form an uneven surface.

According to certain embodiments disclosed herein, the deformable mirror may be mounted on a micro-gimbal structure that may pivot or tilt the entire deformable mirror, thereby forming a gimbaled deformable mirror that may have more degrees of freedom and can both scan and correct light beams. In this way, a tip-tilt mirror or fast steering mirror may not be needed, and the system structure can be simplified and the alignment requirement can be reduced.

Figure 14B:
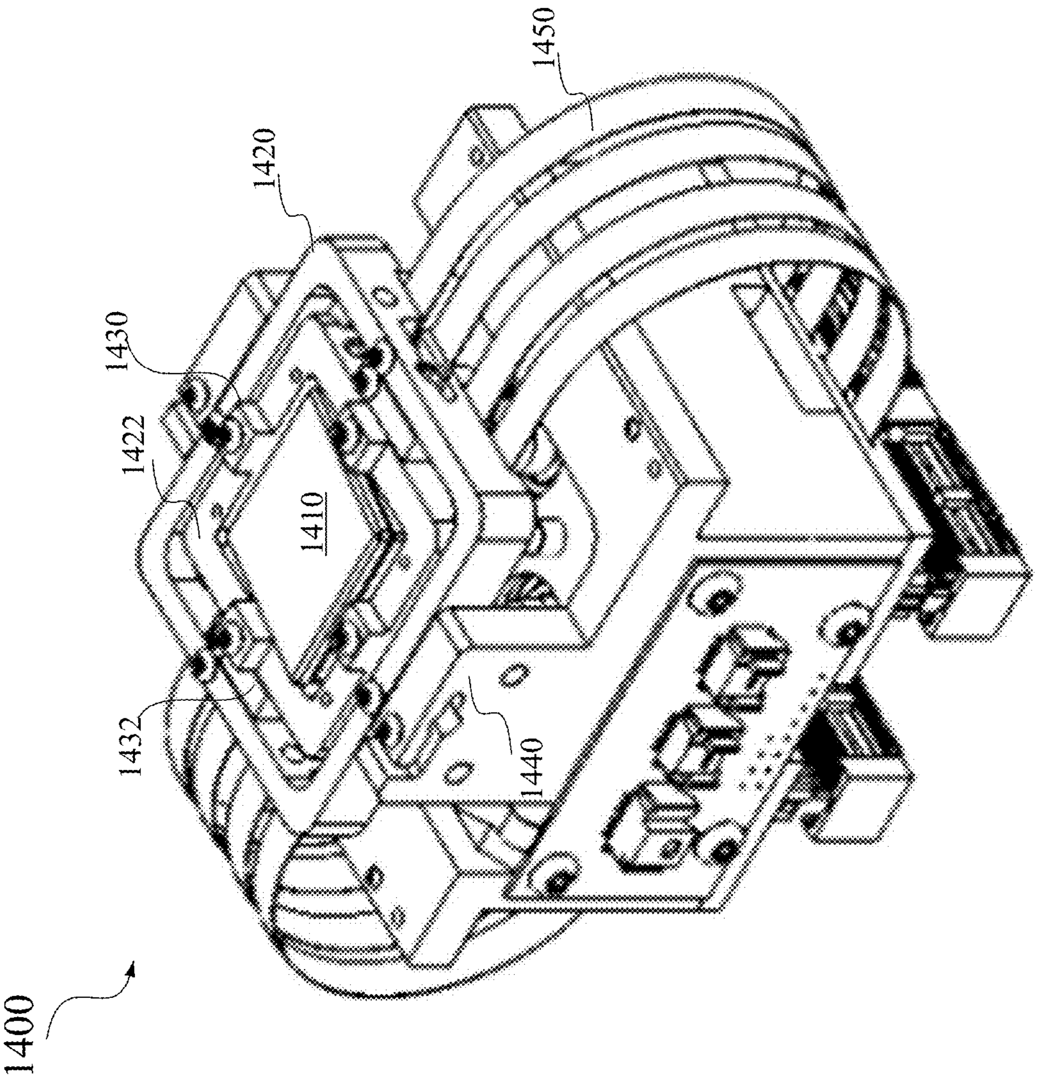
FIG. 14B illustrates an example of a micro-gimbaled deformable mirror according to certain embodiments.
Figure 14A:
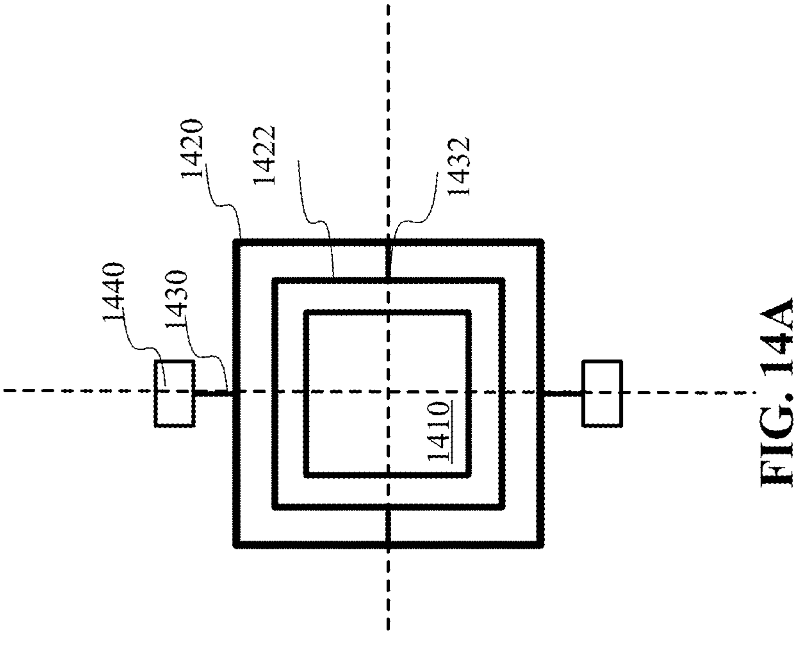
FIG. 14A illustrates an example of a deformable mirror mounted on a micro-gimbal structure according to certain embodiments.

FIG. 14A illustrates a simplified diagram of an example of a deformable mirror 1410 mounted on a micro-gimbal structure according to certain embodiments. Deformable mirror 1410 may include a deformable mirror as described above with respect to, for example, FIGS. 13A-13D. The micro-gimbal structure may include an inner gimbal 1422 and an outer gimbal 1420. Deformable mirror 1410 may be mounted on inner gimbal 1422. Inner gimbal 1422 may be coupled to outer gimbal 1420 by pivot flexures 1432, and may pivot around an axis defined by pivot flexures 1432. Outer gimbal 1420 may be coupled to a support structure 1440 by pivot flexures 1430, and may pivot around an axis defined by pivot flexures 1430. As such, deformable mirror 1410 may not only be configurable to change the shape of the reflective surface to modify individual regions of the wavefront of an incident light beam, but also can be pivoted or tilted to scan or otherwise redirect the whole incident light beam.

FIG. 14B illustrates an example of a micro-gimbaled deformable mirror 1400 according to certain embodiments. In the illustrated example, deformable mirror 1410 may be mounted on inner gimbal 1422. Inner gimbal 1422 may be coupled to outer gimbal 1420 through two pivot flexures 1432, and may be tilted or pivoted by two linear actuators 1460 around a first axis defined by the two pivot flexures 1432. Outer gimbal 1420 may be coupled to support structures 1440 through two pivot flexures 1430, and may be tilted or pivoted by two linear actuators around a second axis defined by the two pivot flexures 1430. Flexible cables 1450 may be coupled to deformable mirror 1410 to control the micro-actuators of deformable mirror 1410, and may allow deformable mirror 1410 to tile or pivot and/or move up/down with inner gimbals 1422 and outer gimbals 1420.

Adaptive optics compensation systems for aberration correction using deformable mirrors and based on wavefront sensing techniques may be able to achieve fast aberration correction because no or fewer iterations may be needed. However, in many systems, the performance of adaptive optics compensation systems for aberration correction using deformable mirrors and based on wavefront sensing may be limited, due to, for example, limited accuracy, resolution, and/or speed of the phase aberration estimation or measurement by the wavefront sensor, and limited phase compensation range, resolution, accuracy, and bandwidth of phase compensation components (e.g., deformable mirror). In particular, aberrations having high spatial and/or temporal frequencies (and/or under strong scintillation or low optical power) may be difficult to correct using wavefront sensor-based adaptive optics system. To correct the aberrations having high spatial and/or temporal frequencies, high-speed adaptive optics systems may be used with the deformable mirror. The high-speed adaptive optics system can use algorithms such as a stochastic search algorithm (e.g., stochastic parallel gradient descent (SPGD)), an image-based algorithm, a statistical historic data-based method, a machine-learning based method, a model-based method, a model-free method, and the like, to iteratively correct the wavefront based on, for example, measured image quality or optical power of the received light beam. In one example, a process of sequential optimization of the speckle pattern in the focal plane may be performed to iteratively updating the phases of individual speckles to maximize the received power.

Figure 15:
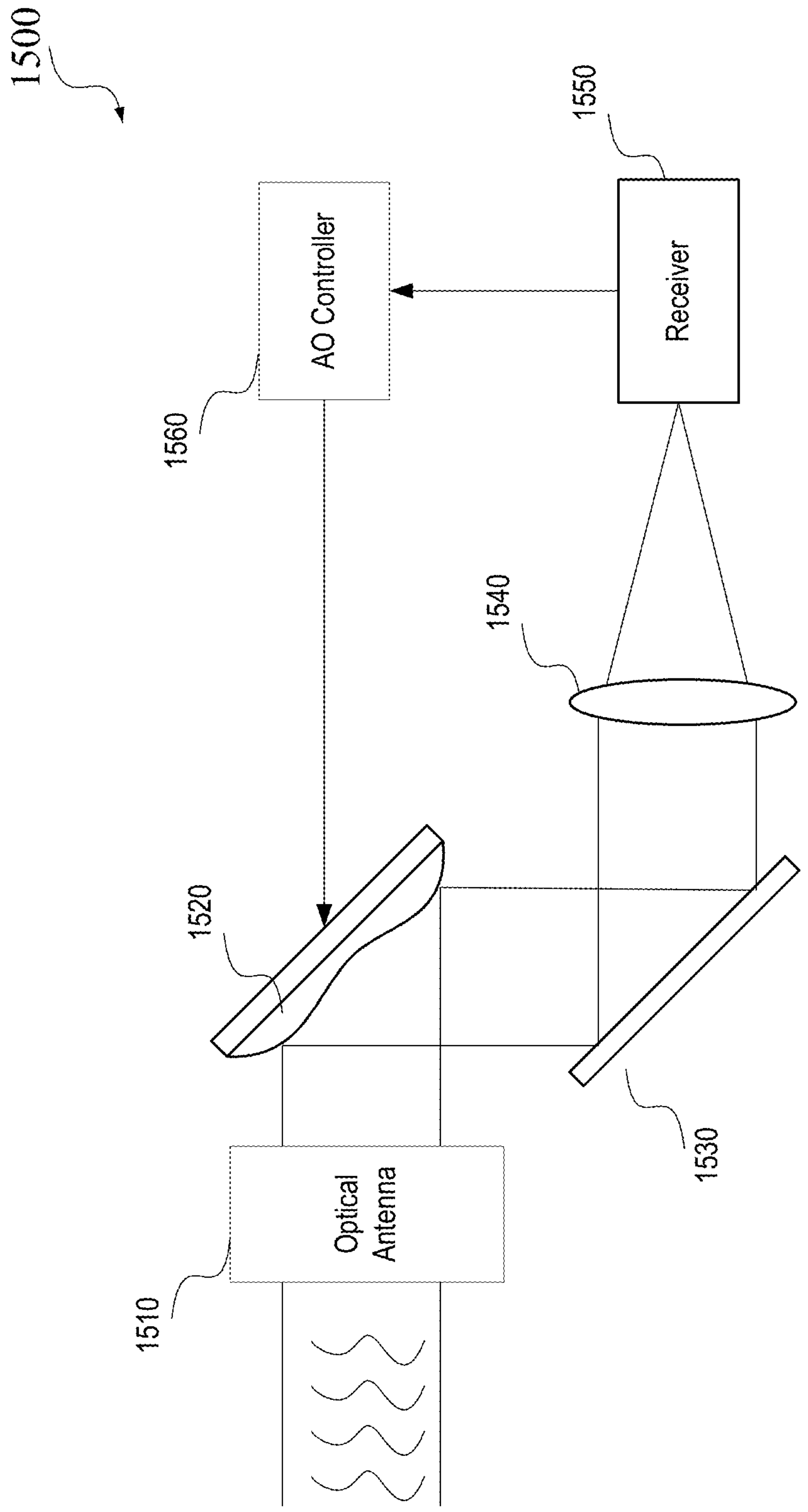
FIG. 15 illustrates an example of an implementation of high-speed aberration correction in a free-space optical communication terminal according to certain embodiments.

FIG. 15 illustrates an example of an implementation of high-speed aberration correction in a free-space optical communication terminal according to certain embodiments. FIG. 15 shows an FSOC terminal 1500 including a high-speed AO system for aberration correction. In the illustrated example, a laser beam with a distorted wavefront may be received by an optical antenna 1510, which may include one or more telescopes as described above. The received laser beam with wavefront aberrations may be at least partially corrected by a wavefront correction device, such as a deformable mirror 1520 or a spatial light modulator (SLM). The laser beam may then be directed by a fold mirror 1530 and focused by a lens 1540 onto a receiver 1550. Receiver 1550 may be, for example, a wavefront sensor, a camera, or a power meter. The outputs of receiver 1550 may be processed by an AO controller 1560 to determine one or more metrics of the received laser beam (e.g., phase profile, image quality, intensity, and/or total power). Based on the determined one or more metrics of the received laser beam, AO controller 1560 may control the wavefront correction device (e.g., deformable mirror 1520) to improve the metrics of the received laser beam.

High-speed AO systems may be implemented in different ways using different wavefront correction devices, different metrics for optimization, and different optimization algorithms. For example, the wavefront at different zones of a pupil plane may be individual corrected in a zonal correction method. In another example, different modes of the aberrations of the wavefront may be determined individually and then corrected individually or collectively in a modal correction method. The different modes of the aberrations of the wavefront may be represented by, for example, Zernike polynomials, Legendre polynomials, Fourier modes, Lukosz modes, Walsh-Hadamard modes, and the like. Metrics such as image quality, intensity, and/or total power may be used for the optimization. Stochastic algorithms, such as stochastic parallel gradient descent (SPGD) algorithms and genetic algorithms, or model-based algorithms (if the aberrations can be modeled) may be used for the optimization.

Figure 16A:
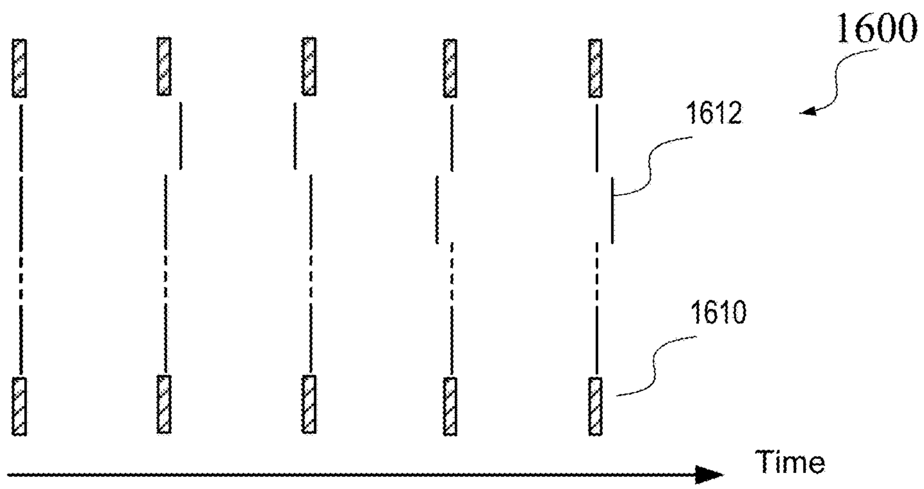
FIG. 16A illustrates an example of a zonal implementation of adaptive optics for aberration correction using a segmented wavefront correction device according to certain embodiments.

FIG. 16A illustrates an example of a zonal implementation of adaptive optics for aberration correction using a wavefront correction device 1600 according to certain embodiments. Wavefront correction device 1600 may be a segmented wavefront correction device, such as a segmented deformable mirror as described above with respect to FIGS. 13B and 13D, where each segment of the wavefront correction device may be individually controlled to make linear motions (e.g., piston-like up/down motions). As illustrated, wavefront correction device 1600 at a pupil plane 1610 of an AO system for FSOC may be divided into a plurality of zones 1612. The plurality of zones 1612 of wavefront correction device 1600 may be modulated sequentially in time, and the metric of the laser beam being corrected may be evaluated as zones 1612 are sequentially modulated. For example, a first zone of the plurality of zones 1612 of wavefront correction device 1600 may be modulated to determine a position of the first zone of wavefront correction device 1600 that may yield a best metric, a second zone of the plurality of zones 1612 of wavefront correction device 1600 may then be modulated to determine a position of the second zone of wavefront correction device 1600 that may yield a best metric, and so on, until all zones of the plurality of zones 1612 are modulated and optimized positions of the plurality of zones 1622 are determined.

Figure 16B:
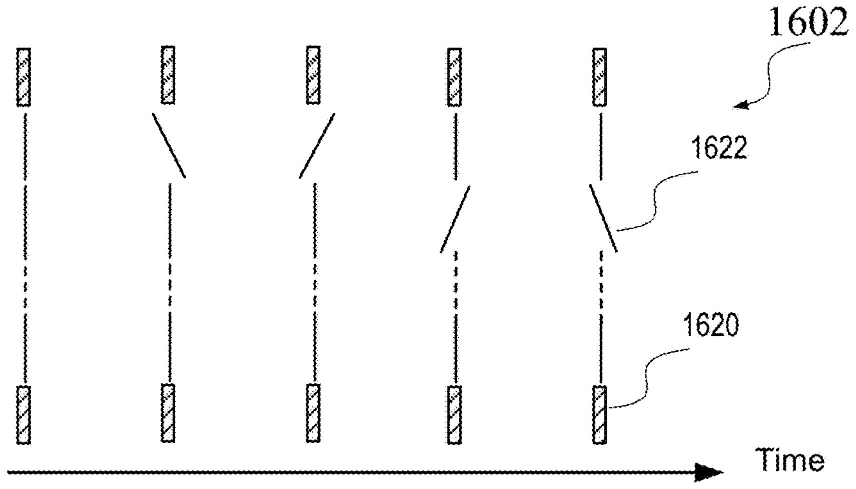
FIG. 16B illustrates another example of a zonal implementation of adaptive optics for aberration correction using a segmented wavefront correction device according to certain embodiments.

FIG. 16B illustrates an example of a zonal implementation of adaptive optics for aberration correction using a wavefront correction device 1602 according to certain embodiments. Wavefront correction device 1602 may be a segmented wavefront correction device, such as a segmented deformable mirror as described above with respect to FIGS. 13B and 13D, where each segment of the wavefront correction device may be individually controlled to make piston-tip-tilt motions. As illustrated, wavefront correction device 1602 at a pupil plane 1620 of an AO system for FSOC may be divided into a plurality of zones 1622. The plurality of zones 1622 of wavefront correction device 1602 may be modulated sequentially in time, and the metric of the laser beam being corrected may be evaluated as zones 1622 are sequentially modulated. For example, a first zone of the plurality of zones 1622 of wavefront correction device 1602 may be modulated to determine a position and/or orientation of the first zone of wavefront correction device 1602 that may yield a best metric, a second zone of the plurality of zones 1622 of wavefront correction device 1602 may then be modulated to determine a position and/or orientation of the second zone of wavefront correction device 1602 that may yield a best metric, and so on, until all zones of the plurality of zones 1622 are modulated and optimized positions and/or orientations of the plurality of zones 1622 are determined.

Figure 16C:
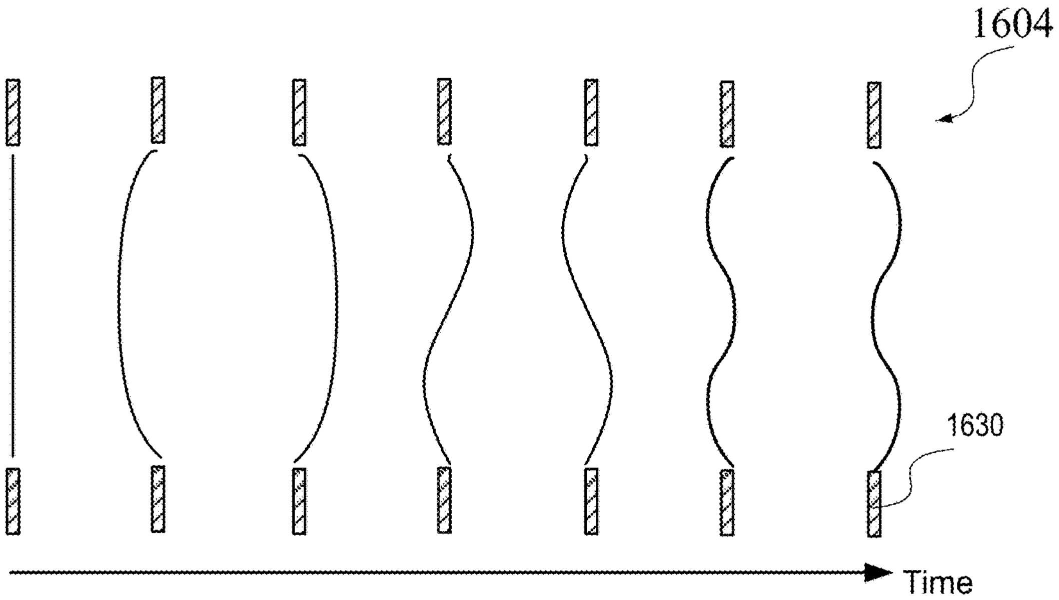
FIG. 16C illustrates an example of a modal implementation of adaptive optics for aberration correction using a continuous wavefront correction device according to certain embodiments.

FIG. 16C illustrates an example of a modal implementation of adaptive optics for aberration correction using a wavefront correction device 1604 according to certain embodiments. Wavefront correction device 1604 may be a continuous wavefront correction device, such as a continuous deformable mirror as described above with respect to FIGS. 13A and 13C, where a continuous reflective membrane may be deformed using individual actuators that may make piston motions or piston-tip-tilt motions. The wavefront shape across the entire pupil may be changed sequentially to cycle through the different modes, where the different modes may include, for example, Zernike polynomials, Legendre polynomials, Fourier modes, Lukosz modes, or Walsh-Hadamard modes, of different orders (e.g., 10 or more orders).

In the illustrated example, wavefront correction device 1604 at a pupil plane 1630 of an AO system for FSOC may be adjusted sequentially to have different modes, and the metric of the laser beam being corrected may be evaluated as the different modes are sequentially cycled through. For example, wavefront correction device 1604 may first be adjusted to have a first mode (e.g., $0^{th}$ order mode), and the metric of the received laser beam may be evaluated. Wavefront correction device 1604 may then be adjusted to have a second (e.g., $1^{st}$ order) mode with different settings, and a best setting of the second mode that may yield a best metric may be determined. Wavefront correction device 1604 may then be adjusted to have other modes with different settings to determine settings of the modes that yield the best metrics. In some embodiments, the best setting for each mode may be applied to the wavefront correction device after the best setting for the mode is determined. In some embodiments, the best settings for all modes may be applied to the wavefront correction device together after the best settings for all modes are determined.

As described above, in some embodiments, the high-speed AO techniques may be combined with the wavefront sensor-based AO techniques to adjust a same wavefront correction device, such as the gimbaled deformable mirror disclosed herein, thereby achieving more accurate and faster aberration correction. In some embodiments, a separate wavefront corrected device may be used for high-speed aberration correction. In some implementations, wavefront sensor-based AO techniques may be used to periodically correct aberrations having lower frequencies, and, within each period, high-speed AO techniques may be used to correct high frequency aberrations at a higher speed.

Figure 17:
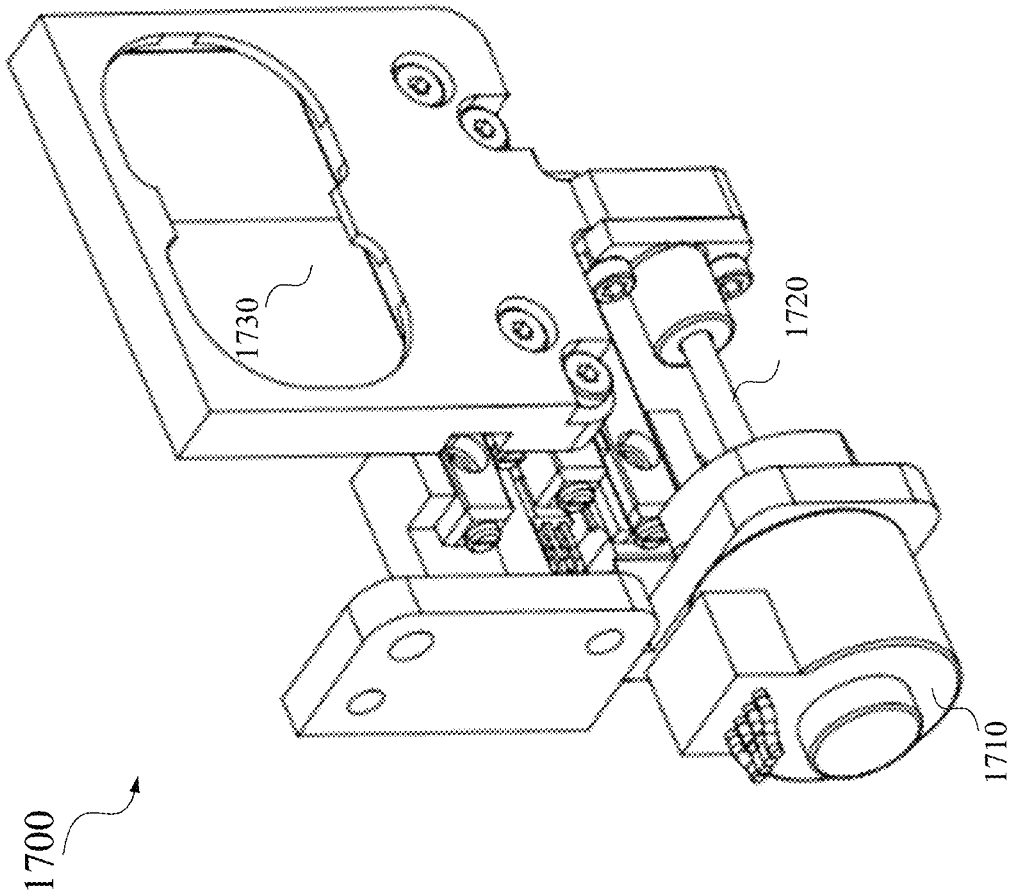
FIG. 17 illustrates an example of a variable power selector in a free-space optical communication terminal according to certain embodiments.

FIG. 17 illustrates an example of a variable power selector 1700 in a free-space optical communication terminal according to certain embodiments. Power selector 1700 may be an example of power selector 614 or 1116 described above. In the illustrated example, power selector 1700 may include a motor 1710, a linear actuator 1720, and an array of filters 1730 with different transmissivity and/or reflectivity (or an array of beam splitters with different split ratios). For example, the array of filters 1730 (or beam splitters) may be selected to deflect 1%, 2%, 5%, or 10% of incident light and allow other portions of the incident light to pass through. The transmissivity and/or reflectivity may be selected by sliding the array of filters 1730 using motor 1710 and linear actuator 1720.

In the FSOC terminals described above, many components are reflective devices with wideband, high-reflectivity coating. The coating can include materials (e.g., dielectric materials) that have low absorptions for infrared light. Laser light may not need to pass through these components and thus may not be absorbed inside these components. As such, these components may be able to reflect infrared light within a wide band and may be able to reflect light with high intensity.

FSOC terminals disclosed herein may enable fast and more accurate aberration correction using hybrid aberration correction techniques. For example, aberrations that may vary slowly in space and/or time (e.g., less than about 10 Hz) may be corrected using slow steering mechanism, such as a gimbal (e.g., gimbal structure 420) or another slow steering mirror. Aberrations varying at higher frequencies (e.g., time-dependent wavefront aberrations) may be corrected using the micro-gimbals and a MEMS deformable mirror of the GDM, based on the wavefront sensed by a wavefront sensor and using techniques such as Zernike series decomposition, as described above with respect to FIGS. 11-14C. Aberrations having even higher frequencies (and/or under strong scintillation or low optical power) may be corrected using a high-speed adaptive optics system as described above with respect to FIGS. 15 and 16. The high-speed adaptive optics system can use algorithms such as a stochastic search algorithm (e.g., stochastic parallel gradient descent (SPGD)), an image-based algorithm, a statistical historic data-based method, a machine-learning based method, a model-based method, a model-free method, and the like, to iteratively correct the wavefront using the GDM based on, for example, measured image or optical power of the received light beam. In one example, a process of sequential optimization of the speckle pattern in the focal plane may be performed to iteratively updating the phases of individual speckles to maximize received power. Aberrations having extremely high frequencies may have very low amplitudes and thus may be ignored.

FSOC terminals disclosed herein may also enable monostatic free-space optical communication. The light beam to be transmitted and the received light beam may pass through the same aperture and may be transmitted and received by a same optical antenna (e.g., including one or more telescopes) as described above with respect to FIGS. 6-11. In some embodiments, the light beam to be transmitted and the received light beam may have slightly different wavelengths. A circulator, a power selector, multiple bandpass filters (e.g., optical filter 642, filter 1120, and filter 1150 described above), and the like may be used to isolate the light beam to be transmitted and the received light beam. The bandpass filter may allow the received light beam to pass through and may block the light beam to be transmitted. A bandpass filter may be used, for example, before the received light is fed to a receiver module so that the light beam to be transmitted may not interfere with received light beam to increase the noise and decrease the signal-to-noise ratio. A bandpass filter may also be used before the wavefront sensor and/or a narrow field of view (NFOV) position sensing detector (PSD) so that the light beam to be transmitted may not interfere with received light beam to cause errors in the wavefront measurement.

In one example, a monostatic free-space optical communication terminal (e.g., FSOC terminals shown in FIGS. 6, 7, 9A, 9B, and 11) may include an optical antenna configured to receive a laser beam in a first wavelength range through a first aperture, a collimator configured to couple the received light beam into an optical fiber, a receiver subsystem including a first bandpass filter characterized by a pass band including the first wavelength range, a transmitter subsystem configured to generate a laser beam to be transmitted that is characterized by wavelengths in a second wavelength range outside of the pass band of the first bandpass filter, and a circulator coupled to the optical fiber, the receiver subsystem, and the transmitter subsystem. The circulator may be configured to direct the received light beam from the optical fiber to the receiver subsystem, and direct the laser beam to be transmitted from the transmitter subsystem to the optical fiber. The collimator may be configured to collimate the laser beam to be transmitted from the optical fiber. The optical antenna may be configured to transmit the laser beam to be transmitted to atmosphere through the first aperture.

In some embodiments, a field stop (e.g., field stop 730, 738, or 830, or active aperture 1000) having a variable aperture size and multiple operation modes may be used to select the amount of light to the GDM. For example, the active aperture may be configurable to operate in an open mode having a maximum aperture size for laser beam acquisition. The active aperture may also be configurable to operate in a spatial filter mode having a first aperture size, in response to an intensity of the received laser beam greater than a first threshold value. The active aperture may further be configurable to operate in a squinting mode characterized by a second aperture size smaller than the first aperture size, in response to the intensity of the received laser beam greater than the first threshold value but below a second threshold value. The active aperture may additionally be configurable to operate in a closed mode in response to the intensity of the received laser beam greater than the second threshold value.

In some embodiments, the monostatic free-space optical communication terminal may also include a deformable mirror (e.g., GDMs described above) configurable to correct aberrations of the received laser beam, a power selector configurable to split the received laser beam into a first light beam and a second light beam, a second bandpass filter that may allow light in the first wavelength range but not light in the second wavelength range to pass through, a wavefront sensor configured to measure a wavefront of the first light beam filtered by the first bandpass filter, and a controller configured to control the deformable mirror to correct the aberrations of the received laser beam based on the measured wavefront of the first light beam. The power selector may be configured to direct a portion of the laser beam to be transmitted to the deformable mirror, or split the received light beam and the laser beam to be transmitted at a variable ratio. In some implementations, the power selector may include an array of filters characterized by different transmissivity and/or reflectivity (or beam splitters with different split ratios), and a linear actuator configured to slide the array of filters. The deformable mirror may be configured to direct the laser beam to be transmitted to the optical antenna.

The FSOC terminals disclosed herein may also enable fast and accurate laser beam acquisition and tracking. In general, an FSOC terminal may include a Global Navigation Satellite System (GNSS) device, such as a global positioning system (GPS) device, a Galileo positioning device, and the like. The GNSS device may determine a position of the FSOC terminal, such that the FSOC terminal may be able to determine the initial pointing direction for establishing a line-of-sight link with another terminal at a known position in the 3-D space. Station 410 and gimbal structure 420 described above with respect to FIG. 4 may be used to orient the FSOC terminal based on the initial pointing direction. The positioning accuracy of station 410 and gimbal structure 420 or another slow steering device and thus the accuracy of the initial pointing direction of the FSOC may not be sufficient for achieving the desired laser beam tracking accuracy. For example, the accuracy of the initial pointing direction of the FSOC terminal using station 410 and gimbal structure 420 may be about 1-5 mrad. But a beacon beam may be a narrow beam with a divergence less than about 500 μrad, less than about 300 μrad, or less than a few tens of microradians. Therefore, the acquired beacon beam may not be centered.

WFOV PSD 624 or 764 described above may be used to measure the direction of the narrow beacon beam. The WFOV PSD may have a large field of view, such as about 25 mrad (about 1.4°), and may lock to less than about 1 mrad (e.g., 0.125 mrad). The measurement results of the WFOV PSD may be used to control the gimbal (e.g., gimbal structure 420) or another slow steering device to center an incoming beacon beam on the WFOV PSD. In addition, the micro-gimbals of the GDM disclosed herein may scan a beacon beam within a field of regard (FOR) about, for example, 1-10 mrad in one dimension, to provide a flashlight for another terminal to find, or may scan within the FOR to find a beacon beam transmitted by another terminal. The deformable mirror itself may have a small FOV (e.g., less than about 1 mrad, such as 500 μrad or smaller). The deformable mirror mounted on the micro-gimbals may be controlled to make tilt correction, for example, up to about 20 μrad. NFOV PSD 622 or 1126 may be used to measure the direction of the narrow beacon beam, where the measurement results may be used to control the micro-gimbals of the GDM to center the incoming beacon beam on the NFOV PSD. The NFOV PSD may have a field of view, for example, about 1 mrad, and may lock to a diameter about 5 μrad.

In some implementations, during laser beam acquisition and tracking, the deformable mirror mounted on the micro-gimbals may be used to adjust the wavefront of the transmitted beacon beam to diverge the transmitted beacon beam (e.g., with a divergence angle up to about 500 μrad, such as about 300 μrad) so that it may be easier for the other terminal to acquire the beacon beam. After the laser beam acquisition and tracking, the deformable mirror may return to the normal operation mode for data communication, where the deformable mirror may modify the wavefront of the transmitted beam to form a narrow beam with low divergence (e.g., about 10s of microradians).

Figure 18B:
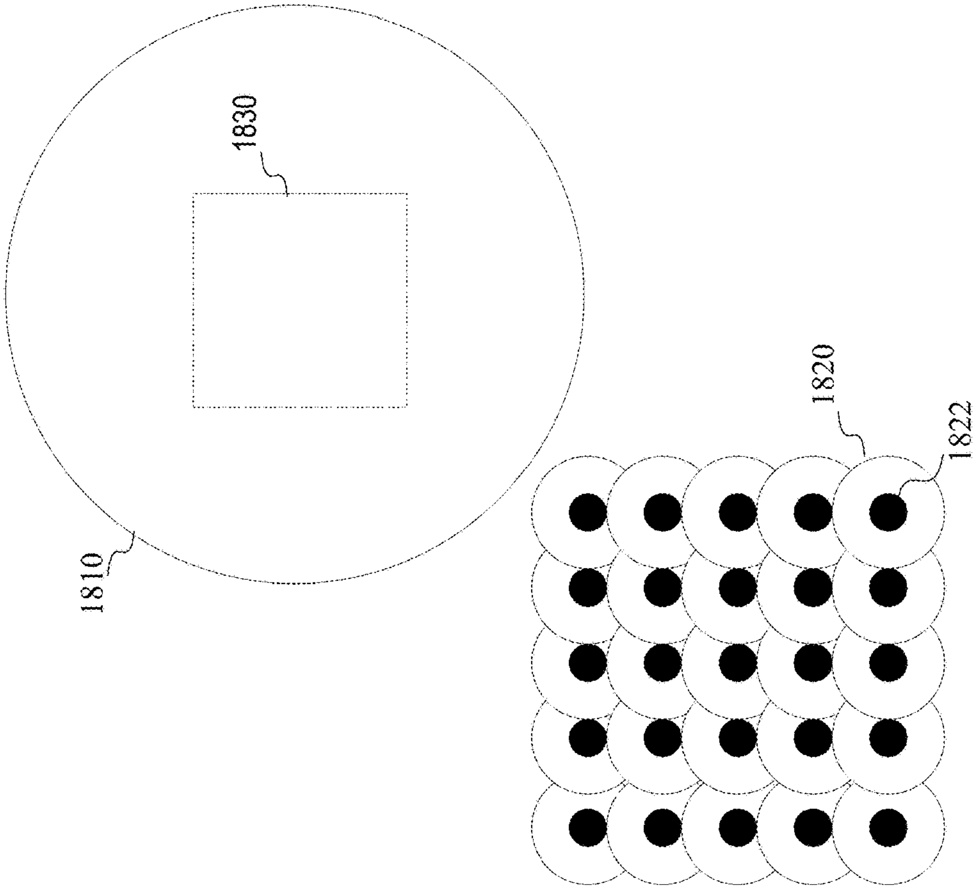
FIGS. 18A-18E illustrate an example of a process of laser beam acquisition and tracking in a free-space optical communication system disclosed herein according to certain embodiments.
Figure 18A:
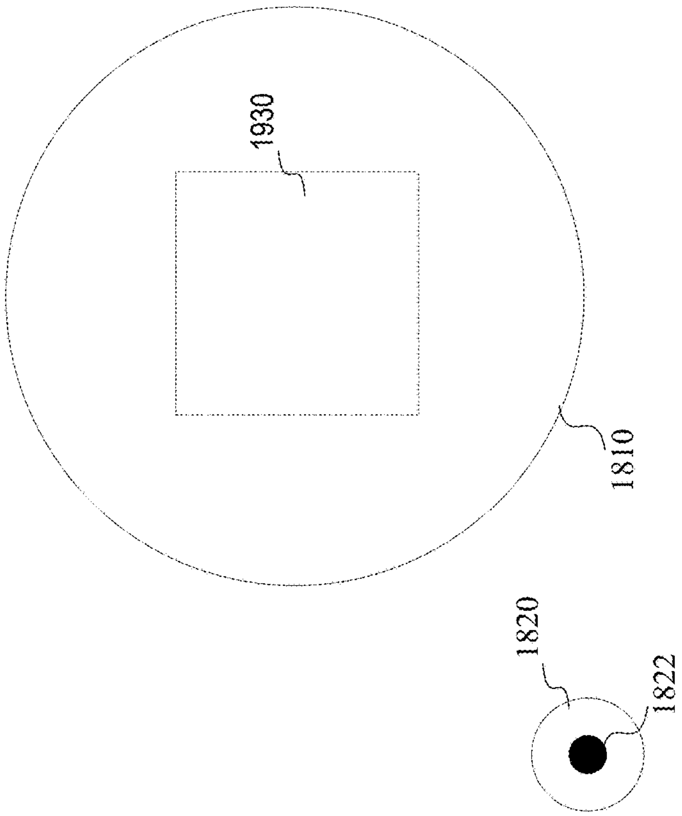

FIGS. 18A-18E illustrate an example of a process of laser beam acquisition and tracking in a free-space optical communication system disclosed herein according to certain embodiments. FIG. 18A shows an example of a position of a beacon beam 1822 from a first FSOC terminal and the FOV 1810 of the WFOV PSD (e.g., WFOV PSD 764) of a second FSOC terminal after the initial pointing, for example, based on the position of the second FSOC terminal determined by a GNSS device on the second FSOC terminal. The size of the FOV 1810 of the WFOV PSD of the second FSOC terminal may be about 24 mrad in the illustrated example. Beacon beam 1822 may have a divergence angle about 300 μrad. A circle 1820 in FIG. 18A shows the size of the FOV of a NFOV PSD of the second FSOC terminal, which may be about 1 mrad in the illustrated example. A square 1830 in FIG. 18A shows the field of regard of the GDM and the NFOV PSD of the second FSOC terminal, which may be, for example, between about 3 mrad and about 10 mrad. FIG. 18A shows that the beacon beam from the first FSOC terminal may be outside of the field of view of the WFOV PSD of the second FSOC terminal. For example, each of the first FSOC terminal and the second FSOC terminal may have an initial pointing error about 12.5 mrad, and thus the center of the FOV 1810 and the center of beacon beam 1822 may have a misalignment about 24 mrad. As such, neither the first FSOC terminal nor the second FSOC terminal may acquire the beacon beam from the other FSOC terminal.

FIG. 18B shows that, if the first FSOC terminal and the second FSOC terminal could not acquire the beacon beam from each other as shown in FIG. 18A, one FSOC terminal (e.g., the first FSOC terminal) may scan the beacon beam using the GDM according to a scan pattern, such as a raster pattern, a spiral pattern, a Lissajous pattern, and the like. The GDM may have a field of regard about 3-10 mrad. When the misalignment of the initial pointing direction is large, scanning the beacon beam by the GDM on one FSOC terminal (e.g., the first FSOC terminal) may not be able to put the beacon beam in the field of view of the WFOV PSD of the other SOC terminal (e.g., the second FSOC terminal). Even though not shown in FIG. 18B, the second FSOC terminal may also scan its beacon beam using its GDM within the field of regard of the GDM for the WFOV PSD of the first FSOC terminal to acquire.

Figure 18D:
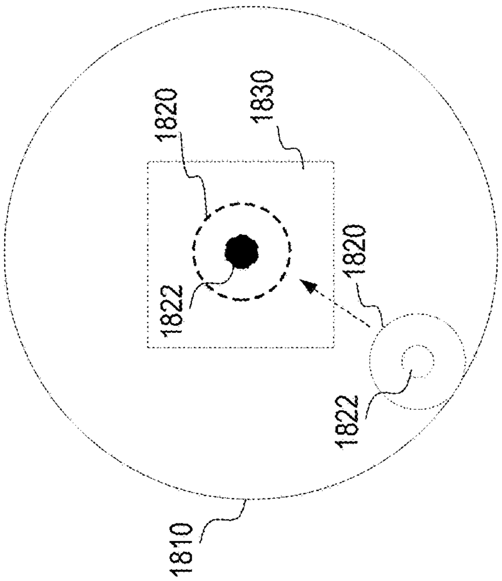
Figure 18E:
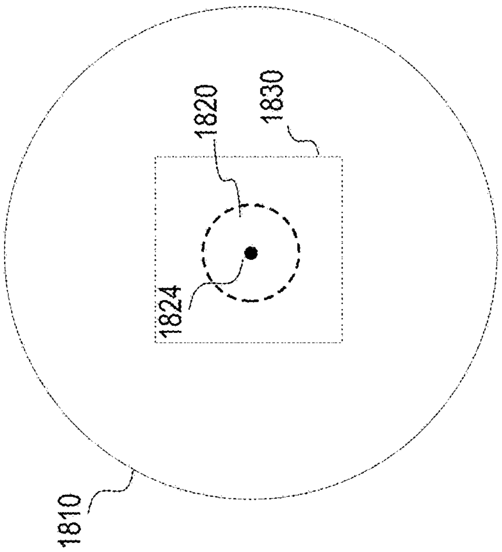
Figure 18C:
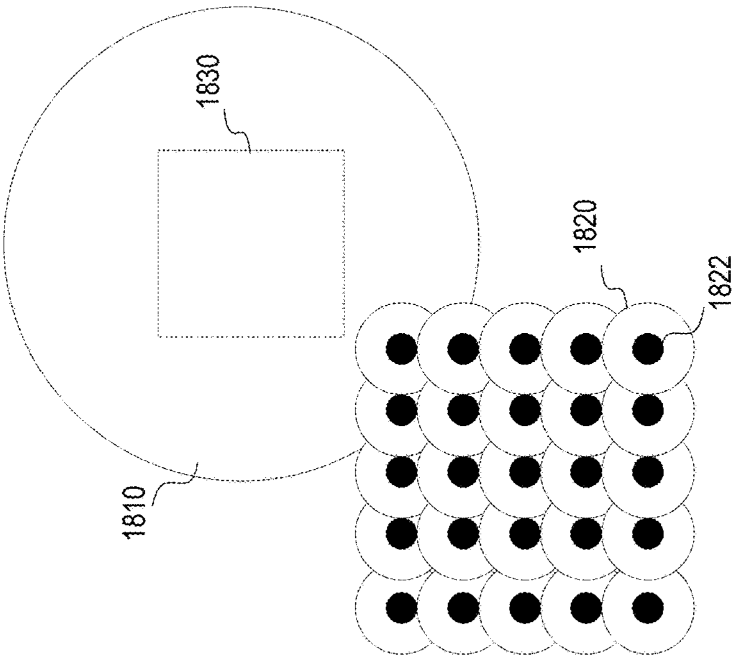

In the example shown in FIG. 18C, because scanning the beacon beam by the GDM of the first FSOC terminal within the FOR of the GDM may not put the beacon beam in the field of view of the WFOV PSD of the second FSOC terminal, the second FSOC terminal may start to search for the beacon beam from the first FSOC terminal within a range of a few degrees by moving the optical head of the second FSOC terminal using a gimbal (e.g., an inner gimbal of gimbal structure 420) or another slow steering mechanism. Similarly, the first FSOC terminal may also start to search for the beacon beam from the second FSOC terminal by moving the optical head of the first FSOC terminal using a gimbal (e.g., an inner gimbal of gimbal structure 420) or another slow steering mechanism. FIG. 18C shows that, after the optical head of the second FSOC terminal (or the first FSOC terminal) is moved to a certain orientation, the WFOV PSD of one FSOC terminal may start to be able to capture the scanned beacon beam from the other FSOC terminal.

FIG. 18D shows that, after the WFOV PSD of the second FSOC terminal starts to be able to capture the scanned beacon beam from the first FSOC terminal, the misalignment between the pointing directions of the two FSOC terminal may be determined, and the second FSOC terminal and/or the first FSOC terminal may orient the optical head using the gimbal based on the determined misalignment to position the beacon beam at approximately the center of the FOV of the WFOV PSD. When the beacon beam from the first FSOC terminal is within the field of regard of the GDM and the NFOV PSD of the second FSOC terminal (as shown by square 1830), the GDM may be controlled to position the beacon beam at the center of the FOR and FOV of the NFOV PSD.

FIG. 18E shows that, after the beacon beam is positioned at the center of the FOV of the WFOV PSD and the center of the FOV of the NFOV PSD, the GDM of the FSOC terminal may return to the normal operation mode for data communication, where the deformable mirror may modify the wavefront of the transmitted beam to form a narrow beam 1824 with low divergence (e.g., about 10s of microradians, rather than about 300 μrad).

In some FSOC systems disclosed herein, a terminal of a link between two terminals may detect strong signals, weak signals, or loss of signals (e.g., high rate of signal amplitude drop) of the laser beam transmitted from the other terminal. Upon detection of the strong signals, weak signals, or loss of signals, the terminal may send telemetry data to the other terminal, requesting the other terminal to, for example, change (e.g., increase if weak or no signals are detected or decrease if strong signals are detected) the intensity of the transmitted laser beam, scan the laser beam within a certain angular range, reduce the coherency of the transmitted light beam, or a combination of these actions. The telemetry data may be sent to the other terminal with other communication data. In some embodiments, the telemetry data may be sent use different coding schemes, modulation techniques, baud rates, or a combination thereof.

Figure 19:
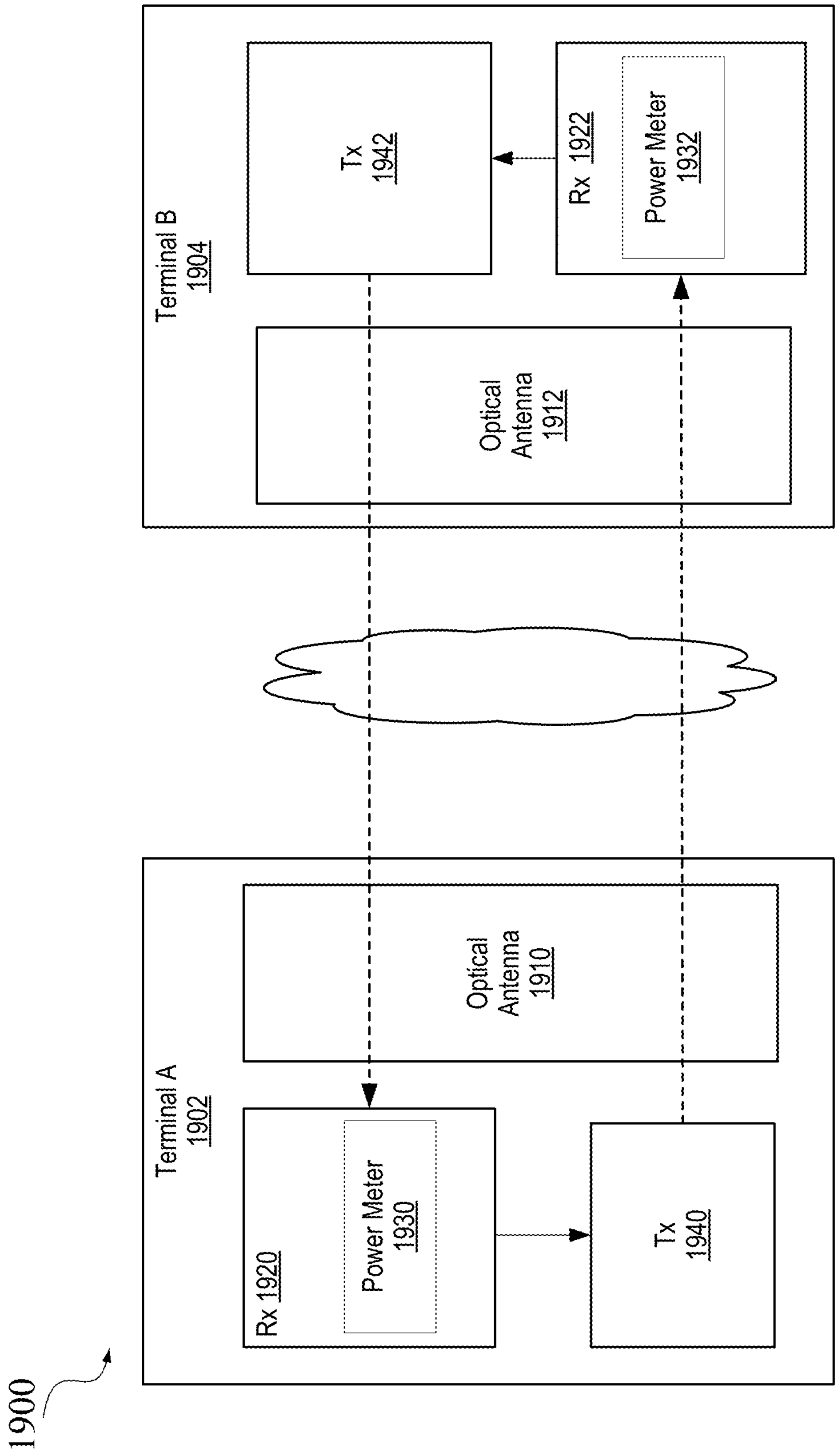
FIG. 19 illustrates an example of a free-space optical communication system where the terminals may share telemetry data according to certain embodiments.

FIG. 19 illustrates an example of a free-space optical communication system 1900 where the terminals may share telemetry data according to certain embodiments. As illustrated, a terminal A (1902) and a terminal B (1904) may be in a point-to-point communication. Terminal A may include an optical antenna 1910, an receiver subsystem 1920, and a transmitter subsystem 1940. Similarly, terminal B may include an optical antenna 1912, an receiver subsystem 1922, and a transmitter subsystem 1942.

Transmitter subsystem 1940 of terminal A may send payload data in a laser beam through optical antenna 1910 and the atmosphere to terminal B. Receiver subsystem 1922 of terminal B may receive the laser beam through optical antenna 1912. Receiver subsystem 1922 of terminal B may include one or more sensors such as a power meter 1932 that may measure the power (or intensity) of the received laser beam. If the measured power of the received laser beam is lower than a threshold value or higher than another threshold, terminal B may send a message to terminal A using transmitter subsystem 1942 and optical antenna 1912. The message may indicate that the power of the received laser beam is too low or too high. Upon receiving the message, terminal A may, for example, increase or decrease the intensity of the transmitted laser beam, scan the laser beam within a certain angular range, and/or reduce the coherency of the transmitted light beam.

Similarly, transmitter subsystem 1942 of terminal B may send payload data in a laser beam through optical antenna 1912 and the atmosphere to terminal A. Receiver subsystem 1920 of terminal A may receive the laser beam through optical antenna 1910. Receiver subsystem 1920 of terminal A may include one or more sensors such as a power meter 1930 that may measure the power (or intensity) of the received laser beam. If the measured power of the received laser beam is lower than a threshold value or higher than another threshold, terminal A may send a message to terminal B using transmitter subsystem 1940 and optical antenna 1910. The message may indicate that the power of the received laser beam is too low or too high. Upon receiving the message, terminal B may need to, for example, increase or decrease the intensity of the transmitted laser beam, scan the laser beam in a certain angular range, reduce the coherency of the transmitted light beam, and/or retransmit previously transmitted data. In some embodiments, the message may indicate the desired changes to the transmitted light beam, or the estimated characteristics of the channel.

The message and the payload data sent by terminal B to terminal A may use different coding schemes, modulation techniques, baud rates, or a combination thereof. Similarly, the message and the payload data sent by terminal B to terminal A may use different coding schemes, modulation techniques, baud rates, or a combination thereof. By sharing the telemetry data, the burden of maintaining a link may be shared by the two terminals of the link.

As described above, the optical components used in the disclosed FSOC system may be mostly reflective optical components that may have high reflectivity within a wide wavelength band that may cover the short-wavelength infrared (SWIR) band, the mid-wavelength infrared (MWIR) band, and the long-wavelength infrared (LWIR) band. The Earth atmosphere may have low loss in center region of each of these three IR bands.

Figure 20:
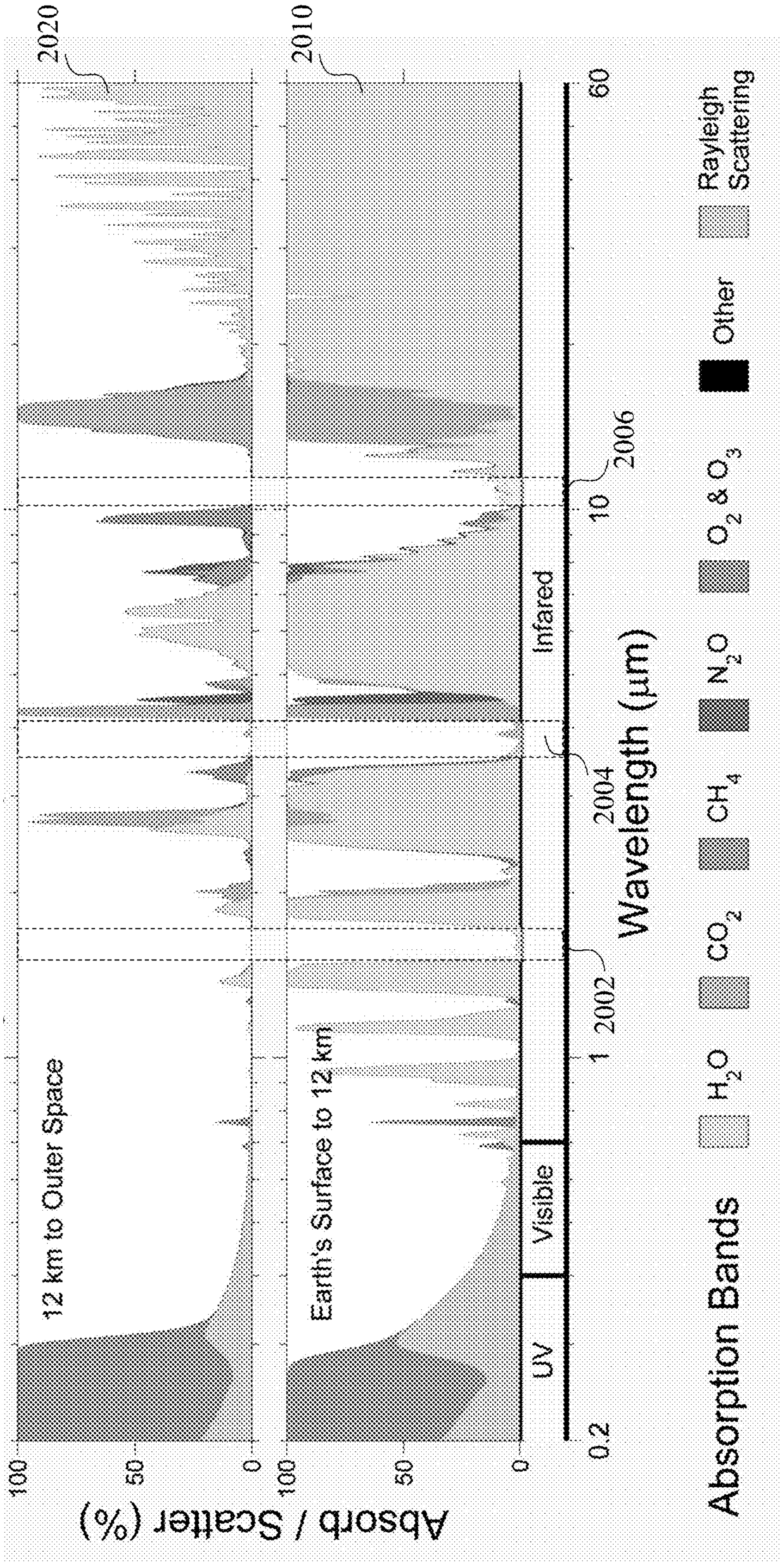
FIG. 20 illustrates spectral bands that may have low transmission losses in atmosphere and thus may be used for free-space laser communication according to certain embodiments.

FIG. 20 illustrates spectral bands that may have low transmission losses in atmosphere and thus may be used for free-space laser communication according to certain embodiments. A diagram 2010 shows the loss (in %) of light from the UV band to the far infrared band due to absorption and scattering in atmosphere from the Earth's surface to about 12 km in space under a clear sky. A diagram 2020 shows the loss (in %) of light from the UV band to the far infrared band due to absorption and scattering in atmosphere from about 12 km in space to the outer space under a clear sky. As illustrated in FIG. 20, in a region 2002 of the SWIR band, which may be around about 1.5 μm, the loss from the Earth's surface to about 12 km in space and from about 12 km in space to the outer space may be very low under a clear sky. Similarly, in a region 2004 of MWIR band, which may be around about 2.2 μm, the loss from the Earth's surface to about 12 km in space and from about 12 km in space to the outer space may be very low under a clear sky. In addition, in a region 2006 of LWIR band, which may be around about 10 μm, the loss from the Earth's surface to about 12 km in space and from about 12 km in space to the outer space may be very low under a clear sky. As such, region 2002 of the SWIR band, region 2004 of the MWIR band, and region 2006 of the LWIR band may be used for FSOC communication between the Earth's surface and the outer space.

Figure 21:
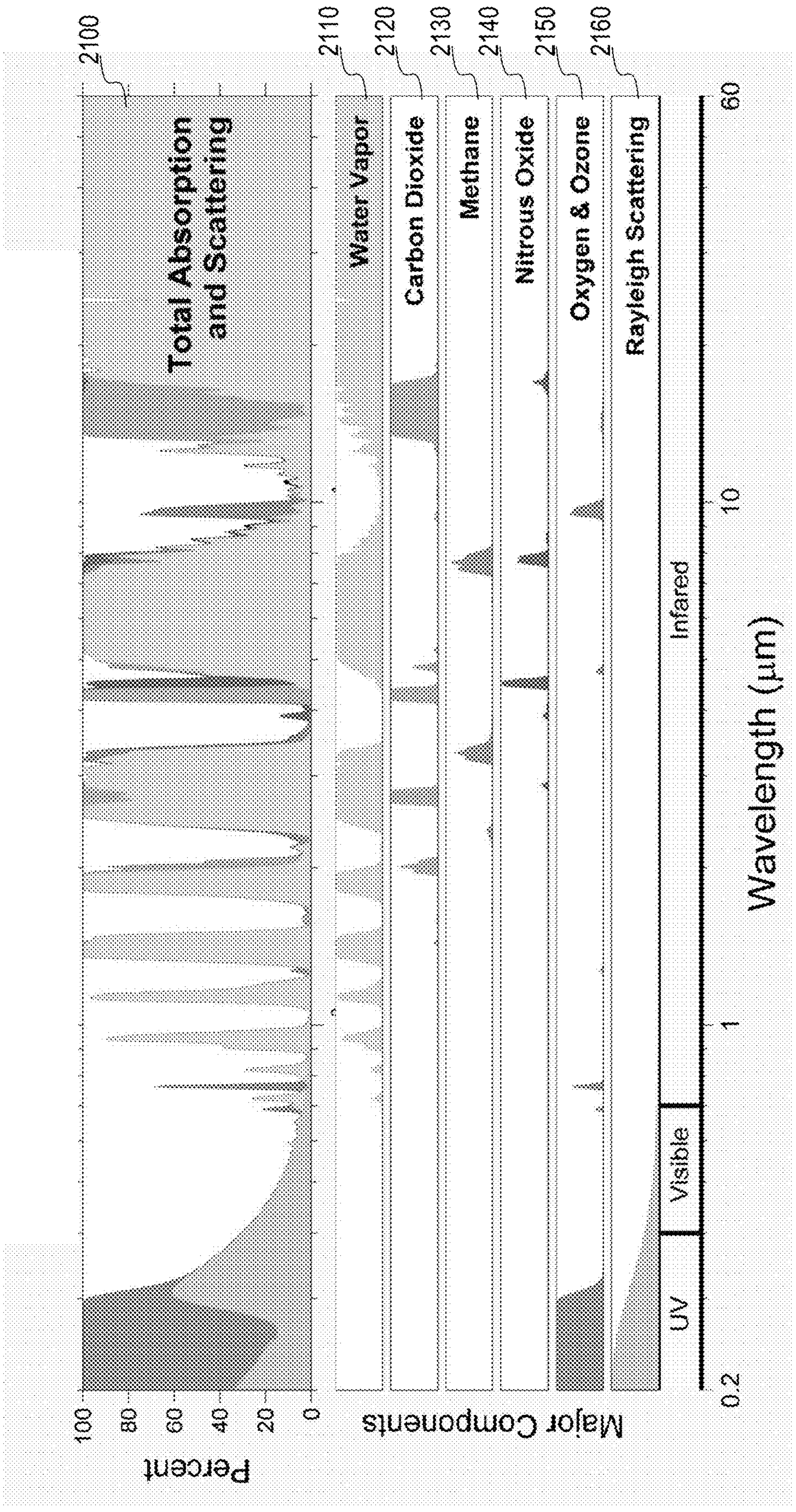
FIG. 21 illustrates transmission losses of light in atmosphere due to absorption and scattering by atmosphere.

FIG. 21 illustrates transmission losses of light in atmosphere due to absorption and scattering by atmosphere. A diagram 2110 in FIG. 21 shows the absorption of light in the ultraviolet (UV), visible, and infrared (IR) bands by water vapor in the atmosphere, which may be the main source of light absorption. Diagrams 2120, 2130, 2140, and 2150 show absorption of light in the UV, visible, and IR bands by carbon dioxide, methane, nitrous oxide, and oxygen and ozone, respectively. A diagram 2160 in FIG. 21 shows the Rayleigh scattering of light in the UV, visible, and IR bands by the atmosphere, which may be very small in IR bands. A diagram 2100 shows the total loss in the atmosphere due to absorption and scattering. As illustrated, the total loss may be low at some IR bands, such as around 1.5 μm, about 2.2 μm, about 3.5-4 μm, and about 10 μm.

Figure 22:
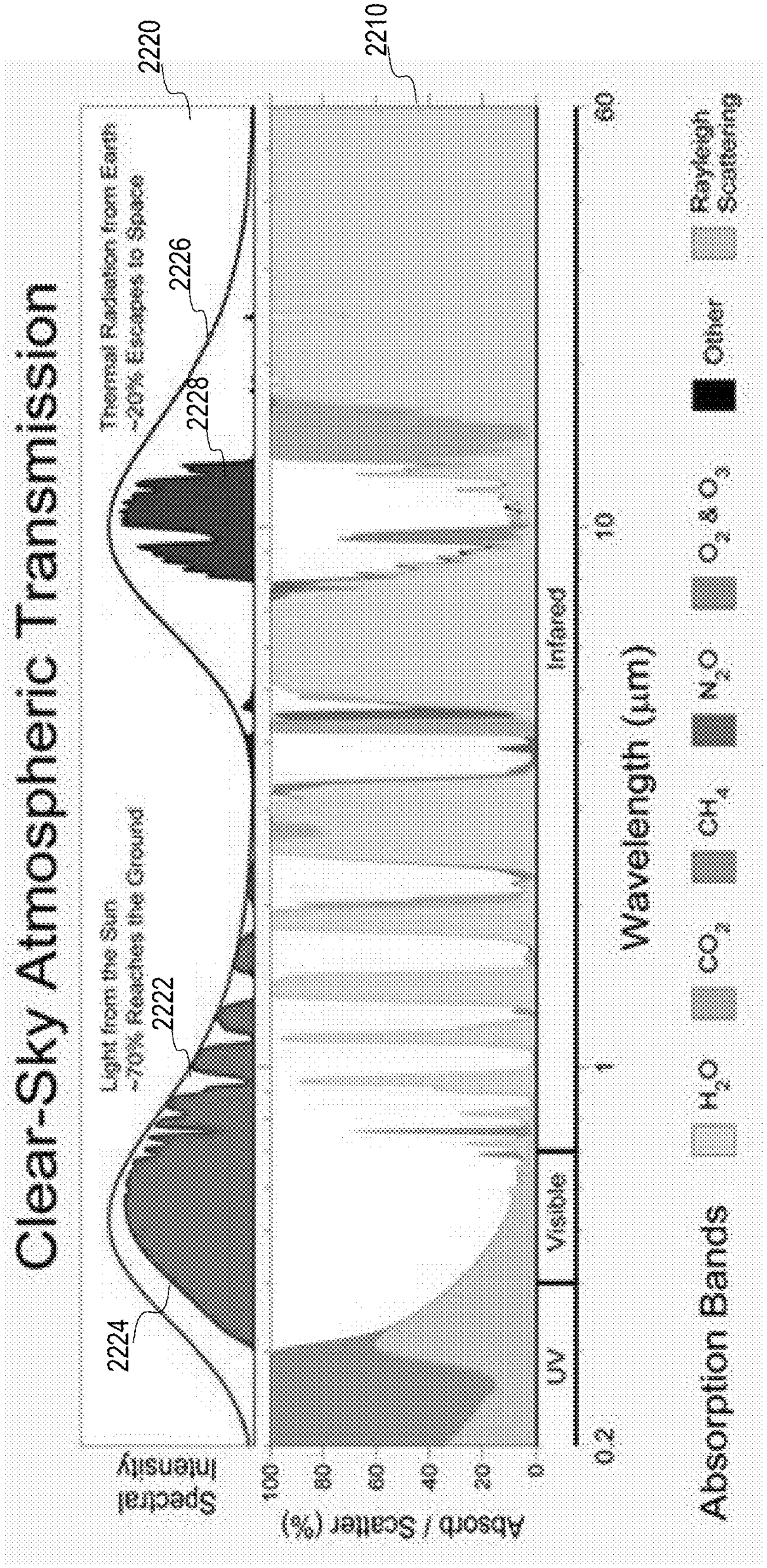
FIG. 22 illustrates overall transmission losses of light in atmosphere and examples of light that may pass through the atmosphere.

FIG. 22 illustrates overall transmission losses of light in atmosphere and examples of light that may pass through and be attenuated by the atmosphere. A diagram 2210 (same as diagram 2100) shows the total loss in the atmosphere due to absorption and scattering. A curve 2222 of a diagram 2220 illustrates the power (intensity) spectrum of sunlight. Filled regions 2224 under curve 2222 in diagram 2220 indicate the intensities of sunlight of certain wavelengths that may pass through the atmosphere and reach the Earth's surface. Curve 2222 and regions 2224 under curve 2222 shows that a total of about 70% of the total power of the sunlight may pass through the atmosphere and reach the Earth's surface, where most of the light in spectral bands around 1.5 μm and 2.2 μm may pass through the atmosphere. A curve 2226 in diagram 2220 illustrates the power (intensity) spectrum of thermal radiation from the Earth. Filled regions 2228 under curve 2226 in diagram 2220 indicate the intensities of thermal radiation from the Earth in certain wavelengths that may pass through the atmosphere and escape to space. Curve 2226 and regions 2228 indicate that a total of about 19% of the total power of the thermal radiation from the Earth may pass through the atmosphere and escape to space, where most of the light in spectral bands around 3.5-4 μm and around 10 μm may pass through the atmosphere.

As such, in some embodiments, a combination of light in a short-wavelength infrared (SWIR) band (e.g., about 0.7 to about 2.0 μm, such as about 1.55 μm), light in a mid-wavelength infrared (MWIR) band (e.g., about 2 to about 4 μm), and/or light in a long-wavelength infrared (LWIR) band (e.g., >4 μm, such as 10 μm) may be used to provide diversity and reliability (and up time), in particular, in adverse environments. For example, LWIR light at about 10 μm may have much lower loss in fog than SWIR light at about 1.55 μm.

In one example, a free-space optical communication terminal may include a first transmitter configured to transmit data using a first light beam in a short-wavelength infrared band, a second transmitter configurable to transmit data using a second light beam in a mid-wavelength or long-wavelength infrared band, an optical multiplexer coupled to the first transmitter and the second transmitter and configured to multiplex the first light beam and the second light beam into a multiplexed light beam, and a reflective optical antenna configured to transmit the multiplexed light beam into atmosphere towards another terminal.

In another example, a free-space optical communication terminal may include a reflective optical antenna configured to receive a laser beam from atmosphere through a first aperture, the laser beam including at least one of light in a short-wavelength infrared band or light in a mid-wavelength or long-wavelength infrared band. The FSOC terminal may also include a deformable mirror configurable to correct aberrations of the received laser beam, a power selector configurable to split the received laser beam into a first light beam and a second light beam, a wavefront sensor configured to measure a wavefront profile of the first light beam, a controller configured to control the deformable mirror to correct the aberrations of the received laser beam based on the wavefront profile of the first light beam measured by the wavefront sensor, an optical demultiplexer configured to demultiplex the second light beam and separate the light in the SWIR band and the light in the MWIR or LWIR band, a first optical receiver configured to receive the light in the SWIR band from the optical demultiplexer and demodulate data transmitted in the light in the SWIR band, and a second optical receiver configured to receive the light in the MWIR or LWIR band from the optical demultiplexer and demodulate data transmitted in the light in the MWIR or LWIR band.

In yet another example, a free-space optical communication terminal may include a first transceiver configured to transmit and/or receive data using light in a short-wavelength infrared band, a second transceiver configured to transmit and/or receive data using light in a mid-wavelength or long-wavelength infrared band, an optical multiplexer coupled to the first transceiver and the second transceiver, and a reflective optical antenna configured to receive the light beam from the atmosphere or transmit the multiplexed light beam into the atmosphere. The optical multiplexer may be configured to: multiplex the light in the short-wavelength infrared band from the first transceiver and the light in the mid-wavelength or long-wavelength infrared band from the second transceiver into a multiplexed light beam, or demultiplex light in a light beam received from atmosphere into light in the short-wavelength infrared band and light in the mid-wavelength or long-wavelength infrared band.

In some embodiments, a free-space optical communication terminal may include a controller for selectively activating a transmitter that transmits data using MWIR or LWIR light. The controller may activate the transmitter when a transmission loss of SWIR light (e.g., around 1.5 μm) in the atmosphere is greater than a threshold or when an intensity of the received SWIR light (e.g., around 1.5 μm) is lower than a threshold. The controller may deactivate the transmitter when the transmission loss of SWIR light (e.g., around 1.5 μm) in the atmosphere is lower than a threshold or when an intensity of the received SWIR light (e.g., around 1.5 μm) is greater than a threshold.

Due to the longer wavelength, the phase aberrations of LWIR light passing through a medium may be much smaller than the phase aberrations of SWIR light passing through the same medium and experiencing the same optical path length variations. Therefore, the phase aberrations of LWIR light may not need to be corrected or may be corrected using components that may have a lower performance but may be much cheaper and more robust. For example, in some implementations, wavefront errors measured using one wavelength band (e.g., SWIR band) may be used to correct wavefront errors of light beams in another wavelength band (e.g., LWIR band). In some embodiments, a Shack-Hartmann wavefront sensor may not need be used, and a lower cost wavefront sensor, such as a wavefront sensor that uses a holographic optical element to form images of the wavefront, may be used instead.

Figure 23:
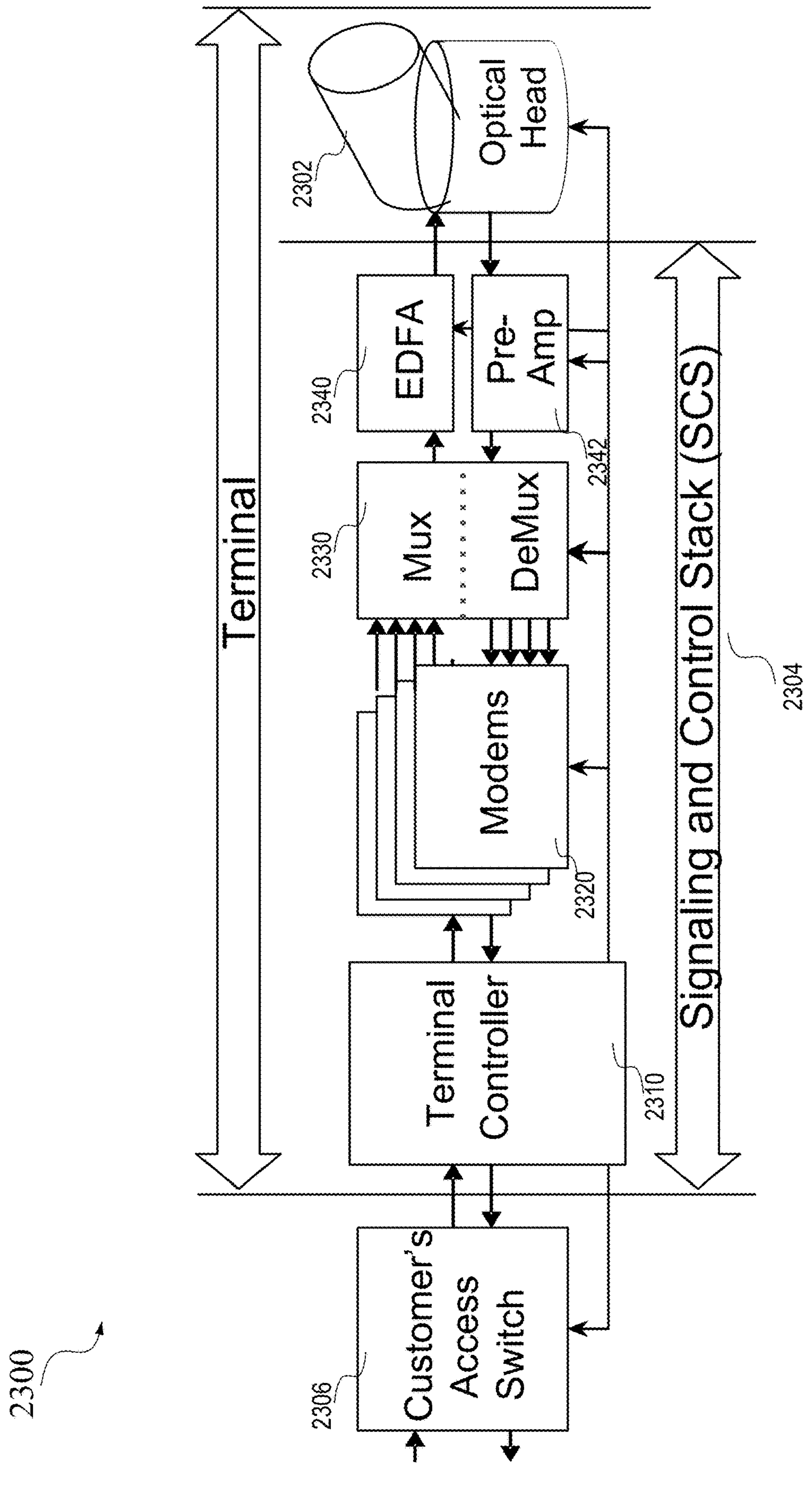
FIG. 23 illustrates a block diagram of an example of a signaling and control stack of a free-space optical communication terminal according to certain embodiments.

FIG. 23 illustrates a block diagram of an example of a signaling and control stack (SCS) 2304 of a free-space optical communication terminal 2300 according to certain embodiments. SCS 2304 of FSOC terminal 2300 may be used to, under control of a customer's access switch interface 2306, generate data-modulated light signals in one or more wavelength bands for transmission by an optical head 2302, and receive data-modulated light signals in one or more wavelength bands and demodulate data from the received light signals. In the illustrated example, SCS 2304 may include a terminal controller 2310 that may control operations of other components of SCS 2304, such as one or more modems 2420 (including optical transceivers), an optical multiplexer/demultiplexer 2330, and one or more optical amplifiers 2340 (e.g., EDFAs) for the transmit and receive subsystems of FSOC terminal 2300.

For example, in the receive subsystem of FSOC terminal 2300, light received by optical head 2302 may be amplified by one or more pre-amplifiers 2342, which may amplify the received light signals that may have a low intensity or power as described above. The one or more pre-amplifiers 2342 may include, for example, erbium-doped fiber amplifiers that may introduce low noise and may amplify the received light signals to a few milliwatts or higher. The received light signals may include light in multiple wavelength bands, where light in different wavelength bands may be modulated using different data such that data carried by the light signals in the multiple wavelength bands may have a high total data rate. The received light signals including light in multiple wavelength bands may be separated by the demultiplexer of multiplexer/demultiplexer 2330 (e.g., one or more add-drop modules or a wavelength division multiplexing/demultiplexing device, such as a grating, a filter, or an interferometer) into multiple channels based on the wavelength, where each channel may include light in a respective wavelength band.

As described above, in some embodiments, the received light signals may include light around 1.55 μm, and each wavelength band of the multiple wavelength bands of the received light signals may be a wavelength band having a narrow bandwidth, such as about 19 nm for coarse wavelength division multiplexing (CWDM), or about 0.8 nm (100 GHz) or about 0.4 nm (50 GHz) for dense wavelength division multiplexing (DWDM). In some embodiments, the received light may include both infrared light in the SWIR band (e.g., around 1.55 μm), and infrared light in the MWIR band or LWIR band. A coarse WDDM or splitter may split the light into light in the SWIR band and light in the MWIR or LWIR band. The light in the SWIR band may be split into multiple channels corresponding to different wavelength bands using a CWDM or DWDM demultiplexer. The light in the MWIR or LWIR band may also be split into multiple channels corresponding to different wavelength bands using a CWDM or DWDM demultiplexer.

Modems 2320 may include multiple receivers, where each receiver may include a high-speed photodetector that may convert data-modulated optical signals into electrical signals, which may then be demodulated to recover the transmitted data. In some embodiments, each modem 2320 may demodulate the received light signals in the optical domain and then converted to electrical signals by a high-speed photodetector. Data demodulated by the multiple receivers may be assembled to generate the complete data block or data stream transmitted in the received light signals.

In the transmit subsystem of FSOC terminal 2300, terminal controller 2310 may control modems 2320 to modulate laser beams using data to be transmitted. The laser beams from different transceivers may have different wavelengths as described above (e.g., CWDM or DWDM wavelengths in SWIR, MWIR, or LWIR) and may be multiplexed by multiplexer/demultiplexer 2330 into a single laser beam. The multiplexed laser beam may be amplified by one or more optical amplifiers 2340 to, for example, a few watts or a few tens of watts. The amplified laser beam may then be transmitted by optical head 2302 as described above with respect to, for example, FIGS. 6, 7, and 11.

Figure 24:
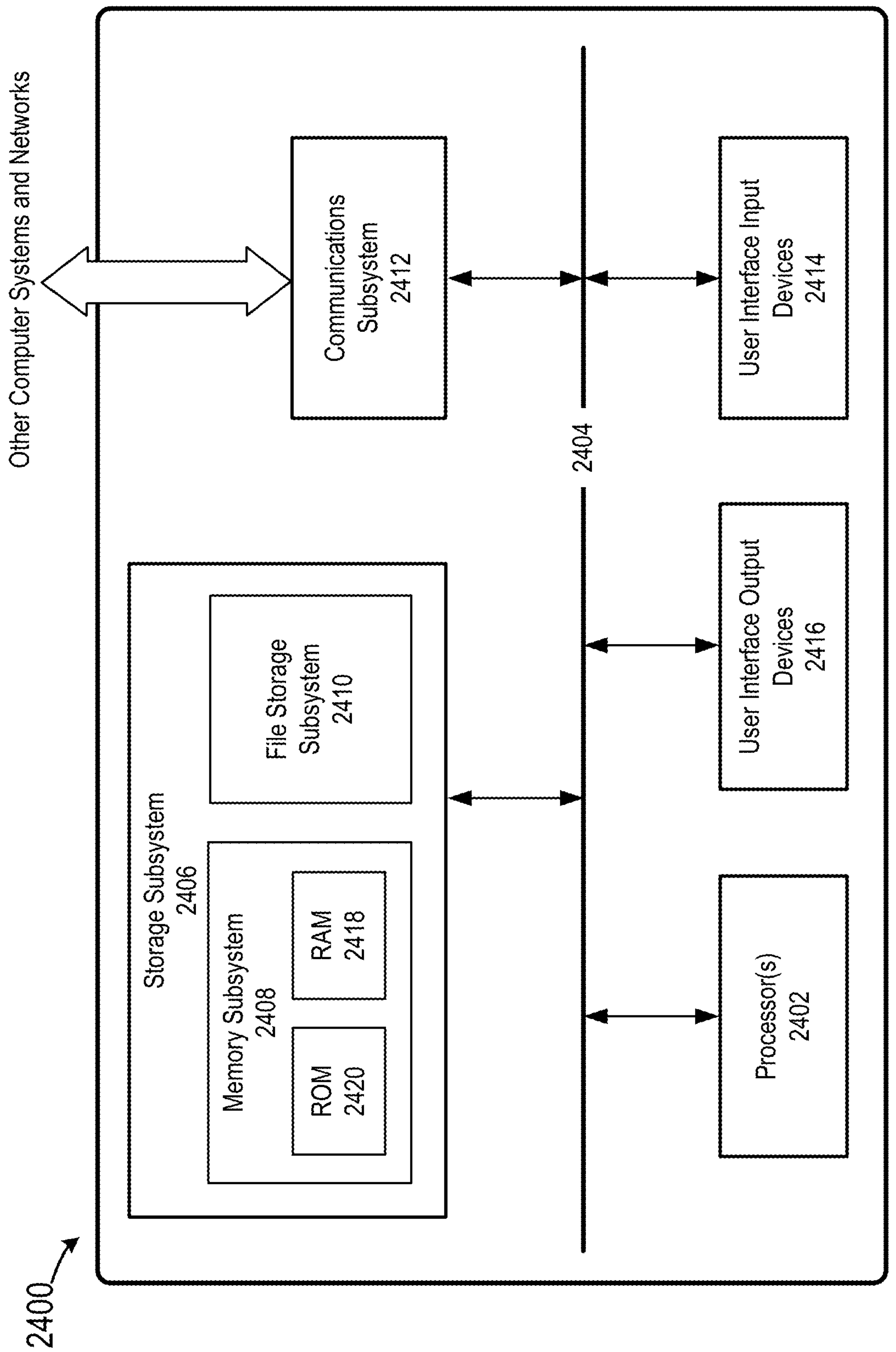
FIG. 24 illustrates an example of a computer system for implementing some of the embodiments disclosed herein.

FIG. 24 illustrates an example of a computer system 2400 for implementing some of the embodiments disclosed herein. For example, computer system 2400 may be used to implement any of the controllers or computer systems discussed above, such as tracking/GDM controller 630, AO controller 1560, and terminal controller 2310. Computer system 2400 can include one or more processors 2402 that can communicate with a number of peripheral devices (e.g., input devices) via an internal bus subsystem 2404. These peripheral devices can include storage subsystem 2406 (comprising memory subsystem 2408 and file storage subsystem 2410), user interface input devices 2414, user interface output devices 2416, and a communication subsystem 2412.

Processor(s) 2402 may be configured to execute instructions for performing operations at a number of components, and can be, for example, a general-purpose processor or microprocessor suitable for implementation within a portable electronic device. Processor(s) 2402 may be communicatively coupled with a plurality of components within computer system 2400. To realize this communicative coupling, processor(s) 2402 may communicate with the other illustrated components across internal bus subsystem 2404.

In some examples, internal bus subsystem 2404 can provide a mechanism for allowing the various components and subsystems of computer system 2400 to communicate with each other as intended. Although internal bus subsystem 2404 is shown schematically as a single bus, alternative embodiments of the bus subsystem can utilize multiple buses and additional circuitry to transfer data. Additionally, communication subsystem 2412 can serve as an interface for communicating data between computer system 2400 and other computer systems or networks. Embodiments of communication subsystem 2412 can include wired interfaces (e.g., Ethernet, RS-222, RS-485, etc.) or wireless interfaces (e.g., ZigBee, Wi-Fi, cellular, etc.).

In some cases, user interface input devices 2414 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 2400. Additionally, user interface output devices 2416 can include a display subsystem, a printer, or non-visual displays such as audio output devices, etc. The display subsystem can be any known type of display device. In general, use of the term "output device" is intended to include all possible types of devices and mechanisms for outputting information from computer system 2400.

Storage subsystem 2406 can include memory subsystem 2408 and file storage subsystem 2410. Subsystems 2408 and 2410 represent non-transitory computer-readable storage media that can store program code and/or data that provide the functionality of disclosed herein. In some embodiments, memory subsystem 2408 can include a number of memories including main random access memory (RAM) 2418 or SRAM for storage of instructions and data during program execution and read-only memory (ROM) 2420 or FLASH memory in which fixed instructions may be stored. File storage subsystem 2410 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

The systems, devices, and methods discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A free-space optical communication terminal comprising:

an optical antenna comprising an active aperture configured to receive a laser beam through a first aperture having a variable aperture size, the received laser beam characterized by wavelengths in a first wavelength range, the active aperture including a pair of blades and a motor configured to rotate the pair of blades to vary the aperture size;

a collimator configured to couple the received laser beam into an optical fiber;

a receiver subsystem comprising a first bandpass filter characterized by a pass band including the first wavelength range;

a transmitter subsystem configured to generate a laser beam to be transmitted, the laser beam to be transmitted characterized by wavelengths in a second wavelength range outside of the pass band of the first bandpass filter; and a circulator coupled to the optical fiber, the receiver subsystem, and the transmitter subsystem and configured to:

direct the received laser beam from the optical fiber to the receiver subsystem; and direct the laser beam to be transmitted from the transmitter subsystem to the optical fiber, wherein the collimator is configured to collimate the laser beam to be transmitted from the optical fiber, and wherein the optical antenna is configured to transmit the laser beam to be transmitted into atmosphere through the first aperture.

2. The free-space optical communication terminal of claim 1, wherein the active aperture is configurable to:

operate in an open mode having a maximum aperture size for laser beam acquisition;

operate in a spatial filter mode characterized by a first aperture size, in response to an intensity of the received laser beam greater than a first threshold value;

operate in a squinting mode characterized by a second aperture size smaller than the first aperture size, in response to the intensity of the received laser beam greater than the first threshold value but below a second threshold value; or operate in a closed mode in response to the intensity of the received laser beam greater than the second threshold value.

3. The free-space optical communication terminal of claim 1, wherein:

the optical antenna is configured to direct a portion of the received laser beam to a power meter; and the free-space optical communication terminal comprises a controller configured to control an operating mode and/or an aperture size of the active aperture based on outputs of the power meter.

4. The free-space optical communication terminal of claim 3, wherein:

the optical antenna comprises a Cassegrain telescope that includes a primary mirror and a secondary mirror;

the secondary mirror includes an aperture at a center region; and the primary mirror is configured to direct the portion of the received laser beam to the power meter through the aperture in the secondary mirror.

5. The free-space optical communication terminal of claim 1, wherein:

the optical antenna includes one or more telescopes configured to demagnify the received laser beam or magnify the laser beam to be transmitted through the first aperture; and the free-space optical communication terminal comprises one or more active apertures positioned at one or more focal points of the one or more telescopes.

6. The free-space optical communication terminal of claim 1, further comprising:

a deformable mirror configurable to correct aberrations of the received laser beam;

a power selector configurable to split the received laser beam into a first light beam and a second light beam;

a second bandpass filter configured to filter the first light beam, the second bandpass filter characterized by a pass band including the first wavelength range but not the second wavelength range;

a wavefront sensor configured to measure a wavefront of the first light beam filtered by the first bandpass filter; and a controller configured to control the deformable mirror to correct the aberrations of the received laser beam based on the measured wavefront of the first light beam, wherein the power selector is configured to direct a portion of the laser beam to be transmitted to the deformable mirror, and wherein the deformable mirror is configured to direct the laser beam to be transmitted to the optical antenna.

7. The free-space optical communication terminal of claim 6, wherein the power selector is configurable to split the received laser beam and the laser beam to be transmitted at a variable ratio.

8. The free-space optical communication terminal of claim 7, wherein the power selector comprises:

an array of beam splitters characterized by different split ratios; and a linear actuator configured to slide the array of beam splitters.

9. The free-space optical communication terminal of claim 6, further comprising:

a beam splitter between the second bandpass filter and the wavefront sensor, the beam splitter configured to:

direct a first portion of the first light beam towards a narrow field-of-view position sensitive detector for laser beam tracking; and direct a second portion of the first light beam towards the wavefront sensor; and a third bandpass filter between the beam splitter and the wavefront sensor, the third bandpass filter characterized by a pass band including the first wavelength range but not the second wavelength range.

10. The free-space optical communication terminal of claim 9, further comprising:

a lens configured to receive, through a second aperture, a portion of a beacon beam transmitted through atmosphere; and a wide field-of-view position sensitive detector configured to receive the portion of the beacon beam for laser beam tracking.

11. The free-space optical communication terminal of claim 10, further comprising a controller configured to use outputs of the narrow field-of-view position sensitive detector and the wide field-of-view position sensitive detector for laser beam tracking.

12. The free-space optical communication terminal of claim 6, wherein the deformable mirror comprises:

a deformable membrane including a contiguous reflective surface or a two-dimensional (2-D) array of micromirrors; and a two-dimensional (2-D) array of micro-actuators.

13. The free-space optical communication terminal of claim 12, wherein the deformable mirror comprises a gimbaled deformable mirror (GDM) configurable to:

diverge a beacon beam to be transmitted into atmosphere for laser beam tracking; or scan within a field of regard to acquire a beacon beam transmitted by a first terminal through atmosphere.

14. The free-space optical communication terminal of claim 13, wherein the GDM comprises:

an outer gimbal coupled to a support structure by outer flexures;

an inner gimbal coupled to the outer gimbal by inner flexures; and actuators configured to rotate the outer gimbal and the inner gimbal, wherein the 2-D array of micro-actuators is coupled to the inner gimbal.

15. The free-space optical communication terminal of claim 14, wherein:

the outer gimbal is configured to rotate around a first axis;

the inner gimbal is configured to rotate around a second axis; and the actuators include linear actuators.

16. The free-space optical communication terminal of claim 1, wherein the free-space optical communication terminal is configured to:

detect that a power of the received laser beam is below a first threshold value or above a second threshold value; and transmit a message to a terminal that transmitted the received laser beam, the message requesting the terminal to:

change an amplitude of a transmitted laser beam;

adjust a wavefront of the transmitted laser beam;

reduce coherency of the transmitted laser beam; or a combination thereof.

17. The free-space optical communication terminal of claim 16, wherein the free-space optical communication terminal is configured to transmit the message using a coding scheme, modulation technique, and/or baud rate that is different from coding schemes, modulation techniques, and/or baud rates for transmitting other data.

18. The free-space optical communication terminal of claim 1, further comprising:

a gimbal configured to tilt and/or rotate the free-space optical communication terminal;

a navigation system configured to determine a position of the free-space optical communication terminal; and a controller configured to orient, based on the position of the free-space optical communication terminal, the free-space optical communication terminal using the gimbal.

* * * * *